(12) United States Patent
Walker et al.

(10) Patent No.: US 12,228,819 B2
(45) Date of Patent: Feb. 18, 2025

(54) BACK LIGHT UNIT FOR BACKLIT DISPLAYS

(71) Applicant: BrightView Technologies, Inc., Durham, NC (US)

(72) Inventors: Kenneth Lee Walker, Semora, NC (US); Juhyun John Lee, Morrisville, NC (US)

(73) Assignee: BrightView Technologies, Inc., Durham, NC (US)

( * ) Notice: Subject to any disclaimer, the term of this patent is extended or adjusted under 35 U.S.C. 154(b) by 0 days.

(21) Appl. No.: 18/478,035

(22) Filed: Sep. 29, 2023

(65) Prior Publication Data

US 2024/0111186 A1    Apr. 4, 2024

Related U.S. Application Data

(60) Provisional application No. 63/425,293, filed on Nov. 14, 2022, provisional application No. 63/418,826, filed on Oct. 24, 2022, provisional application No. 63/416,633, filed on Oct. 17, 2022, provisional application No. 63/413,030, filed on Oct. 4, 2022.

(51) Int. Cl.
*G02F 1/133* (2006.01)
*G02F 1/1335* (2006.01)
*G02F 1/13357* (2006.01)

(52) U.S. Cl.
CPC .. *G02F 1/133607* (2021.01); *G02F 1/133603* (2013.01); *G02F 1/13362* (2013.01)

(58) Field of Classification Search
CPC ......... G02F 1/133604; G02F 1/133607; G02F 1/13362; F21V 5/007; F21V 5/045
See application file for complete search history.

(56) References Cited

U.S. PATENT DOCUMENTS

| 7,190,387 B2 | 3/2007 | Rinehart et al. |
| 7,192,692 B2 | 3/2007 | Wood et al. |
| 11,181,776 B2 | 11/2021 | Walker et al. |
| 2005/0265029 A1* | 12/2005 | Epstein ............... G09F 9/33 |
| | | 362/241 |

(Continued)

FOREIGN PATENT DOCUMENTS

| CN | 110161750 B | 6/2022 | |
| WO | WO-03083943 A2 * | 10/2003 | ......... H01L 25/0753 |

OTHER PUBLICATIONS

International Search Report and Written Opinion received for PCT Application No. PCT/US2023/075509, mailed on Jan. 19, 2024, 12 pages.

*Primary Examiner* — Julie A Bannan
(74) *Attorney, Agent, or Firm* — Rauschenbach Patent Law Group, PLLC; Kurt Rauschenbach

(57) ABSTRACT

A back light unit includes a plurality of light emitting diodes positioned on a substrate and a plurality of flat lenses. A respective one of the plurality of flat lens are positioned a distance above a respective one of the plurality of light emitting diodes. Each of the plurality of flat lenses includes a plurality of annular segments having a common center. Each of the plurality of annular segments includes a prism shape microstructure having a first facet configured to refract the light in a desired direction and a second facet oriented in a plane that is parallel to a plane of an emitting surface of respective ones of the plurality of light emitting diode.

85 Claims, 60 Drawing Sheets

(56) References Cited

U.S. PATENT DOCUMENTS

| | | | |
|---|---|---|---|
| 2006/0044806 A1* | 3/2006 | Abramov | F21V 5/007 |
| | | | 362/337 |
| 2017/0175976 A1 | 6/2017 | Johnson et al. | |
| 2018/0267362 A1* | 9/2018 | Gahagan | G02F 1/133504 |
| 2019/0278134 A1 | 9/2019 | Okamoto et al. | |
| 2020/0103582 A1* | 4/2020 | Fattal | G02F 1/133605 |
| 2022/0004058 A1 | 1/2022 | Tsai et al. | |
| 2022/0328736 A1* | 10/2022 | Wang | H01L 27/156 |

* cited by examiner

| Ro = 3.6 | Sz | 1.0 | 1.5 | 2.0 | 2.4 | 2.8 |
|---|---|---|---|---|---|---|
| Encircled Energy | 10 deg | 8.1 | 15.3 | 23.6 | 24.7 | 22.5 |
| | 20 deg | 34.3 | 54.0 | 67.1 | 71.3 | 68.1 |
| | 30 deg | 72.9 | 84.8 | 86.3 | 83.4 | 77.6 |
| | 40 deg | 94.0 | 90.7 | 88.0 | 85.0 | 80.1 |

Results For Each Aperture

|   | Half Width | Power  | Percent Power |
|---|------------|--------|---------------|
| 1 | 10.000     | 1433.5 | 24.663        |
| 2 | 20.000     | 4142.9 | 71.275        |
| 3 | 30.000     | 4844.9 | 83.354        |
| 4 | 40.000     | 4941.5 | 85.016        |
| 5 | 50.000     | 5053.4 | 86.940        |
| 6 | 60.000     | 5381.6 | 92.587        |
| 7 | 70.000     | 5565.2 | 95.746        |
| 8 | 80.000     | 5739.2 | 98.740        |
| 9 | 90.000     | 5800.2 | 99.788        |

FIG. 14A

Results For Each Aperture

|   | Half Width | Power  | Percent Power |
|---|------------|--------|---------------|
| 1 | 10.000     | 1360.6 | 26.071        |
| 2 | 20.000     | 3910.2 | 74.926        |
| 3 | 30.000     | 4521.9 | 86.648        |
| 4 | 40.000     | 4574.6 | 87.657        |
| 5 | 50.000     | 4636.7 | 88.848        |
| 6 | 60.000     | 4896.0 | 93.816        |
| 7 | 70.000     | 5031.3 | 96.409        |
| 8 | 80.000     | 5163.4 | 98.939        |
| 9 | 90.000     | 5208.7 | 99.809        |

FIG. 14B

Results For Each Aperture

|   | Half Width | Power | Percent Power |
|---|---|---|---|
| 1 | 10.000 | 2367.9 | 39.766 |
| 2 | 20.000 | 4861.9 | 81.650 |
| 3 | 30.000 | 5144.8 | 86.400 |
| 4 | 40.000 | 5205.8 | 87.425 |
| 5 | 50.000 | 5275.1 | 88.589 |
| 6 | 60.000 | 5564.8 | 93.453 |
| 7 | 70.000 | 5659.1 | 95.037 |
| 8 | 80.000 | 5770.0 | 96.900 |

FIG. 16A

FLV2 3x3 LEDs (Lambertian) R84_Z13.11 Receiver_84
Forward Simulation Illuminance, Lux FLV2 3x3 LEDs (Lambertian) R84_Z13.11 Receiver_86
Forward Simulation Luminance, Nit Results For Each Aperture

|   | Half Width | Power | Percent Power |
|---|---|---|---|
| 1 | 10.000 | 1116.5 | 22.070 |
| 2 | 20.000 | 2814.4 | 55.631 |
| 3 | 30.000 | 3657.8 | 72.303 |
| 4 | 40.000 | 3968.2 | 78.439 |
| 5 | 50.000 | 4106.5 | 81.172 |
| 6 | 60.000 | 4300.9 | 85.015 |
| 7 | 70.000 | 4446.6 | 87.895 |
| 8 | 80.000 | 4624.8 | 91.418 |
| 9 | 90.000 | 4686.6 | 92.640 |
| 10 | 100.00 | 4709.3 | 93.089 |

FIG. 17A

Results For Each Aperture

|   | Half Width | Power | Percent Power |
|---|---|---|---|
| 1 | 10.000 | 786.52 | 16.093 |
| 2 | 20.000 | 2119.9 | 43.374 |
| 3 | 30.000 | 2954.1 | 60.444 |
| 4 | 40.000 | 3314.0 | 67.807 |
| 5 | 50.000 | 3480.4 | 71.212 |
| 6 | 60.000 | 3752.7 | 76.783 |
| 7 | 70.000 | 3976.9 | 81.371 |
| 8 | 80.000 | 4219.5 | 86.334 |
| 9 | 90.000 | 4324.0 | 88.471 |

FIG. 17B

Results For Each Aperture

|   | Half Width | Power | Percent Power |
|---|---|---|---|
| 1 | 10.000 | 461.39 | 9.6615 |
| 2 | 20.000 | 1339.5 | 28.048 |
| 3 | 30.000 | 2010.4 | 42.099 |
| 4 | 40.000 | 2344.1 | 49.086 |
| 5 | 50.000 | 2592.9 | 54.295 |
| 6 | 60.000 | 3059.0 | 64.055 |
| 7 | 70.000 | 3507.5 | 73.447 |
| 8 | 80.000 | 3930.1 | 82.297 |
| 9 | 90.000 | 4093.6 | 85.720 |

FIG. 17C

Results For Each Aperture

|   | Half Width | Power | Percent Power |
|---|---|---|---|
| 1 | 10.000 | 406.52 | 7.8180 |
| 2 | 20.000 | 1439.7 | 27.688 |
| 3 | 30.000 | 2653.8 | 51.036 |
| 4 | 40.000 | 3670.2 | 70.584 |
| 5 | 50.000 | 4277.2 | 82.257 |
| 6 | 60.000 | 4626.8 | 88.981 |
| 7 | 70.000 | 4762.8 | 91.597 |
| 8 | 80.000 | 4893.2 | 94.104 |
| 9 | 90.000 | 4929.8 | 94.808 |

FIG. 17D

Results For Each Aperture

|   | Half Width | Power | Percent Power |
|---|---|---|---|
| 1 | 10.000 | 635.59 | 15.237 |
| 2 | 20.000 | 1862.2 | 44.643 |
| 3 | 30.000 | 2751.7 | 65.966 |
| 4 | 40.000 | 3220.1 | 77.195 |
| 5 | 50.000 | 3492.8 | 83.733 |
| 6 | 60.000 | 3724.4 | 89.284 |
| 7 | 70.000 | 3932.0 | 94.261 |
| 8 | 80.000 | 4090.7 | 98.065 |
| 9 | 90.000 | 4171.3 | 99.999 |

| | Half Width | Power | Percent Power | Flux Per Area | Orientation |
|---|---|---|---|---|---|
| 1 | 10.000 | 222.96 | 34.523 | 2335.8 | 0.0000 |
| 2 | 20.000 | 436.65 | 67.609 | 1152.3 | 0.0000 |
| 3 | 30.000 | 456.35 | 70.660 | 542.12 | 0.0000 |
| 4 | 40.000 | 471.08 | 72.942 | 320.47 | 0.0000 |
| 5 | 50.000 | 492.19 | 76.209 | 219.29 | 0.0000 |
| 6 | 60.000 | 555.21 | 85.968 | 176.73 | 0.0000 |
| 7 | 70.000 | 610.67 | 94.554 | 147.71 | 0.0000 |
| 8 | 80.000 | 635.38 | 98.381 | 122.37 | 0.0000 |
| 9 | 90.000 | 645.84 | 100.00 | 102.79 | 0.0000 |

| Half Width | Power | Percent Power |
|---|---|---|
| 10.000 | 1348.2 | 23.524 |
| 20.000 | 3279.0 | 57.214 |
| 30.000 | 4154.4 | 72.488 |
| 40.000 | 4664.8 | 81.393 |
| 50.000 | 5077.2 | 88.590 |
| 60.000 | 5379.3 | 93.859 |
| 70.000 | 5574.8 | 97.271 |
| 80.000 | 5687.4 | 99.237 |
| 90.000 | 5731.2 | 100.00 |

FIG. 30C

| Half Width | Power | Percent Power |
|---|---|---|
| 10.000 | 1348.2 | 23.524 |
| 20.000 | 3279.0 | 52.214 |
| 30.000 | 4154.4 | 72.488 |
| 40.000 | 4664.8 | 81.393 |
| 50.000 | 5077.2 | 88.590 |
| 60.000 | 5379.3 | 93.859 |
| 70.000 | 5574.8 | 97.271 |
| 80.000 | 5687.4 | 99.237 |
| 90.000 | 5731.2 | 100.00 |

FIG. 32A

| Half Width | Power | Percent Power |
|---|---|---|
| 10.000 | 2463.1 | 33.047 |
| 20.000 | 4622.1 | 62.014 |
| 30.000 | 4850.8 | 65.082 |
| 40.000 | 5294.7 | 71.038 |
| 50.000 | 5876.5 | 78.843 |
| 60.000 | 6114.2 | 82.033 |
| 70.000 | 6384.3 | 85.657 |
| 80.000 | 6544.6 | 87.808 |
| 90.000 | 6594.2 | 88.473 |

FIG. 32B

| Half Width | Power | Percent Power |
|---:|---:|---:|
| 10.000 | 2658.5 | 35.980 |
| 20.000 | 4401.4 | 59.568 |
| 30.000 | 4721.7 | 63.903 |
| 40.000 | 5491.0 | 74.315 |
| 50.000 | 6013.5 | 81.386 |
| 60.000 | 6249.4 | 84.579 |
| 70.000 | 6419.2 | 86.877 |
| 80.000 | 6529.8 | 88.374 |
| 90.000 | 6570.5 | 88.925 |

FIG. 32C

| Half Width | Power | Percent Power |
|---:|---:|---:|
| 10.000 | 2529.5 | 33.869 |
| 20.000 | 3868.2 | 51.794 |
| 30.000 | 4574.7 | 61.254 |
| 40.000 | 5263.9 | 70.481 |
| 50.000 | 5730.5 | 76.728 |
| 60.000 | 6098.5 | 81.656 |
| 70.000 | 6366.5 | 85.244 |
| 80.000 | 6529.2 | 87.422 |
| 90.000 | 6580.8 | 88.113 |

FIG. 32D

| Half Width | Power | Percent Power |
|---|---|---|
| 10.000 | 2658.5 | 35.980 |
| 20.000 | 4401.4 | 59.568 |
| 30.000 | 4721.7 | 63.903 |
| 40.000 | 5491.0 | 74.315 |
| 50.000 | 6013.5 | 81.386 |
| 60.000 | 6249.4 | 84.579 |
| 70.000 | 6419.2 | 86.877 |
| 80.000 | 6529.8 | 88.374 |
| 90.000 | 6570.5 | 88.925 |

FIG. 34A

| Half Width | Power | Percent Power |
|---|---|---|
| 10.000 | 2205.4 | 29.126 |
| 20.000 | 3845.9 | 50.791 |
| 30.000 | 4371.8 | 57.737 |
| 40.000 | 5063.5 | 66.871 |
| 50.000 | 5618.8 | 74.205 |
| 60.000 | 6011.6 | 79.392 |
| 70.000 | 6332.7 | 83.633 |
| 80.000 | 6549.8 | 86.501 |
| 90.000 | 6622.8 | 87.464 |

FIG. 34B

| Half Width | Power | Percent Power |
|---|---|---|
| 10.000 | 1878.8 | 24.752 |
| 20.000 | 3758.6 | 49.519 |
| 30.000 | 4309.0 | 56.770 |
| 40.000 | 4997.5 | 65.841 |
| 50.000 | 5565.7 | 73.327 |
| 60.000 | 5974.4 | 78.711 |
| 70.000 | 6308.9 | 83.118 |
| 80.000 | 6538.0 | 86.137 |
| 90.000 | 6621.2 | 87.232 |

FIG. 34C

BACK LIGHT UNIT FOR BACKLIT DISPLAYS

CROSS SECTION TO RELATED APPLICATION

The present application claims benefit of U.S. Provisional Patent Application Ser. No. 63/413,030 filed on Oct. 4, 2022, entitled "Back Light Unit for Backlit Displays", U.S. Provisional Patent Application Ser. No. 63/416,633 filed on Oct. 17, 2022, entitled "Back Light Unit for Backlit Displays", U.S. Provisional Patent Application Ser. No. 63/418,826 filed on Oct. 24, 2022, entitled "Back Light Unit for Backlit Displays" and, U.S. Provisional Patent Application Ser. No. 63/425,293 filed on Nov. 14, 2022, entitled "Back Light Unit for Backlit Displays". The entire contents of U.S. Provisional Patent Application Ser. Nos. 63/413,030, 63/416,633, 63/418,826 and 63/425,293 are incorporated herein by reference.

INTRODUCTION

The present invention is generally related to a Back Light Unit (BLU) of a backlit display, particularly for backlit displays with a two dimensional array of Light Emitting Diode (LED) light sources using an array of collimating lenses. In the pursuit of improved image quality, liquid crystal displays (LCDs) are increasingly using a back light unit architecture 100, schematically illustrated in FIG. 1, that includes of an array of individual (blue LEDS, white LEDs or red-green-blue LED cluster) LEDs 112. FIGS. 2A and 2B illustrate a typical intensity distribution of light emitted from a single LED as a function of angle, as measured by a goniophotometer. As illustrated in these figures, the LED source approximates a Lambertian source that emits a substantially symmetrical light distribution relative to the nadir, with the highest intensity of light at the nadir.

Referring back to FIG. 1, a series of films may be used to spread or diffuse the light emitted from the LEDs 112 so that the back light unit 100 delivers a more uniform light to the LCD panel (180) containing the liquid crystals located above the back light unit 100. The back light unit 100 typically includes a diffuser film 120, which may be a volumetric diffuser or a circular diffuser. A color conversion layer 130 may be used if the LEDs are emitting Blue light, for example if the LED uses either quantum dots or phosphor material to convert some of the blue light emitted by the LEDs 110 to green and red light. A diffuser film 140 may be a volumetric diffuser or a circular diffuser resulting from a random textured surface. The diffuser film 140 can be configured to spread or diffuse the light exiting the color conversion layer 130. Two Brightness Enhancing films (BEFs) 150, 160 are often two prism films rotated approximately 90 degrees relative to each other. There may be additional films in the back light unit 100 that are used to improve the overall uniformity and brightness of the light being delivered to the LCD panel. There is generally a reflecting polarizer film 170, such as a dual brightness enhancement film (DBEF), either incorporated with the LCD or below the LCD as a separate film. In some back light units, white LEDs is used without a color conversion layer. By using an array of LEDs, better contrast ratios can be achieved by adjusting the brightness of individual LEDs often referred to as local dimming.

When LEDs 112 are arranged in an array, such as the array illustrated in FIG. 3, it is desirable hide the individual LEDs 112 and present a bright and uniform light to the LCD panel.

As noted above, one approach to achieving this goal is to include one or more diffusers, such as the diffuser film 120, in the back light unit 100 to diffuse, spread, or blur the beams of light emitted by the LEDs 112. In other cases, a series of Micro Lens Array (MLA) films are used, such as described in U.S. Pat. No. 11,181,776, entitled Back Light Unit for Backlit Displays, which is assigned to the present assignee.

It is often desirable to have a narrow light distribution in one or both directions. FIG. 4a shows the output distribution from two high refractive index cross BEF films. It can be see that there is a relative narrow peak in both directions with a full width half max (FWHM of ~36 degrees. However, there are undesirable relatively broad tails to the distribution resulting in >50 percent of the total light have angles >50 degrees. The narrow distribution is achieved because the crossed BEF films only transmit a relatively small fraction of the light (light which approaches at very specific angles) and reflects the rest. The percentage of the light which is reflected from two cross BEF films can be >75%. This reflected light is recirculated and exits on subsequent passes. But each time the light is recirculated, some of it is lost due to absorption and it spreads laterally weakening the impact of local dimming of the LEDs. In some applications, it is desirable to narrow the light in just one direction which can be achieved with a single BEF film as shown in FIG. 4b. However, while the output with a single BEF film is oval in shape, even the narrow direction is quite a bit wider than the example with two crossed BEF films. Alternatively, one could add another film after the crossed BEFs to spread the light in one direction while having a minimum impact on the other direction. In addition, it might be desirable to tilt the light distribution which could also be achieved by adding a directional turning film (DTF). However, each time a film is added with significant back reflectivity it negatively impacts brightness in addition to adding to the cost. Adding films with back reflectivity can also lead to greater cross talk between dimming zones. There are applications where it is possible to have thicker backlight units. This permits some new designs for mini led back light units (BLUs).

SUMMARY

According to an embodiment of the invention, there is provided a display light unit that includes an array of light emitting diodes, with an array of flat lenses with a series of refractive annular segments, which are not necessarily circular and which are sometimes referred to as lenslets that are located a distance above the LEDs. These flat lenses may be referred to more generally as collimating lenses. The collimating lenses can be characterized by their collimation, which is a full width at half maximum (FWHM), measured, for example, in degrees of light that is generated by an LED and emitted from the top surface of each lens. Each flat lens comprises a plurality of annular microstructures having a common center. Each of these annular microstructures has a facet roughly parallel with the LED array surface, a facet which points towards the LED emitting surface, and a facet which refracts the light in the desired direction. In some embodiments, the flat lens is a Fresnel lens. In some embodiments, the flat lens comprises annular microstructures having one facet that is coplanar with the LEDs and an exit facet that varies continuously from almost horizontal in the center of the lens to almost vertical at the outermost annular microstructure of the lens.

In some embodiments, each of the plurality of flat lenses is located above a respective LED and has a resulting output collimation with a FWHM of <40 degrees in one or both directions with reduced light in long tails and less crosstalk between local dimming zones. The flat lens assembly includes a relatively thick layer with a thickness ~50% of the LED grid spacing, which is the spacing distance between individual LED elements, and refractive index much greater than air. The flat lenses are fabricated on the top surface of a thick layer that is also referred to as a substrate. In various embodiments of the Back Light Unit of the present teaching, there is a space above the lenses and below a LCD panel. This space can preferably be air and have a thickness comparable or greater than the LED spacing. In some embodiments of BLU, additional layers are positioned between the flat lens layer and the LCD panel.

In some embodiments, the flat lenses collimate the light much more in one direction than another. Dimensions can be adjusted to change the collimation. In one embodiment, the emitting area of the LED is larger in one direction than the other. In one embodiment, the individual lenslets have disturbances superimposed on the surface to provide additional spreading in one or both directions. In one embodiment, the lenses may be shifted slightly so that they are not directly above each LED resulting in the output beam being tilted.

In one embodiment, there may be an additional film positioned a distance above the plurality of lenses. This additional film may diffuse or spread the light to improve the visual uniformity. The additional film may also spread the light more in one direction than in an orthogonal direction to achieve a desired angular distribution. This additional film may also equalize the angular distribution of the light exiting the second film by incorporating a spatially varying angle bend function. The additional film may also incorporate a light diffusing or spreading feature, which in some embodiments is different micro lenses on opposite sides of the film.

In one embodiment, the material surface between LEDs may be absorbing to minimize crosstalk between dimming zones and/or to enhance collimation since reflected light that is recirculated will not be collimated. In one embodiment, there is a reflecting polarizer below the lens assembly. In one embodiment, the collimation from each lens results in a roughly Gaussian angular distribution. In various embodiments, the refractive index of at least one of the plurality of flat lenses is between 1.5 or 1.57. Also, in various embodiments, the plurality of flat lenses can be configured to collimate in one or two dimensions with a FWHM of less than 40 degrees.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale; emphasis instead generally being placed upon illustrating principles of the teaching. The drawings are not intended to limit the scope of the Applicant's teaching in any way.

FIG. 14a shows the energy distribution for the case (Example 1 with R=80%). FIG. 14b shows the energy distribution for Example 2 of a BLU with and absorbing Printed Circuit Board (PCB).

FIGS. 16a-16c illustrate results for Example 4 of BLU according to the present teaching, where FIG. 16a shows a table of the energy collimation, FIG. 16b presents the intensity distribution measured ~13 mm above the LEDs, and FIG. 16c shows the light intensity ~13 above the LEDs coming out an angle less than plus and minus 10 degrees.

FIGS. 17a, 17b and 17c show tables of angular energy distribution for the embodiments of a microlens array diffuser with a circular FWHM diffusion angle of 20, 30 and 40 degrees respectively facing away from the LEDs for Example 5 of a BLU according to the present teaching. FIG. 17d shows a table of angular energy distribution for the embodiments of a microlens array diffuser with a circular FWHM diffusion angle of 40 degrees respectively towards the LEDs.

FIG. 19a is the embodiment with no angle bend. FIG. 19b is the embodiment replacing inner lenslets with an angle bend structure.

FIGS. 30a, 30b, and 30c show the total illuminance just above collimating lenses, the angular distribution and the encircled energy, respectively, for Example 14 of the BLU according to the present teaching.

FIG. 32a, FIG. 32b, FIG. 32c, and FIG. 32d show the encircled energy for Example 14 of the BLU according to the present teaching with the lens thicknesses of 3.5, 4.0, 5.0, and 6.0 mm, respectively.

FIG. 34a, FIG. 34b and FIG. 34c illustrate the encircled energy for Example 14 of the BLU according to the present teaching with a lens radius of 50 mm and a thickness of 5.3, and 1 mm respectively and an air gap under the solid layer of 0, 1, and 2 mm, respectively.

DESCRIPTION OF VARIOUS EMBODIMENTS

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment. Also, as used in the specification and in the claims, the singular form of "a", "an", and "the" include plural referents unless the context clearly dictates otherwise.

It should be understood that the individual steps of the method of the present teachings can be performed in any order and/or simultaneously as long as the teaching remains operable. Furthermore, it should be understood that the apparatus and method of the present teachings can include any number or all of the described embodiments as long as the teaching remains operable.

Figure 1:
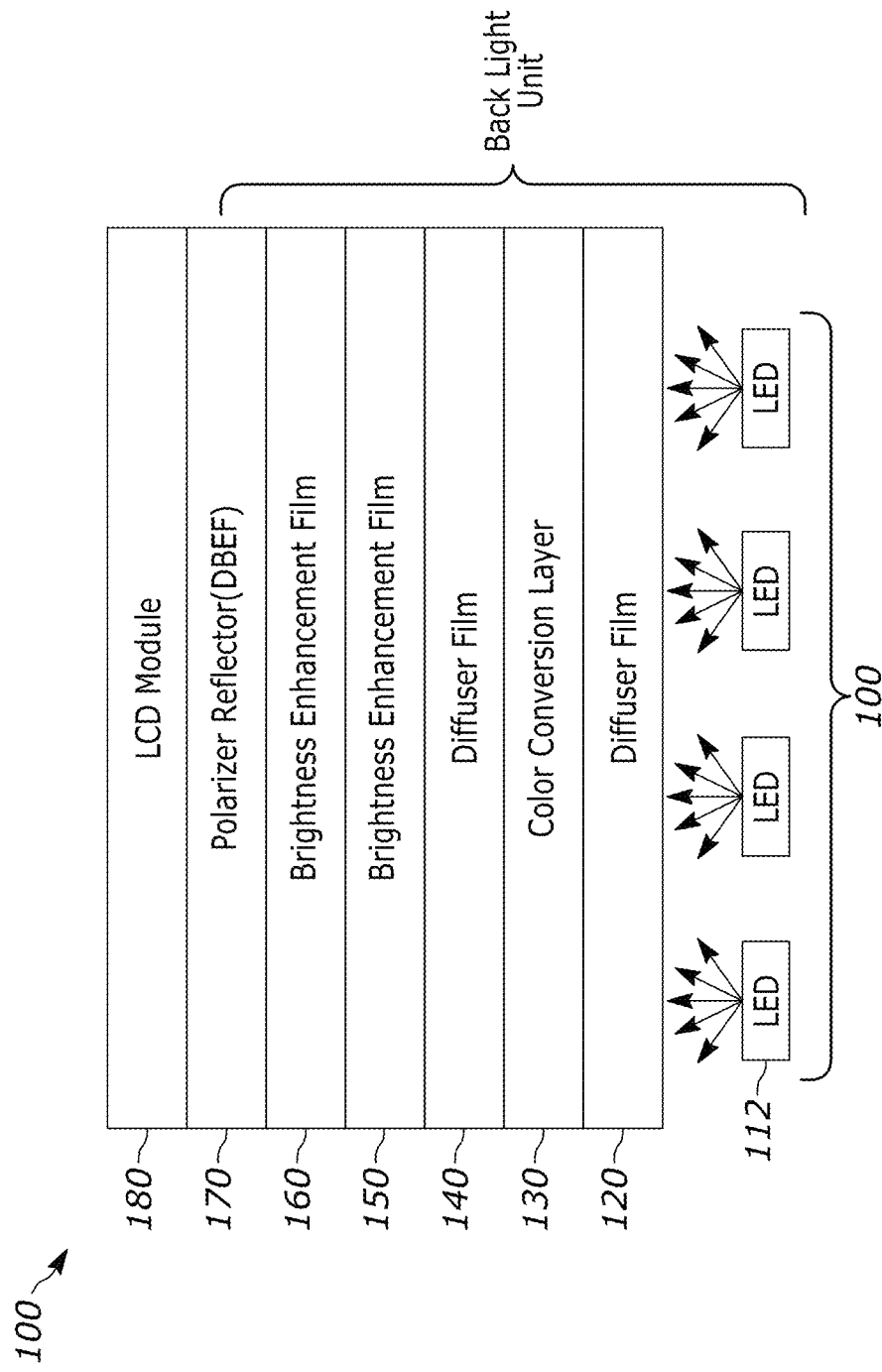
FIG. 1 is a schematic illustration of a typical back light unit that includes an array of LEDs for an LCD display.
Figure 2A:
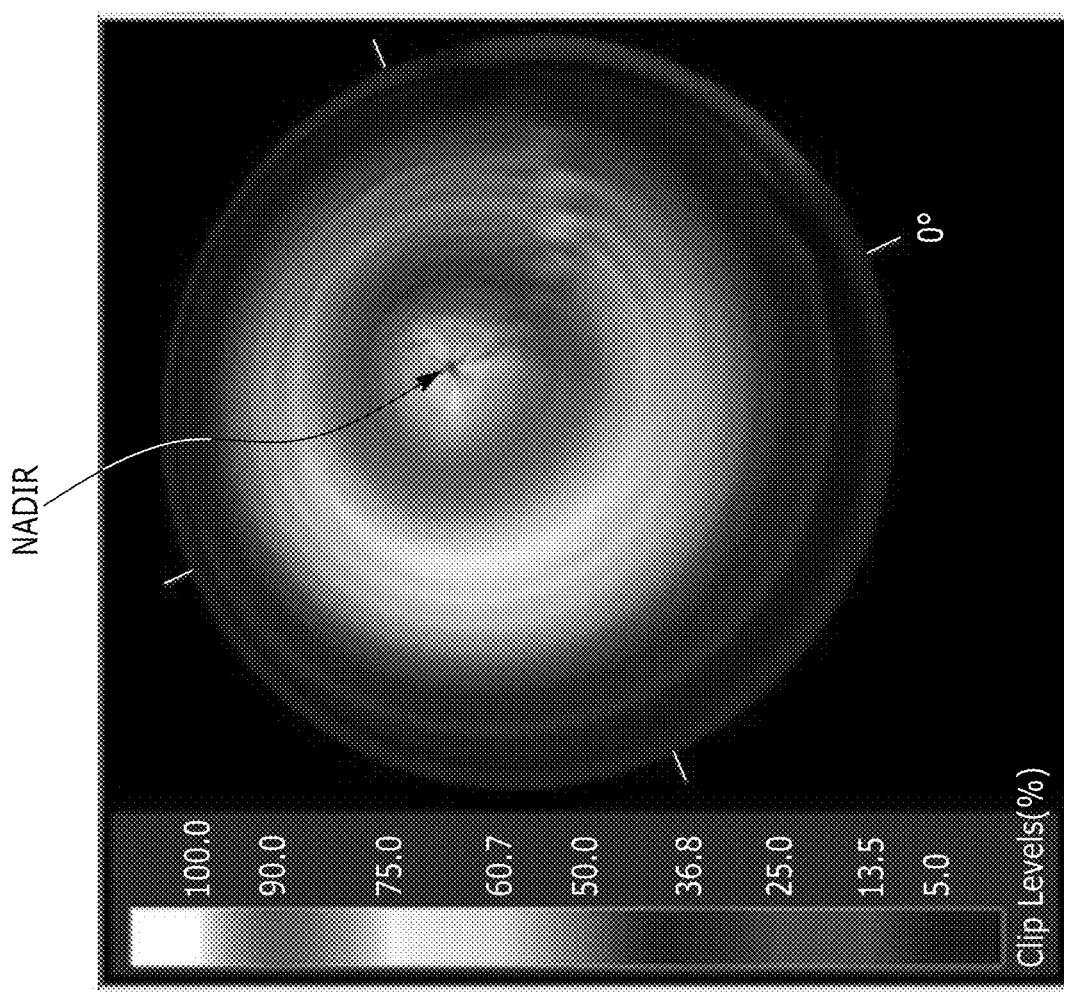
FIG. 2a is a three-dimensional plot of a distribution of light output from an LED as a function of angle, as measured by a goniophotometer.
Figure 2B:
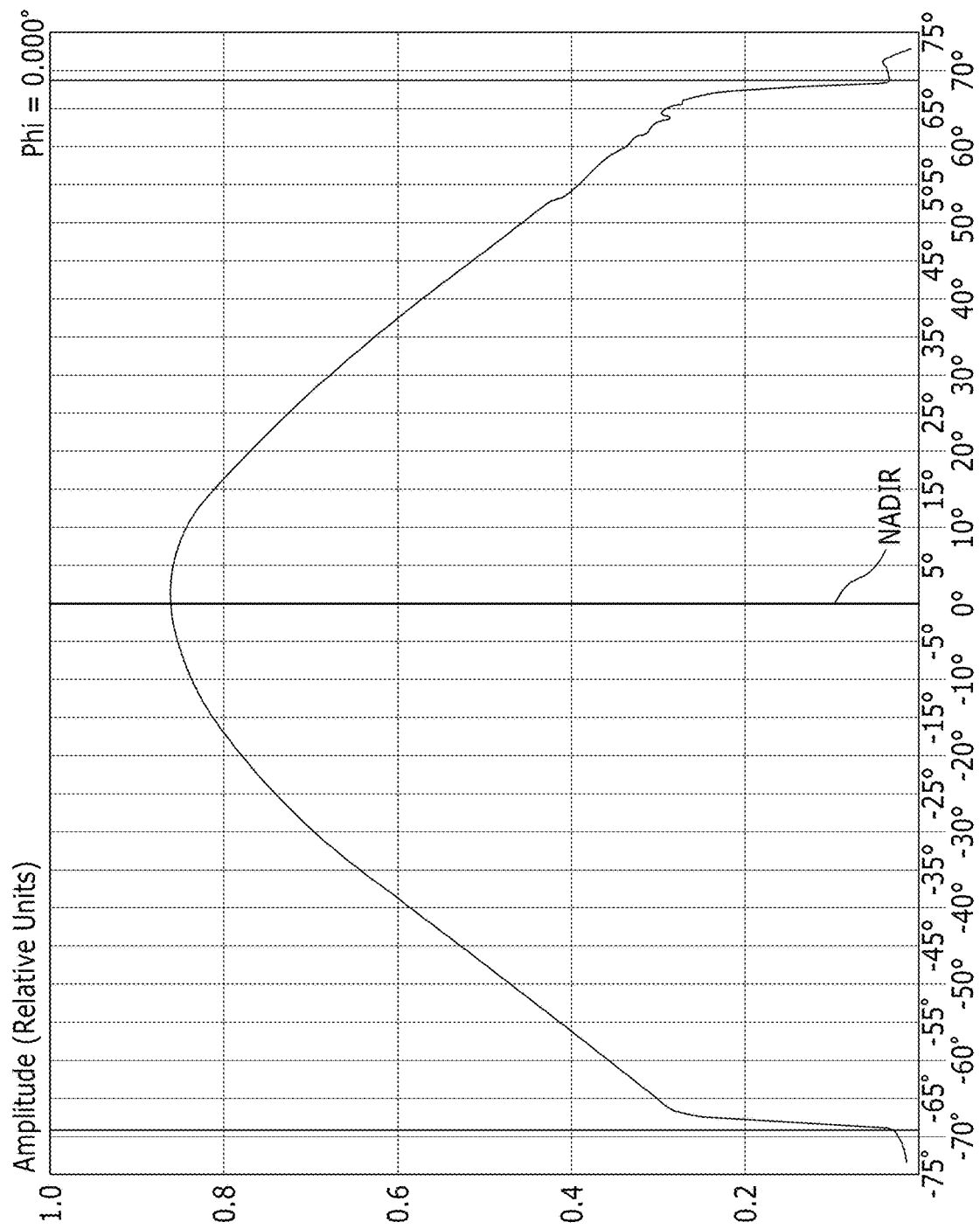
FIG. 2b is the measured light distribution of FIG. 2a represented in two dimensions.
Figure 3:
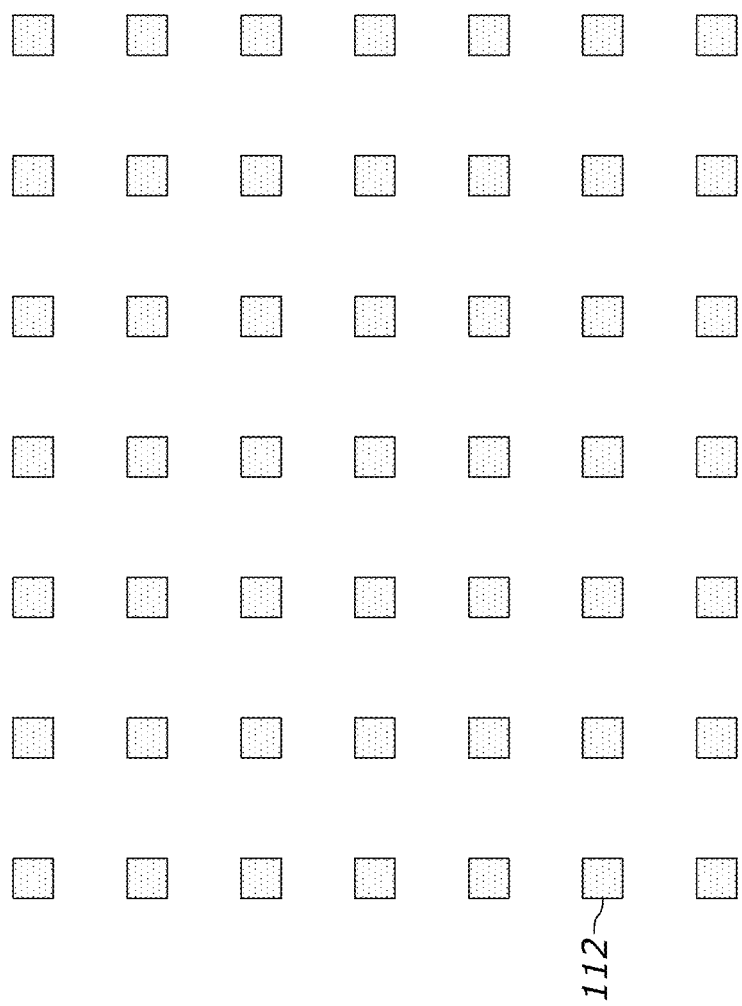
FIG. 3 is a schematic of a two-dimensional array of LEDs.
Figure 4A:
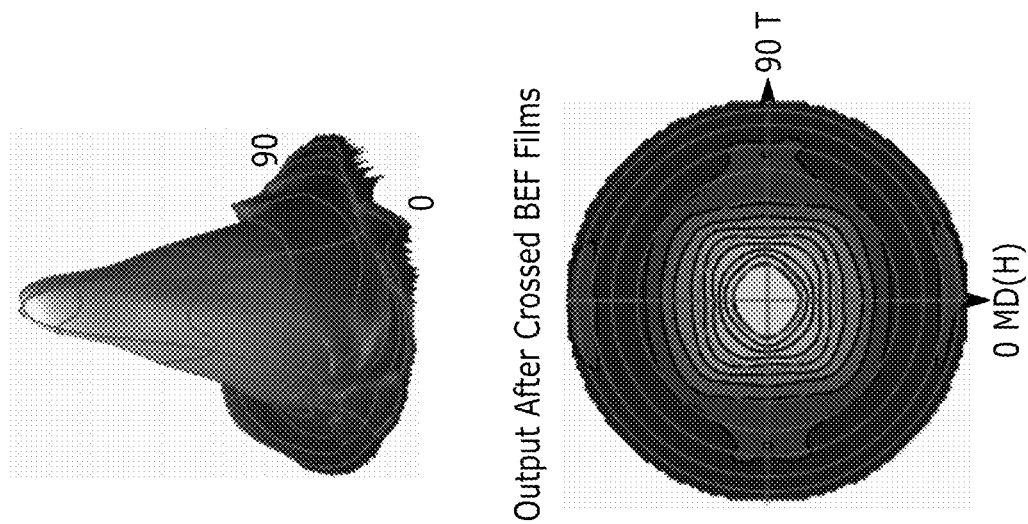
FIG. 4a is a measured output distribution exiting the crossed BEF.
Figure 4A:
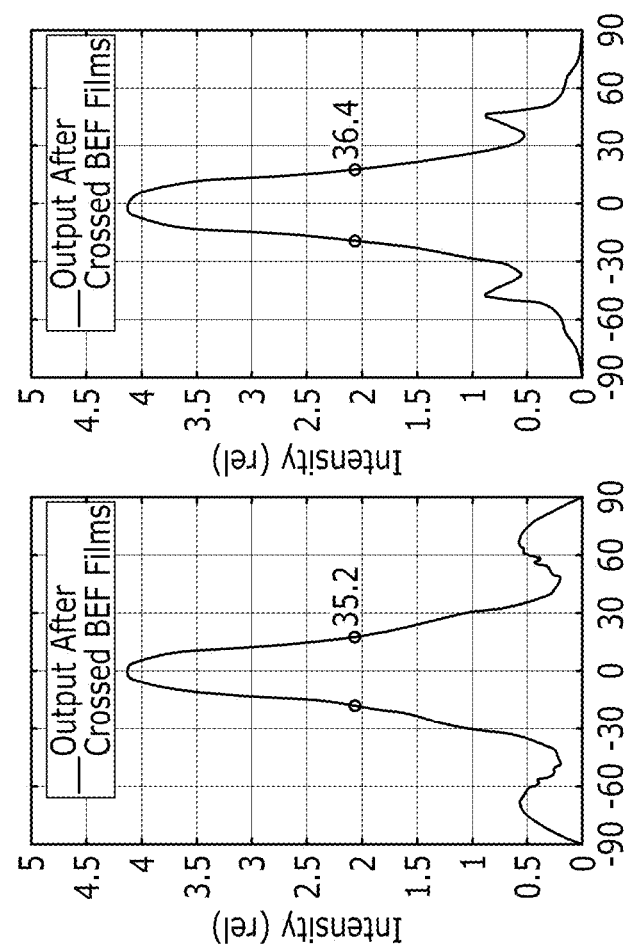
Figure 4B:
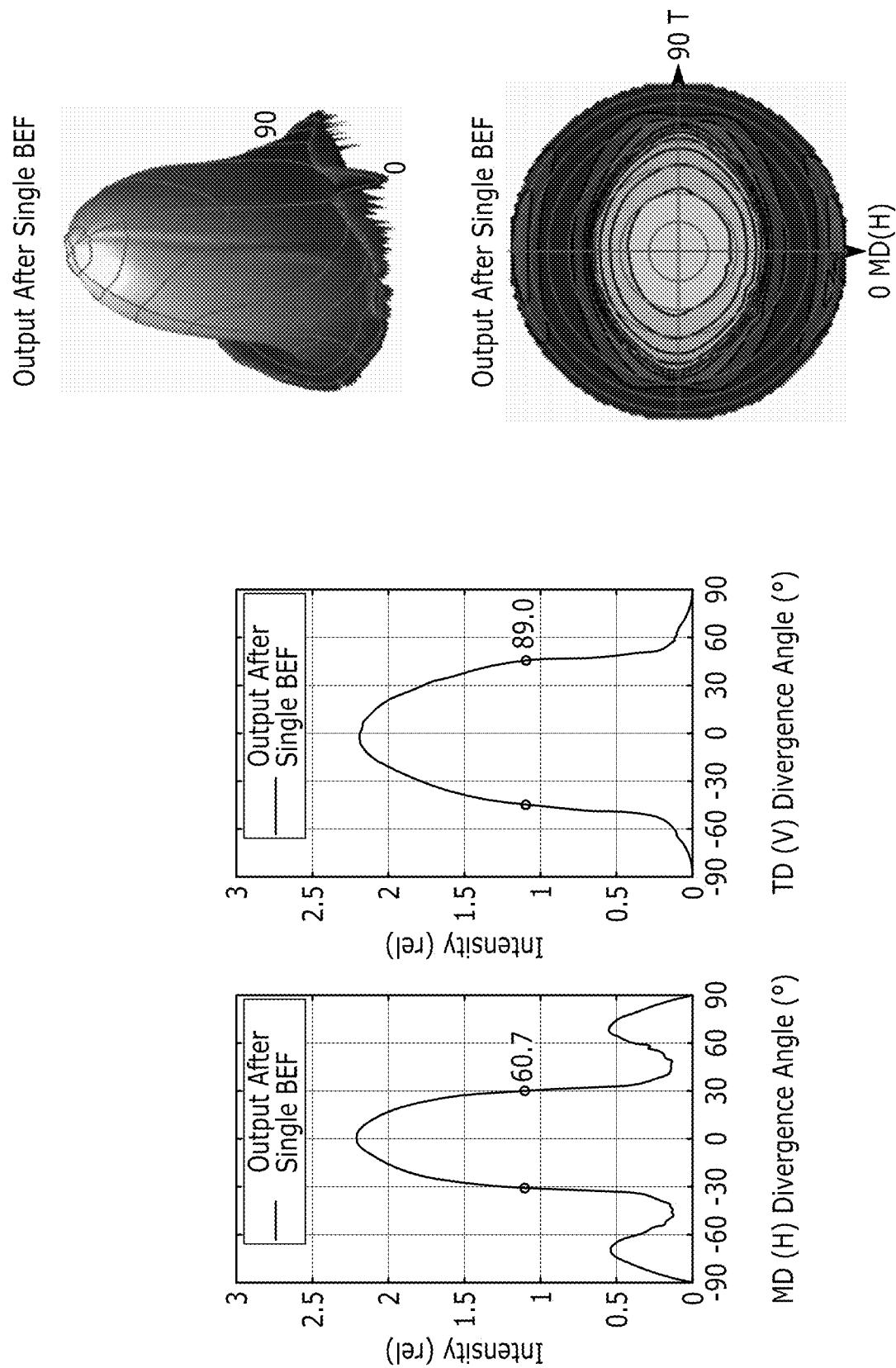
FIG. 4b is measured output distribution exiting a single BEF.
Figure 5:
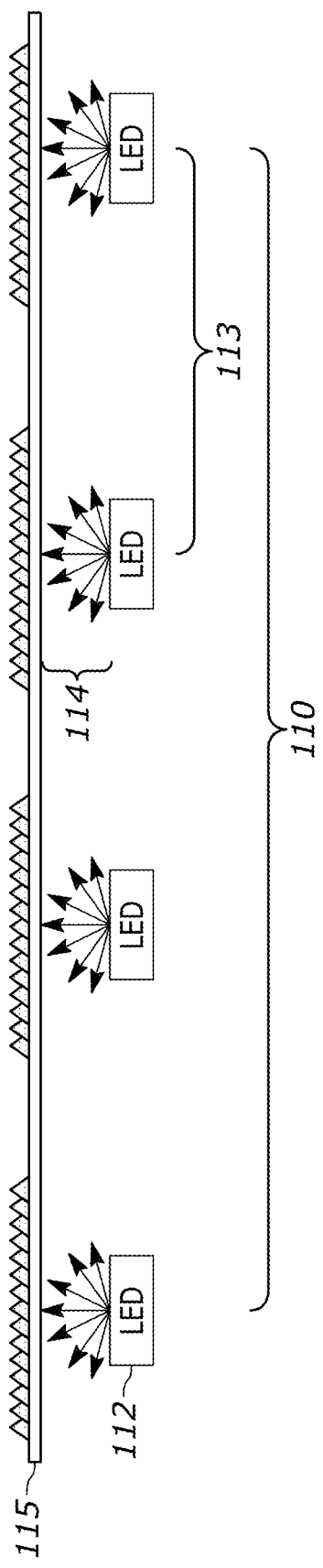
FIG. 5 is an array of LEDs with an array of collimating lenses placed close to the LEDs.

Light Emitting Diodes (LEDs) typically have an emitting area of a few hundred microns to more than a millimeter. The large emitting area is necessary to achieve high brightness from a relatively small number of LEDs. For example, an array of LEDs spaced 6 mm apart in each direction with an emitting surface of 1 mm diameter is shown in FIG. 5. Then, if an array of Fresnel collimating lens on a thin glass sheet or a polymeric film (115) is placed 0.5 mm (114) above the LEDs, the collimation would only be +−45 degrees. And even in configurations with a very small emitting surface area such that narrow collimation could be achieved, the width of the collimated beam exiting the lens would be very small relative to the LED spacing, which would make it very difficult to achieve uniform light intensity entering the LCD panel.

Figure 6:
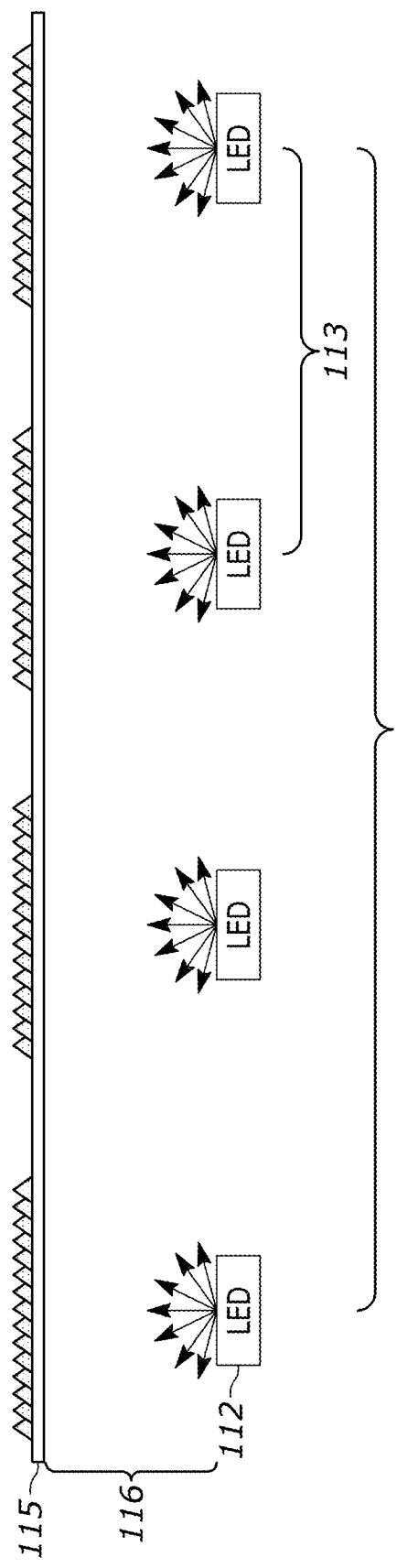
FIG. 6 is an array of LEDs with an array of collimating lenses placed some distance away from the LEDs.

On the other hand, if the film with the collimating lenses on it was spaced 3 mm (115) above the LEDs with air between the lens array layer and the LEDs and covering almost the entire surface as seen in FIG. 6, the result would also be very poor collimation because the high angle light rays exiting an LED would not enter the lens located above the LED. Instead, the light rays would rather enter one of the neighboring lenses and exit at a high angle resulting in high crosstalk between dimming zones and only a small fraction of the light being collimated.

Figure 7:
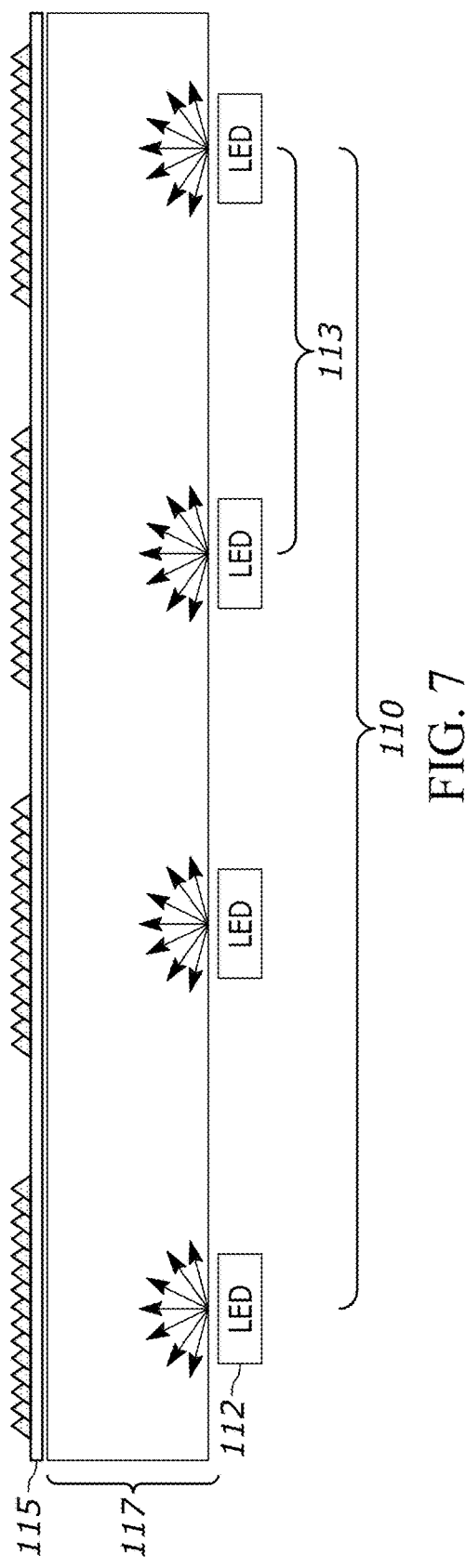
FIG. 7 is an array of LEDs with an array of collimating lenses placed some distance away from the LEDs with a relatively thick layer of high index material between the LEDs and the lenses.

In an embodiment of the invention shown in FIG. 7, a thick layer of optically clear material 117 with a refractive index of 1.5 is placed between the LEDs 112 and the lens film 115 with a small air gap between the LED emitting area and the lower surface of 117. In another embodiment, the clear material layer 117 could be part of the lens layer 115. Note the substrate layer of 115 or the lenses layer 115 may have different refractive indices relative to clear material layer 117. The light exiting from the LEDs 112 has a distribution of all angles between plus and minus 90 degrees but, once it enters the clear material layer 117 with a refractive index of 1.5, then the light is confined to angles between plus and minus 45 degrees. If the refractive index of the clear material of layer 117 is 1.57, then the light is confined between plus and minus 39.6 degrees. If the refractive index of the clear material of layer 117 is 1.75, then the light is confined between plus and minus 34.8 degrees. If the refractive index of the clear material of layer 117 is 2.0, then the light is confined between plus and minus 30 degrees.

This now allows one to adjust the thickness of layer 117 such that the maximum lateral spreading of the light from a given LED is half the spacing between the LEDs. For the embodiment of a refractive index of 1.5 and a 6 mm LED spacing with an emitting region diameter of 1 mm, the thickness could be about 2.5 mm thick. This added distance results in the LED acting much more like a point source allowing the light to be collimated to less than plus or minus 15 degrees. Another advantage of this configuration is that essentially all the light exiting a given LED is captured by the lens directly above the LED. This configuration minimizes cross talk and achieves the narrowest collimation. In addition, the collimated light exiting the lens layer 115 has a lateral dimension almost spanning the LED spacing which greatly facilitates achieving a uniform intensity entering the LCD panel.

Figure 8:
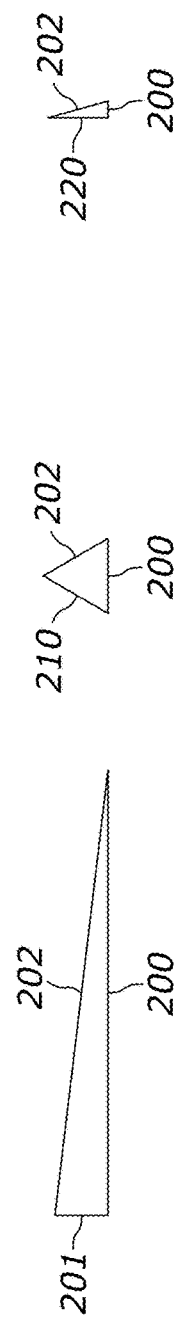
FIG. 8 is an illustration of lenslets of a conventional Fresnel lens.

Each of the annular lenslets can be approximated and described by a prism having a facet along a parallel surface to the LED surface and an exit facet that refracts the light in a desired direction. An annular lenslet can also be referred to as an annular segment. The shape of the segment can be described as a microstructure having a prism shape. While the shape is nominally a prism structure and can be described by the angles and positions of various facets of the prism, it is understood that, in practice, the light exiting facet usually has some curvature. For a conventional Fresnel lens, one facet 200 (FIG. 8) is coplanar with the surface with the LEDs 112, a second facet 201 is perpendicular to this surface, and the remaining surface 202, which the refracted light exits from, varies from being almost coplanar with the first facet 200 in center of the lens to becoming increasingly steeper 210 as move radially outwards. The problem is that when we reach the outer edge of the lens, the exiting facet of the lenslet 220 needs to be almost perpendicular to facet 200. This results in extreme number of lenlets, which presents extreme fabrication difficulties to fabricate very narrow facets with extremely steep small top vertex angles. The high number of lenslets will also result in much more undesired scattering.

Figure 9:
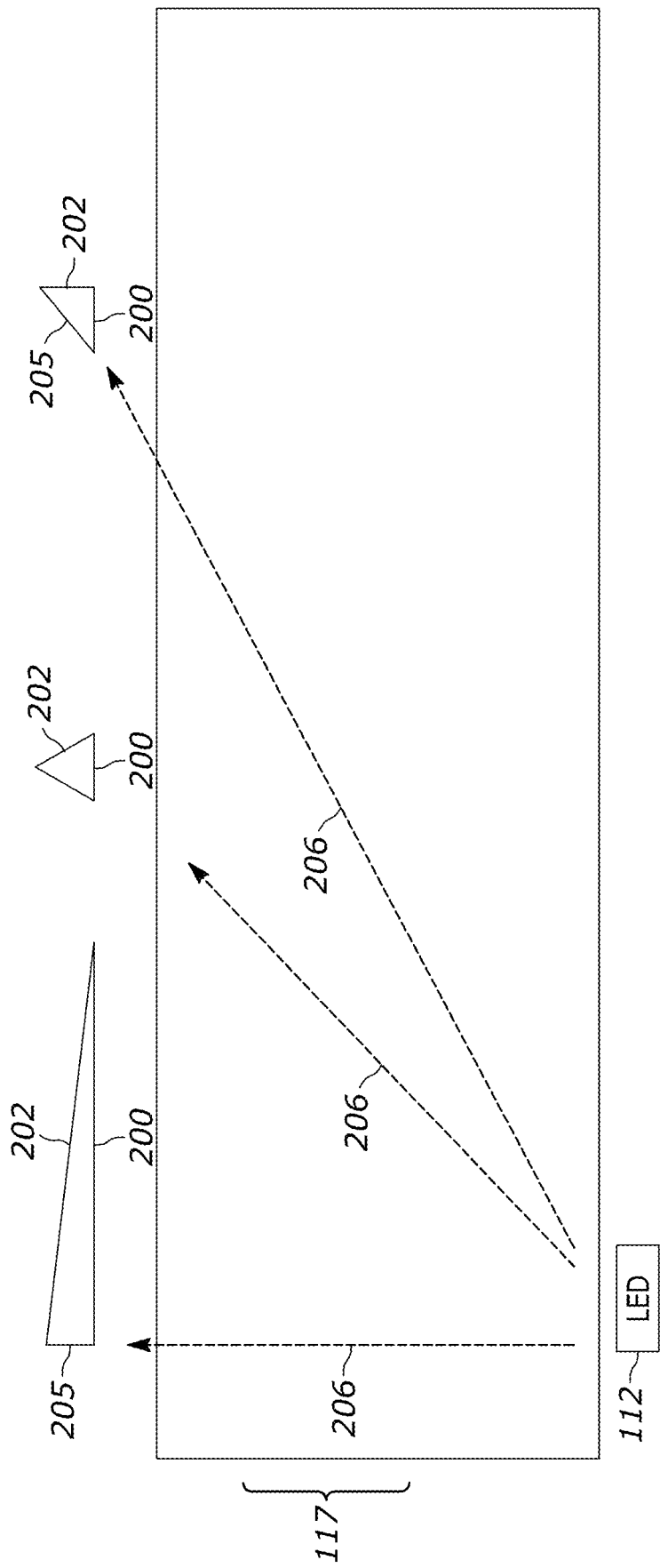
FIG. 9 is an illustration of lenslets of collimating lenses of an embodiment of the invention.

In one embodiment of a flat lens comprising annular lenslets in the shape of prisms, half of a lens is shown in FIG. 9. The annular lenslets can also be referred to as annular segments. In the configuration shown, the bottom facet remains coplanar with the plane of the LEDs, the exiting facet 202 varies continuously from almost horizontal in the center of the lens to almost vertical at the outermost lenslet. The exiting facet 202 of the third prism 205 which is vertical for conventional Fresnel lenses in this configuration varies continuously.

Such lens structures may be fabricated using many techniques known in the art. For example, the shape of the light splitting microstructure may be cast onto a substrate using a suitable master mold, and then a thermally-curing polymer or ultraviolet (UV) light curing polymer is used to form the lens structure. Alternatively, the shape may be impressed into a thermoplastic substrate through compression molding or other molding, or may be created at the same time as the substrate using extrusion-embossing or injection molding. The microstructures may also be produced by replicating a master. For example, an optical film may be made by replication of a master containing the desired shapes as described, for example, in U.S. Pat. No. 7,190,387 B2 to Rinehart et al., entitled "Systems and Methods for Fabricating Optical Microstructures Using a Cylindrical Platform and a Rastered Radiation Beam"; U.S. Pat. No. 7,867,695 B2 to Freese et al., entitled "Methods for Mastering Microstructures Through a Substrate Using Negative Photoresist"; and/or U.S. Pat. No. 7,192,692 B2 to Wood et al., entitled "Methods for Fabricating Microstructures by Imaging a Radiation Sensitive Layer Sandwiched Between Outer Layers", which is assigned to the assignee of the present invention. The entire disclosures of all of these references are incorporated herein by reference. The masters themselves may be fabricated using laser scanning techniques described in these and may also be replicated to provide microstructures using replicating techniques described in these references.

In one embodiment, projection or contact photolithography, such as used in semiconductor, display, circuit board, and other common technologies known in the art, may be used to expose the microstructures into a photosensitive material. In one embodiment, laser ablation, either using a mask or using a focused and modulated laser beam, may be used to create the microstructures including the indicia in a material. In another embodiment, micromachining (also known as diamond machining), may be used to create the desired microstructures from a solid material. In yet another embodiment, additive manufacturing (also known as 3D printing), known in the art, may be used to create the desired microstructure in a solid material.

Thus, back light units for backlit displays according to the present teaching include a back light unit includes a plurality of light emitting diodes positioned on a substrate and a plurality of flat lenses. In one embodiment, at least one of the plurality of light emitting diodes comprises an emitting area that is greater in one dimension. A respective one of the plurality of flat lens is positioned a distance above a respective one of the plurality of light emitting diodes. In one embodiment, at least some of the plurality of flat lens are configured to collimate light generated by adjacent ones of the plurality of light emitting diodes in a Gaussian angular distribution.

In one embodiment, common centers of each of the plurality of annular segments of the plurality of flat lenses are vertically aligned to respective ones of centers of emission of the plurality of light emitting diodes. In another embodiment, common centers of the plurality of annular segments of the plurality of flat lenses are spatially offset from centers of emission of the at least some of the respective ones of the plurality of light emitting diodes.

At least one of the plurality of flat lenses can be a Fresnel lens. In one embodiment, a thickness of at least one of the plurality of flat lenses is between 45-55% of a spacing distance of the plurality of light emitting diodes. In one embodiment, at least one of the plurality of flat lenses is configured to collimate asymmetrically. Also, in one embodiment, at least one of the plurality of flat lens is configured to provide the same collimation in all directions. Also, in one embodiment, at least one of the plurality of flat lens comprises disturbances superimposed on a surface that are configured to provide additional spreading in one or two dimension. In some embodiments, a reflecting polarizer film is positioned adjacent to the plurality of flat lens.

Each of the plurality of flat lenses includes a plurality of annular segments having a common center. Each of the plurality of annular segments includes a prism shape microstructure having a first facet configured to refract the light in a desired direction and a second facet oriented in a plane that is parallel to a plane of an emitting surface of respective ones of the plurality of light emitting diode. In one embodiment, at least one of the plurality of annular segments comprises a circular segment. Also, in one embodiment, the first facet of an inner-most one of the plurality of annular segments is positioned parallel to the plane of the emitting surface of the respective one of the plurality of light emitting diodes. Also, in one embodiment, the first facet of an outer-most one of the plurality of annular segments is positioned perpendicular to the plane of the emitting surface of the respective one of the plurality of light emitting diodes. In one embodiment, the first facet of at least one of the plurality of annular segments is determined to match a spherical lens having a radius. In one embodiment, an angle of the first facet of at least one of the plurality of annular segments is determined to match a spherical lens. The angle of the first facet of at least one of the plurality of annular segments can be defined by the Fresnel equation, which can be subject to subsequent scaling by a factor between 0.5 to 1.0.

Also, in one embodiment, the first facet of successive ones of the plurality of annular segments are positioned with an angle that varies continuously from the first facet of an inner-most one of the of the plurality of annular segments being positioned parallel to the plane of the emitting surface of the respective one of the plurality of light emitting diodes to the first facet of the outer-most one plurality of annular segments being positioned parallel to the plane of the emitting surface of the respective one of the plurality of light emitting diodes.

In numerous embodiments, an optical film is positioned between the plurality of flat lenses and the plurality of light emitting diodes. The optical film can be configured to diffuse light transmitting through the optical film in order to improve visual uniformity. The optical film can be configured to spread light transmitting through the optical film in two dimensions to achieve a predetermined angular distribution. In one specific embodiment, the two dimensions are orthogonal dimensions. Also, the optical film can be configured to equalize the angular distribution of the light transmitting through the optical film by incorporating a spatially varying angle bend. In one specific embodiment, the optical film is formed with a plurality of microlenses formed on a first surface. A second plurality of microlenses can also be formed on a second opposite surface. In some configurations, at least some of the microlenses on the first surface are different from some of the microlenses on the second surface. In another embodiment, the optical film can include a light absorbing material that minimizes crosstalk between dimming zones and/or enhances collimation by recirculating reflected light.

The following are specific examples of back light units for backlit displays according to the present teaching. In Example 1, a 3×3 array of LEDs spaced 7 mm apart, with a height of 0.5 mm and with a Lambertian emission from an area ~1.5 mm by 1.5 mm for each LED was modelled using light tools. The vertical boundaries were assumed to be perfect specular reflectors in order to simulate a case of an infinite array of LEDs. The PCB was assumed to have a reflectivity of 80%.

Figure 10:
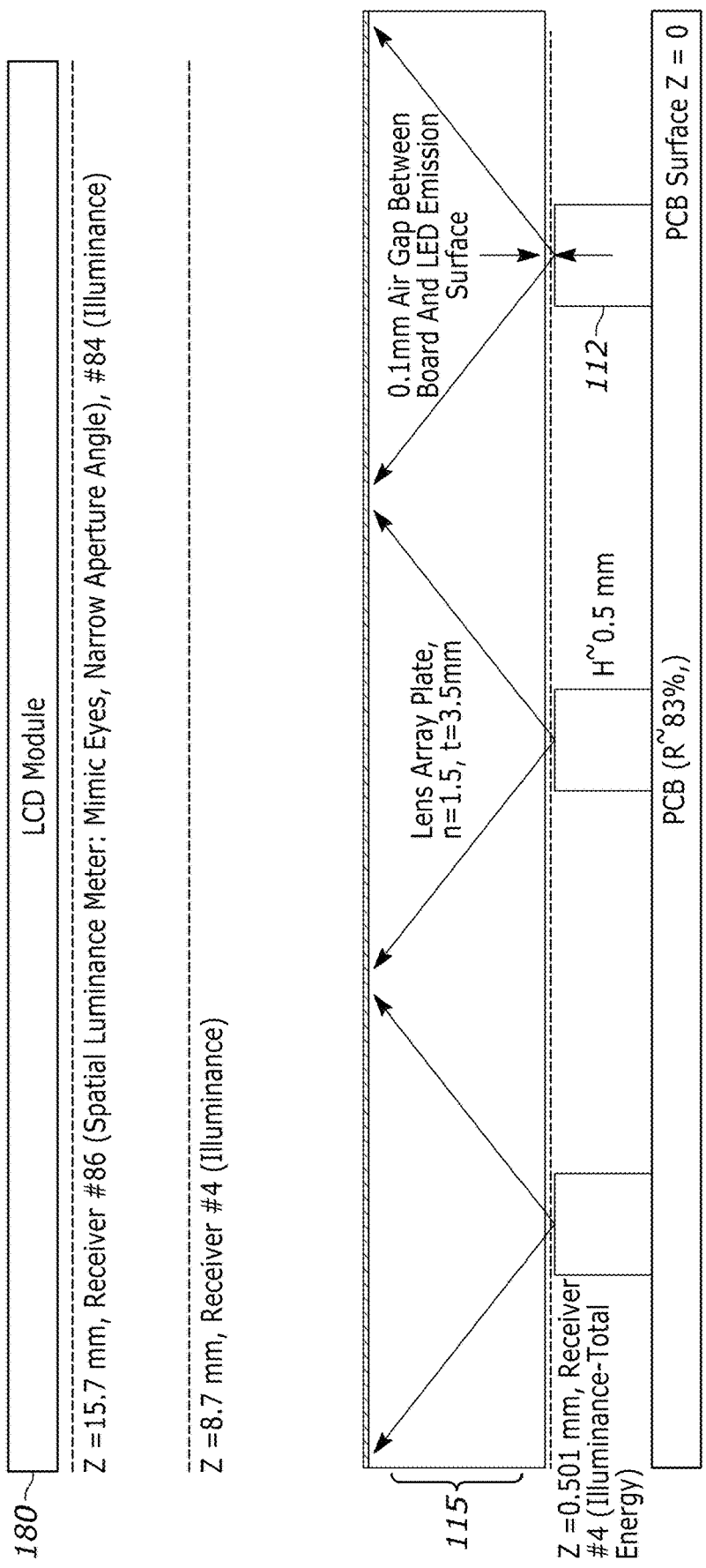
FIG. 10 is an illustration of Example 1 of a back light unit (BLU) according to the present teaching.

Referring to FIG. 10, the location of different virtual detection surfaces which are represented by dashed lines are shown. The LCD panel 180 is about 16 mm above the PCB.

Figure 11B:
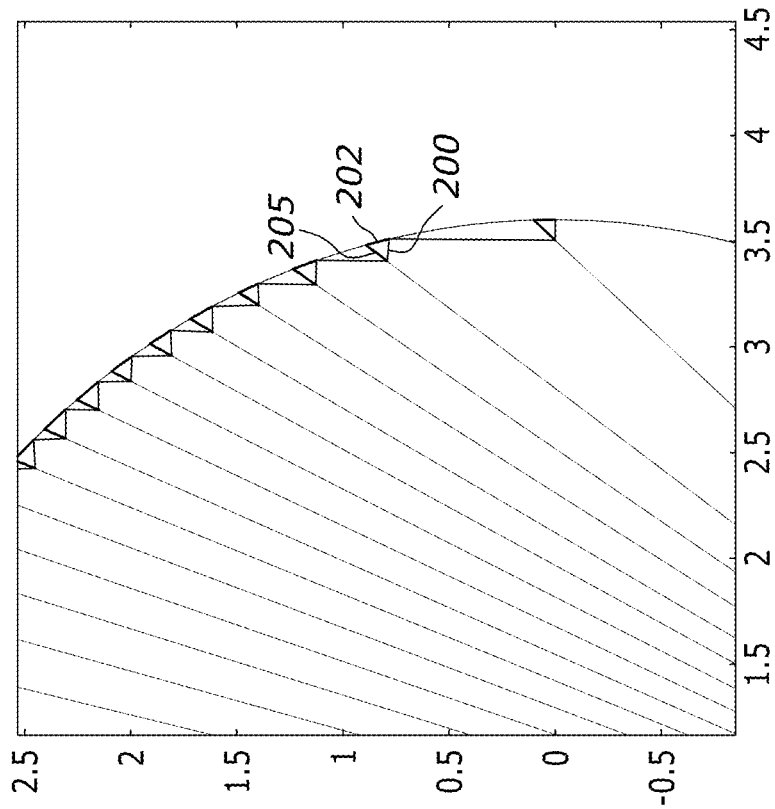
FIGS. 11a and 11b are illustrations of lenslets formed with the functional facets being from a portion of a spherical lens.
Figure 11A:
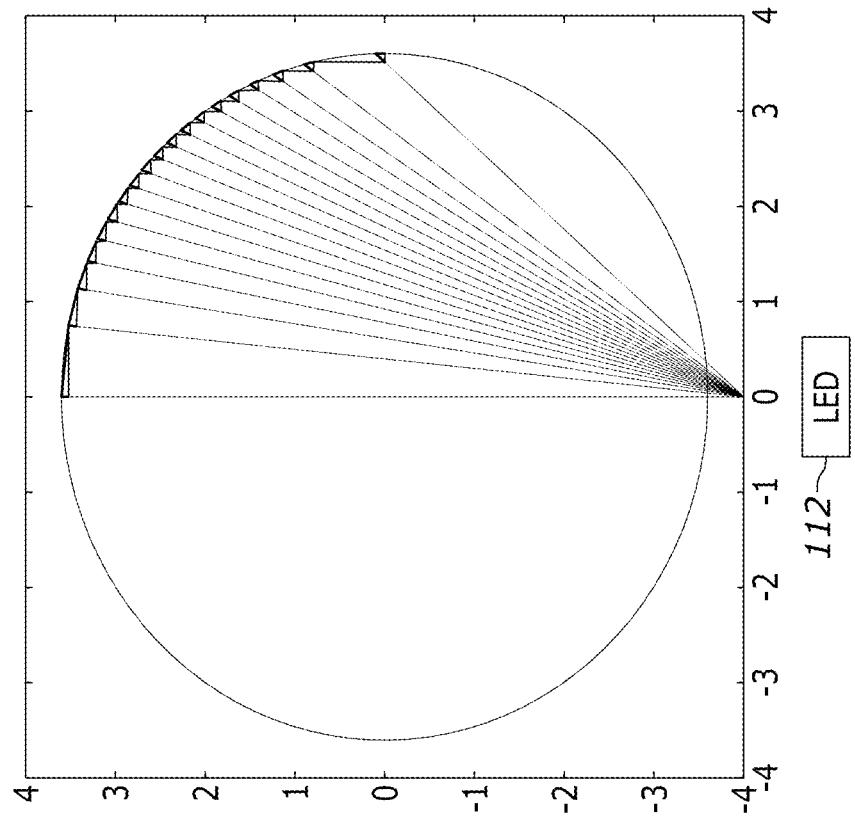

The lens array layer 115 in this case includes a thick substrate with a total thickness of 3.5 mm and a refractive index of 1.5. The shape of the light exiting (functional) facets on the lenslets were assumed to be from a spherical lens of 3.5 mm radius as shown in FIGS. 11a and 11b. The resultant angular output distribution is shown in FIG. 12, which indicates very poor collimation.

Figures 12, 13A:
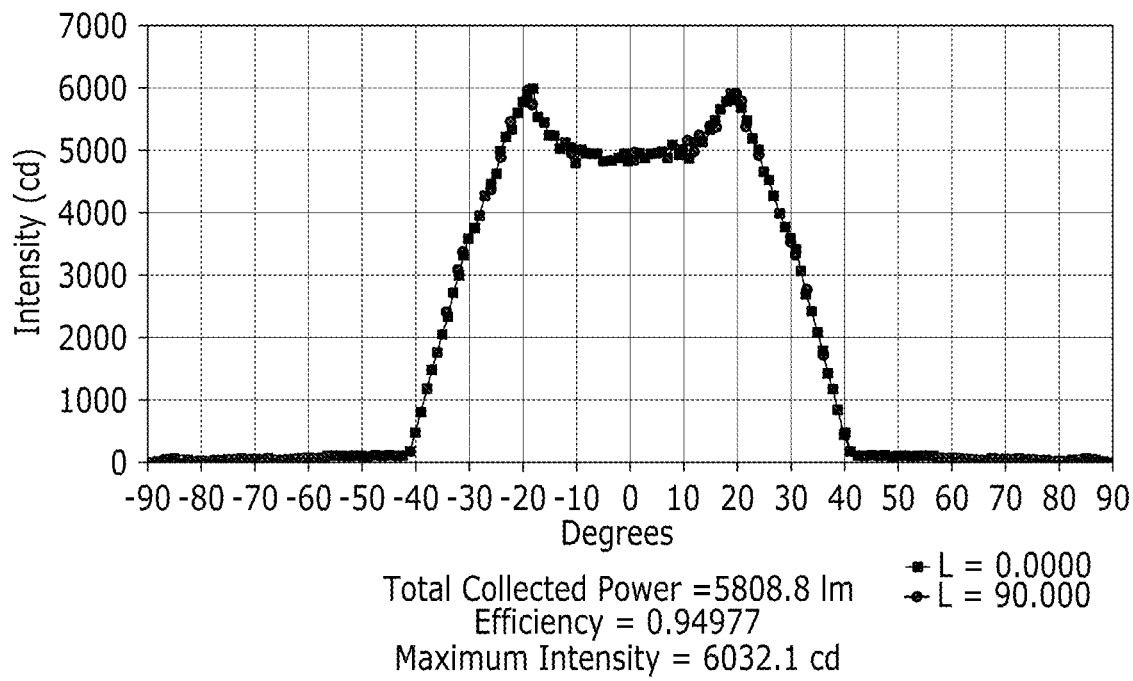
FIG. 12 illustrates angular beam profile using a lens profile with spherical radius equal to 3.5 mm for Example 1 of a BLU according to the present teaching.
FIG. 13a presents a Table showing the optimization of the lens shape to improve the degree of collimation for Example 1 of a BLU according to the present teaching.
Figure 13B:
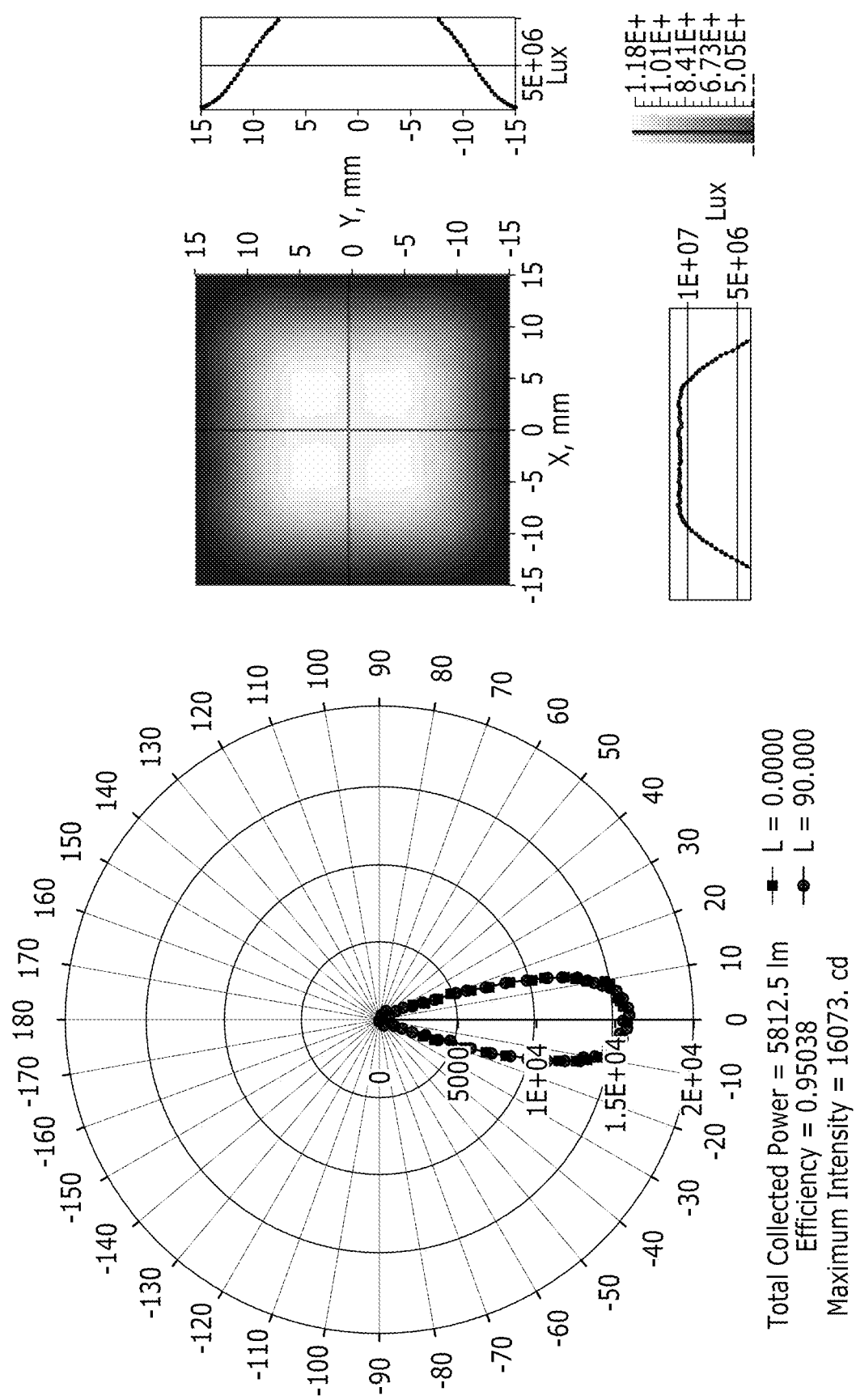
FIG. 13b shows the energy uniformity and angular distribution for the optimal case presented in the Table described in connection with FIG. 13b for the SZ ratio equal to 2.4

FIG. 13a shows the results in the form of a table of an optimization of adjusting lens radius and stretch the lens in the vertical direction by different amounts. It can be seen with a lens radius of 3.6 mm and a stretch ratio (SZ) of 2.4, that very good collimation is achieved with 71% of the energy being confined within an angle of +−20 degrees. FIG. 13b shows the energy uniformity and angular distribution for the optimal case presented in table 13a for the SZ ratio equal to 2.4. FIGS. 14a and 14b show the energy uniformity at detector 84 located 13.7 mm above the PCB. It can be seen that good energy uniformity is achieved.

In Example 2, the reflectivity of the PCB is changed from 80% to 0 (i.e., absorbing). Any light reflected back to the PCB will not be well collimated. Thus, the collimation can be improved by removing reflected light. FIGS. 14a and b compares the energy distribution for the Example 1 with R=80% to Example 2 with and absorbing PCB. It can be seen that changing the PCB from reflecting to absorbing increases the energy within plus and minus 20 degrees from 71 to ~75%.

Figure 15A:
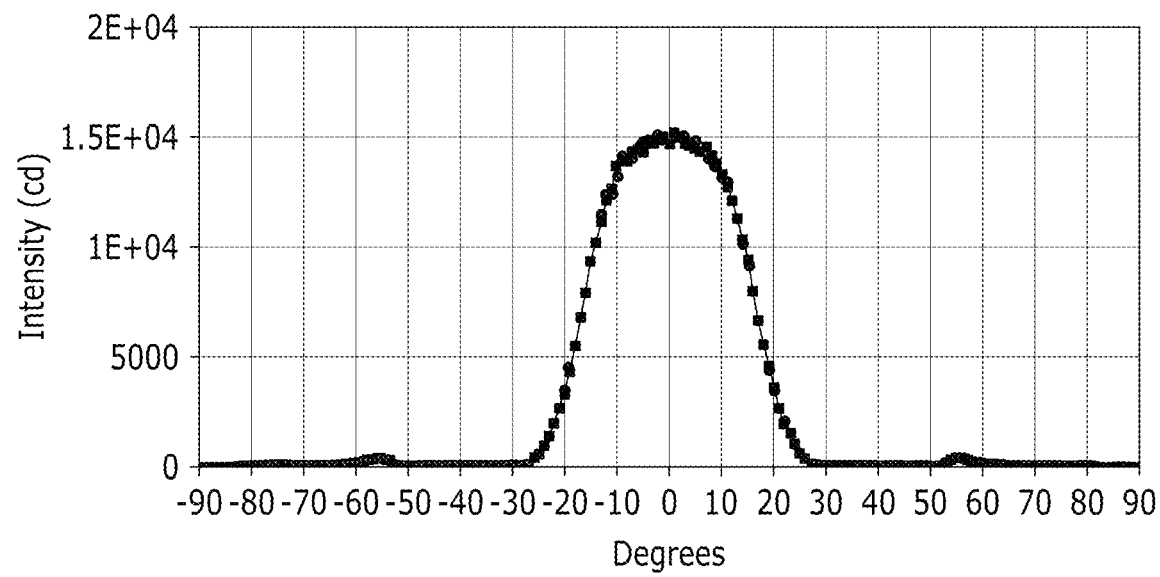
FIG. 15a shows the angular distribution of light for Example 2 of a BLU according to the present teaching.
Figure 15B:
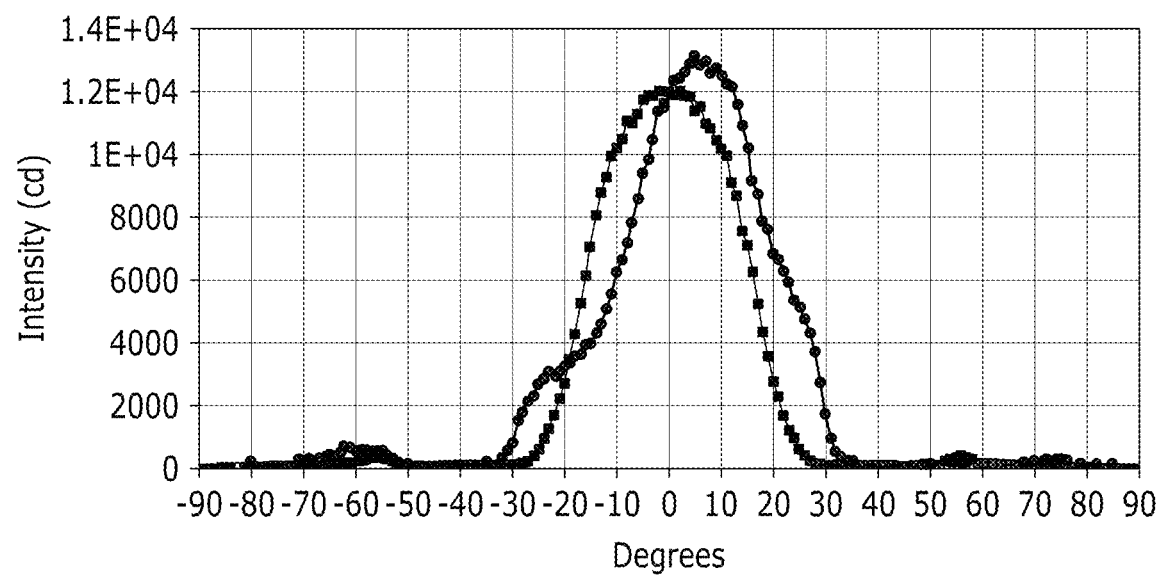
FIG. 15b shows the angular distribution for Example 3 of a BLU according to the present teaching.

Example 3 is the same as Example 2 except the lens array is shifted 0.5 mm relative to the LEDs in the L=0 direction. FIGS. 15a and b show a shift of 0.5 mm results in ~an 8 degree shift in the output distribution and the efficiency decreases by ~2%, which is significantly better than what could be achieved by using a prismatic direction turning film.

Figure 16B:
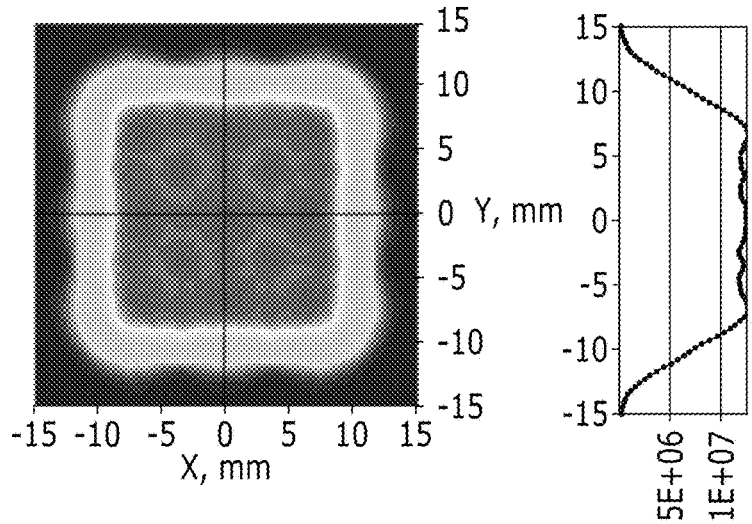
Figure 16C:
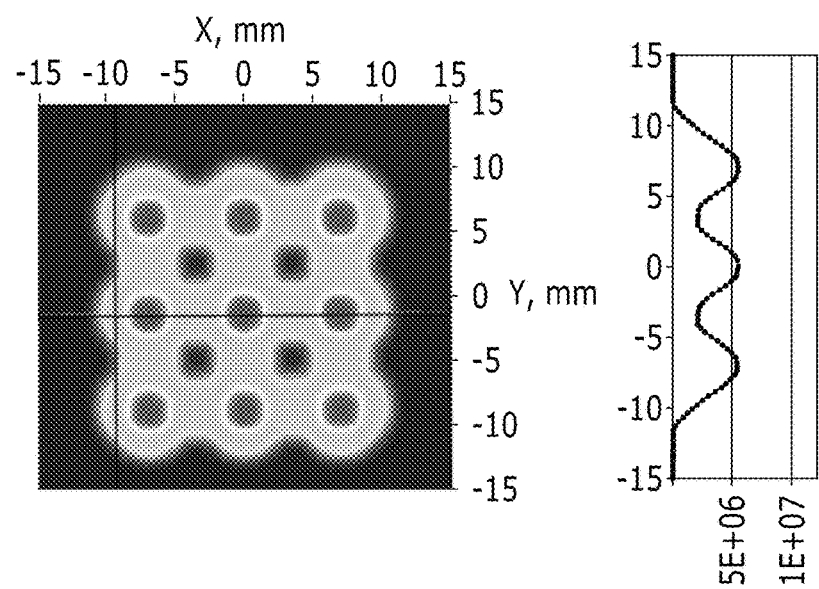

Example 4 is similar to Example 3 except the emitting area of the LEDs is smaller being 1 mm by 1 mm and detectors 84 and 86 are located ~13 mm above the LEDs. FIG. 16a shows that the smaller emitting area results in better collimation and similar uniformity of the intensity, which is illustrated in FIG. 16b. However, it is also important to examine the uniformity of the angular distribution of the light at the distance of ~13 mm above the LEDs. FIG. 16c illustrates the light intensity about 13 above the LEDs coming out an angle less than plus and minus 10 degrees. It can be seen in FIG. 16c (detector 86) that the intensity of more collimated light is much higher directly above the LEDs than between the LEDs. This is often undesirable from the standpoint of visual uniformity.

In Example 5, a diffusing micro lens array is added at a location just below the detectors 84 and 86 for LED s with a spacing of 7 mm and an emitting area of 1.5 by 1.5 mm. FIGS. 17a-d illustrate data with the addition of a circular micro lens diffuser decreases the collimation with the impact being greater the higher the diffusion. Also comparing FIGS. 17c and 17d, it can be seen that better collimation is retained if the micro lens structure faces towards the LEDs. FIGS. 18a-f illustrate how the strength of the diffusion impacts the uniformity of the intensity of the narrow angle light intensity of detector 86. The stronger the diffusion, the better the uniformity. Also, in FIG. 18d, it is seen that if the micro lens array texture faces away from the LEDs the uniformity is better than if it faces towards the LEDs.

In Example 6, the detectors 84 and 86 and the diffuser are moved higher by about 2 mm. It can be seen in FIGS. 18e and 18f that both the energy intensity and narrow angle intensity improve significantly.

Figure 19A:
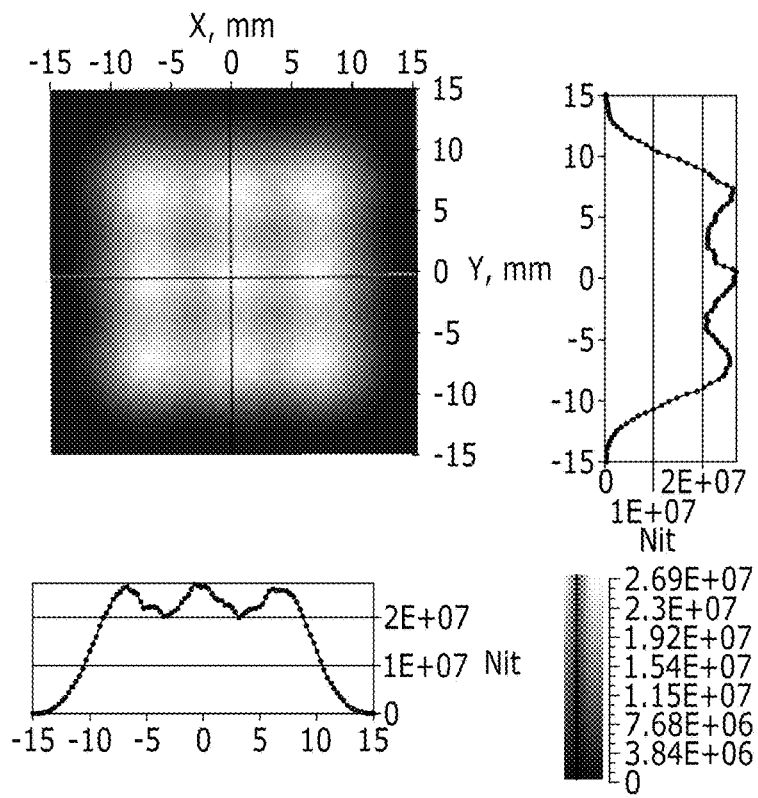
FIGS. 19a and 19b show the uniformity of the intensity of the narrow angle light (detector 86) exiting the diffuser for Example 7 of the BLU according to the present teaching.
Figure 19B:
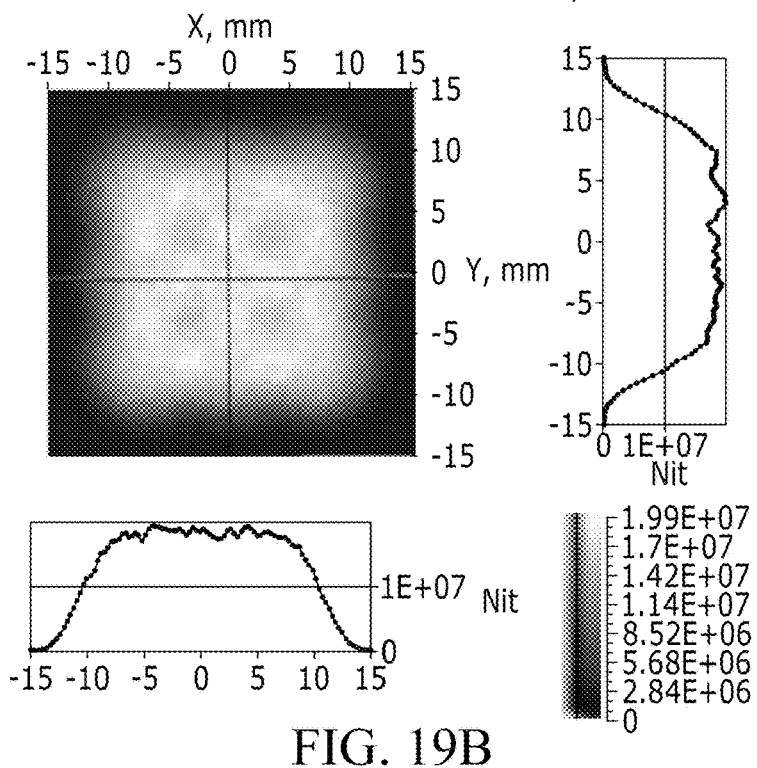

Example 7 is the same as Example 6 except the inner portion of each Fresnel lens is modified. In the center of each lens, the previous lenslets within a radius of 1.2 mm are replaced by a prismatic angle bend with a base angle of 7.5 degrees. It can be seen in FIG. 19a, which is the no angle bend Example 6 and FIG. 19b, which is the center angle bend example, that the modification of the central lenlets improves the narrow angle intensity significantly.

Figure 20:
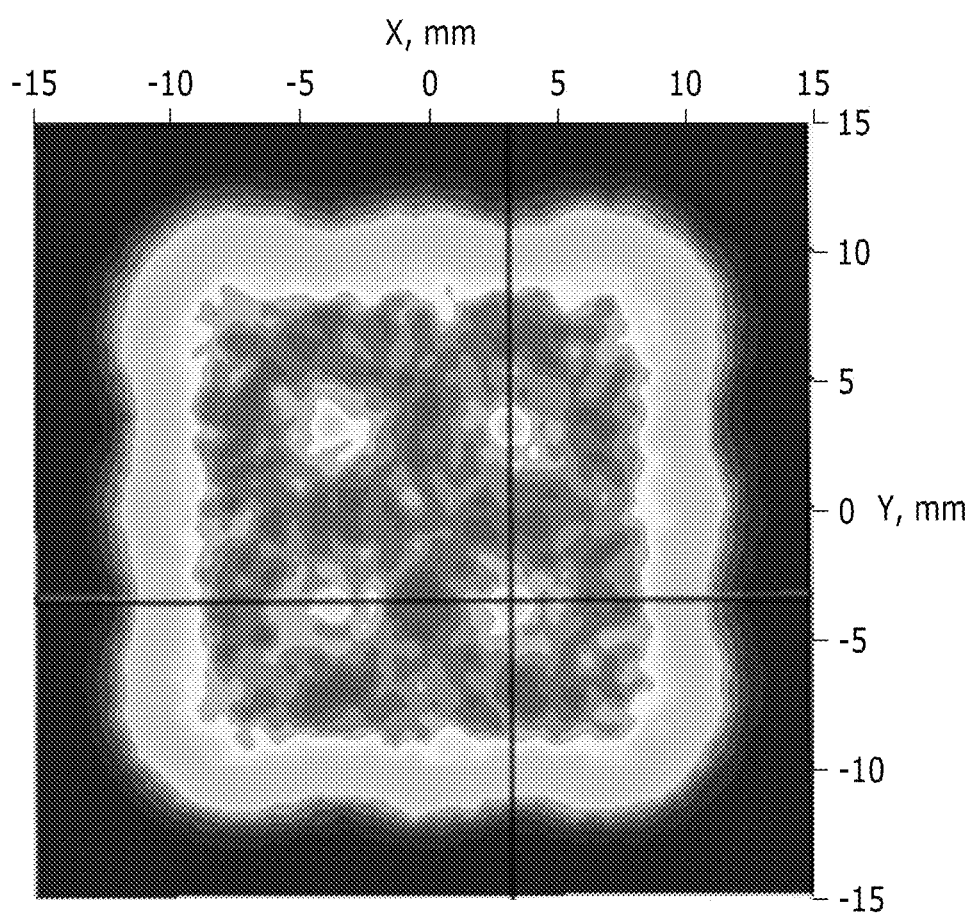
FIG. 20 shows the narrow angle intensity (detector 86) for Example 7 of the BLU according to the present teaching.

It is also possible to locally modify the distribution of the light exiting the diffuser at the center area between LEDs by placing an array of radially symmetric prismatic angle bend lenslets with a base angle of 16 degrees and a radius of 1 mm aligned with spaces equal distance between 4 LEDs. This is modeled in Example 7, which is the same as Example 6 other than these periodic lenses on the back of the diffuser. The resultant narrow angle intensity (detector 86) is shown in FIG. 20.

Figure 18A:
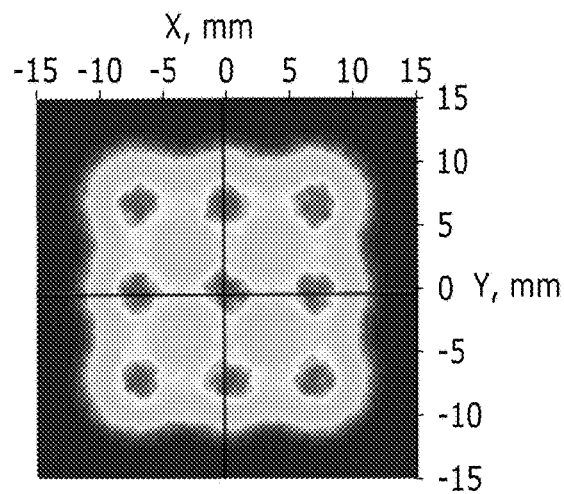
FIGS. 18a, 18b and 18c show the narrow angle intensity distribution for the cases of a microlens array diffuser with a circular FWHM diffusion angle of 20, 30 and 40 degrees respectively facing towards the LEDs.
Figure 18B:
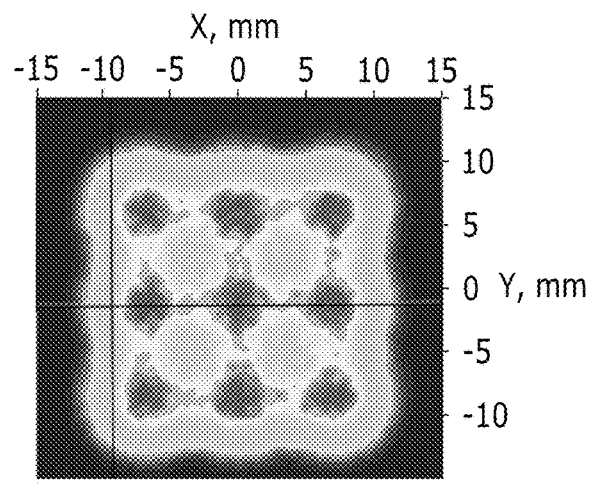
Figure 18C:
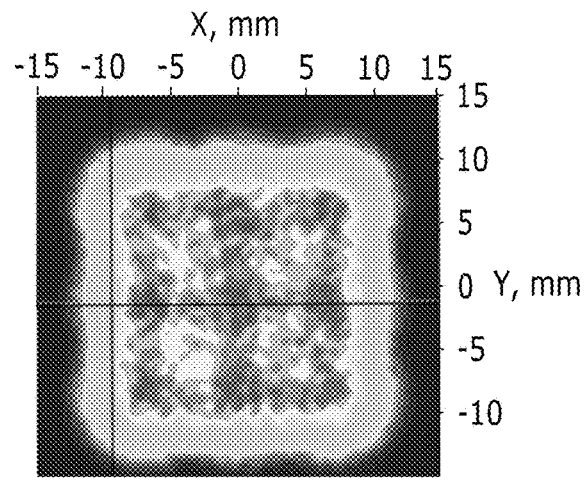
Figure 18D:
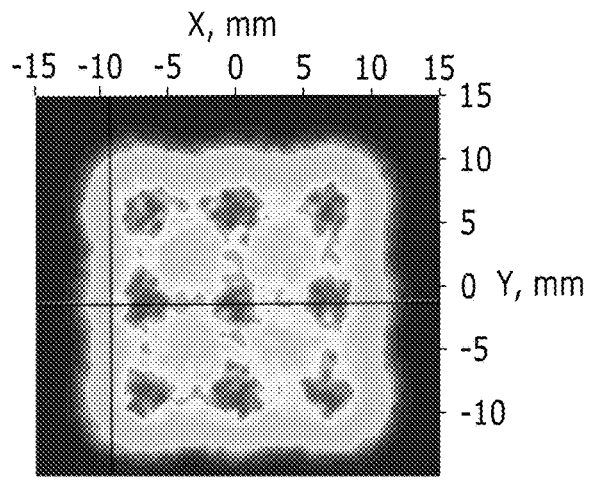
FIG. 18d shows the narrow angle intensity distribution for the cases of a microlens array diffuser with a circular FWHM diffusion angle of 40 degrees respectively facing away from the LEDs.
Figure 18E:
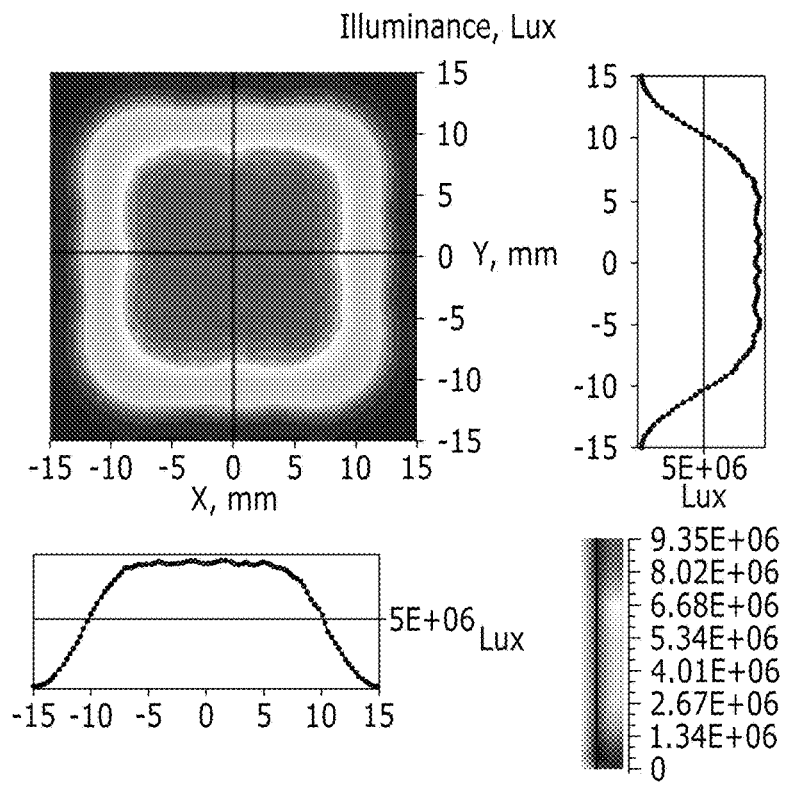
FIG. 18e shows the energy uniformity for the case of a microlens array diffuser with a circular FWHM diffusion angle of 20 degrees respectively facing towards the LEDs and the diffuser located ~15 mm above the LEDs for Example 6 of a BLU according to the present teaching.
Figure 18F:
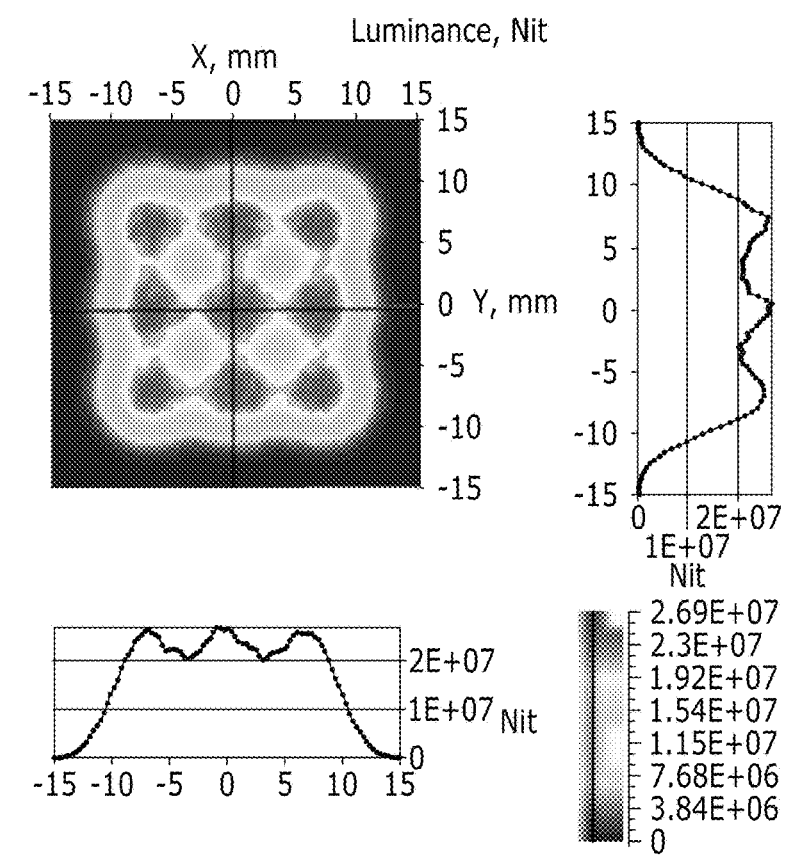
FIG. 18f shows the narrow angle intensity distribution for the case of a microlens array diffuser with a circular FWHM diffusion angle of 20 degrees respectively facing towards the LEDs and the diffuser located ~15 mm above the LEDs for Example 6 of the BLU according to the present teaching.

In Example 6, it was demonstrated as shown in FIGS. 18e and 18f that a uniform energy intensity could be achieved at the exit of the diffuser while maintaining about 50% of the energy contained within +−20 degrees. However, the angular distribution of the light varies periodically across the diffuser surface with more on axis light concentrated above the LEDs and more off axis light between LEDs. It is possible to have spatially varying micro lens arrays such as prismatic angle bends to equilibrate the angular distribution. For example, the light approaching the locations from between LEDs is approaching at angles of +−20 degrees off-axis. This light can be bent to enter the diffuser more normal to the surface.

Figure 21:
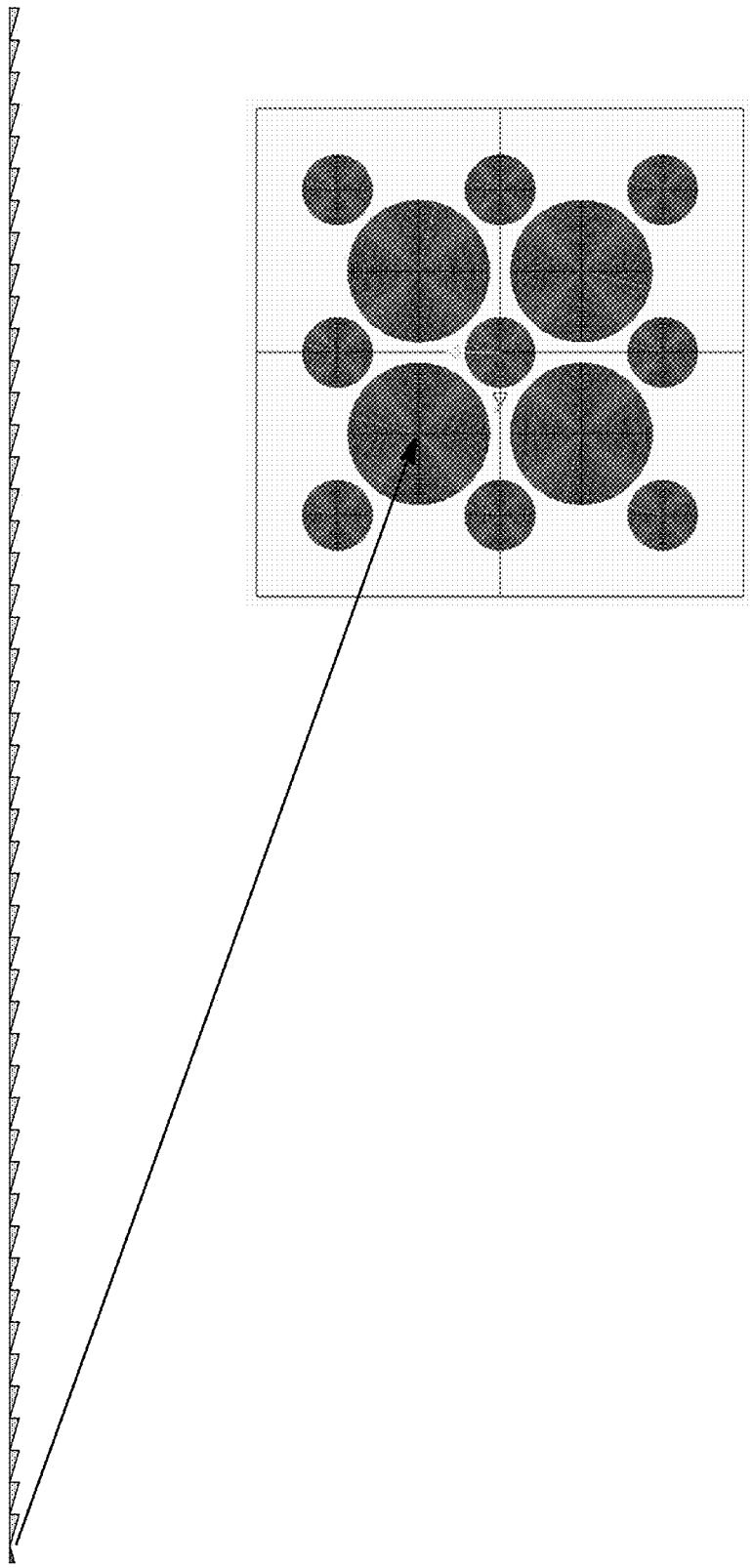
FIG. 21 shows the lens array on the backside of the diffuser for Example 8 of the BLU according to the present teaching.
Figures 22A, 22B:
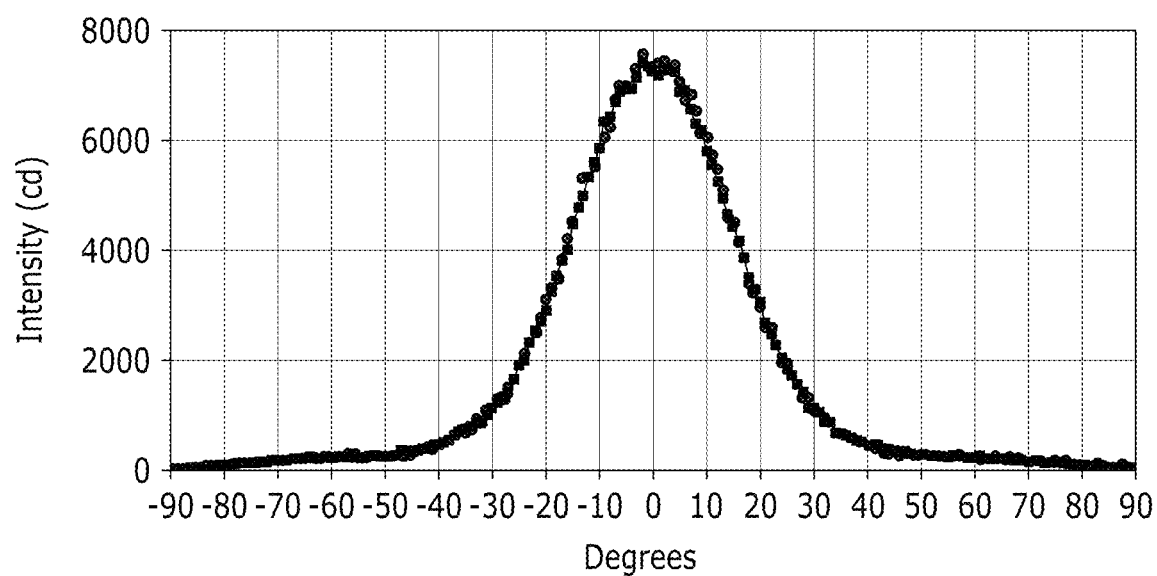
FIGS. 22a and 22b show the optical angular distribution exiting the top diffuser for Example 8 of the BLU according to the present teaching.
Figure 22C:
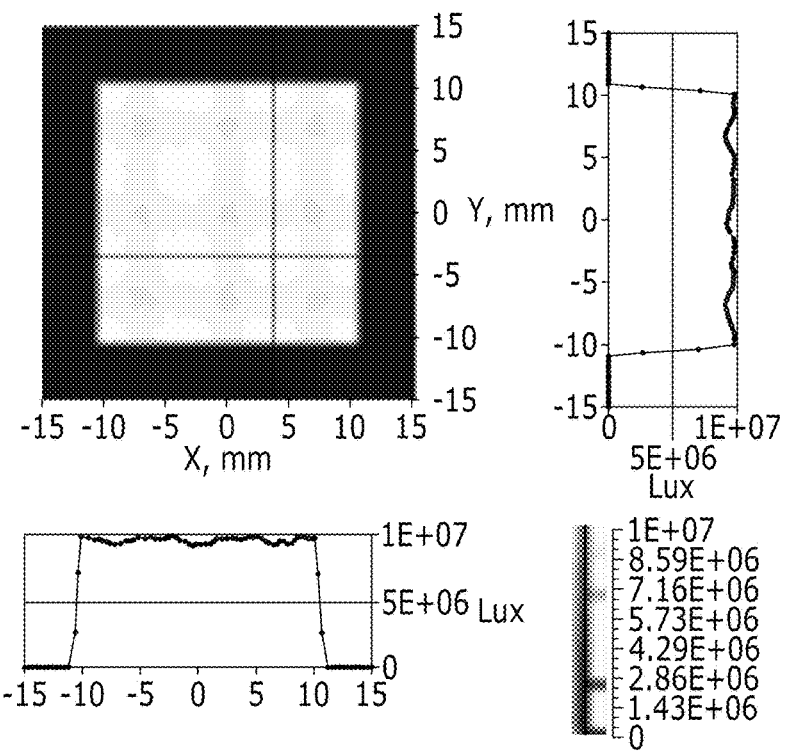
FIGS. 22c and 22d show the uniformity of the total energy and of the narrow angle energy respectively for Example 8 of the BLU according to the present teaching.
Figure 22D:
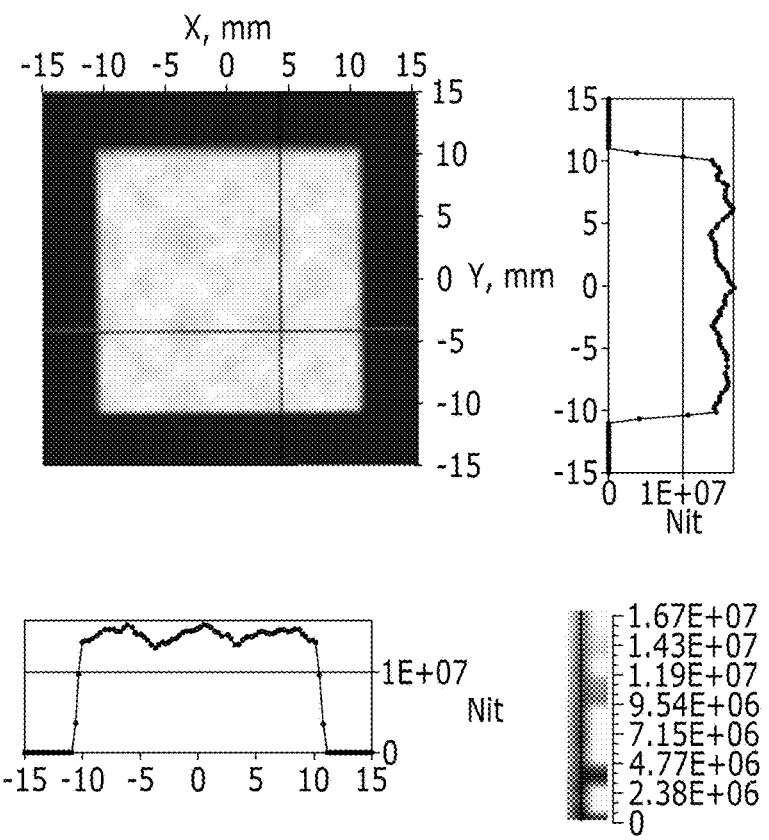

In Example 8, the same conditions are used as Example 6 except a spatially varying prismatic angle bends are on the back of the 20-degree FWHM diffuser as shown in FIG. 21. Between the LED locations are 3 mm radius lenses with the prism angle varying from 20 degrees at the center to zero at the outer radius. The lenses located over the LEDs have a 1.5 mm radius with a prism angle varying between 10 degrees at the center to zero at the outer radius. The resultant properties are shown in FIGS. 22a, 22b, 22c and 22d. FIGS. 22a and 22b show the optical angular distribution exiting the top diffuser. FIGS. 22c and 22d show the uniformity of the total energy and of the narrow angle energy respectively.

Rather than approximating the angle of the exit facets of the annular rings in FIG. 9 from the shape of a spherical lens and then in some cases stretching the vertical dimension by different amounts, it is possible to calculate the angle of each exiting facet to give the best collimation using the well-known Fresnel equation $n_1 \sin(\theta 1) = n_2 \sin(\theta 2)$. In this case, we would want $\theta^{2=90}$ degrees which means $\sin(\theta^{2)=1.0}$ and $n_2=1.0$ (for air).

Figures 23A, 23B:
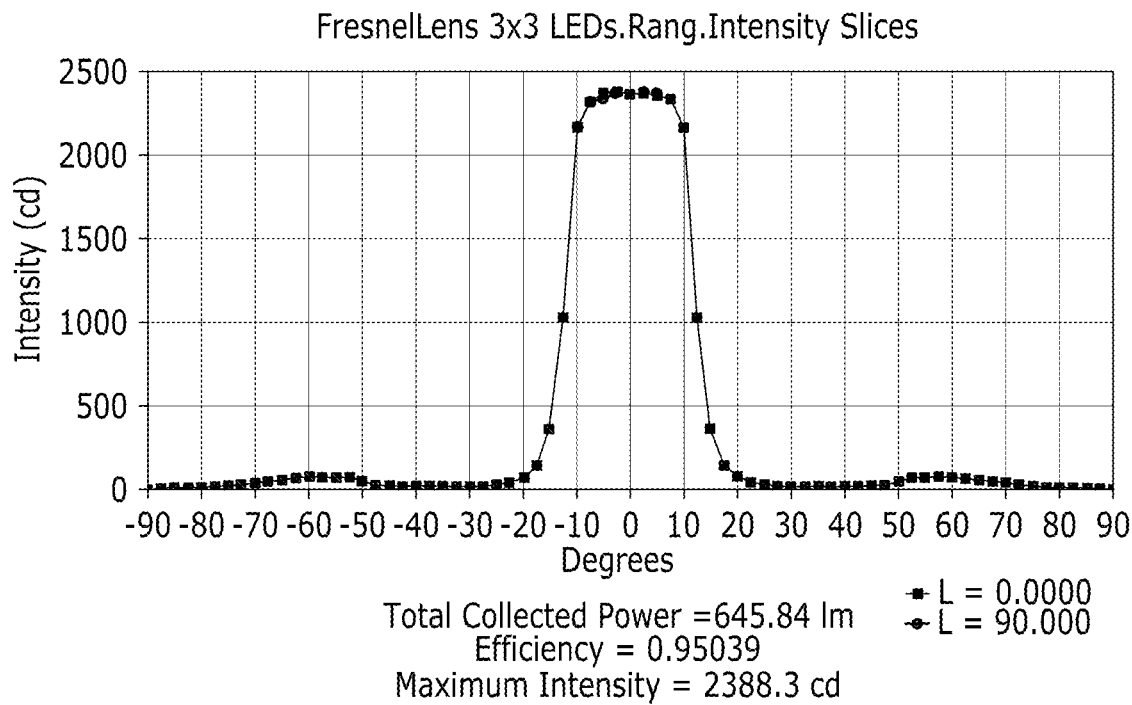
FIGS. 23a and 23b shows the resulting collimation for Example 9 of the BLU according to the present teaching where exit facet of each of the lenslets was calculated using the Fresnel equation.
Figure 24A:
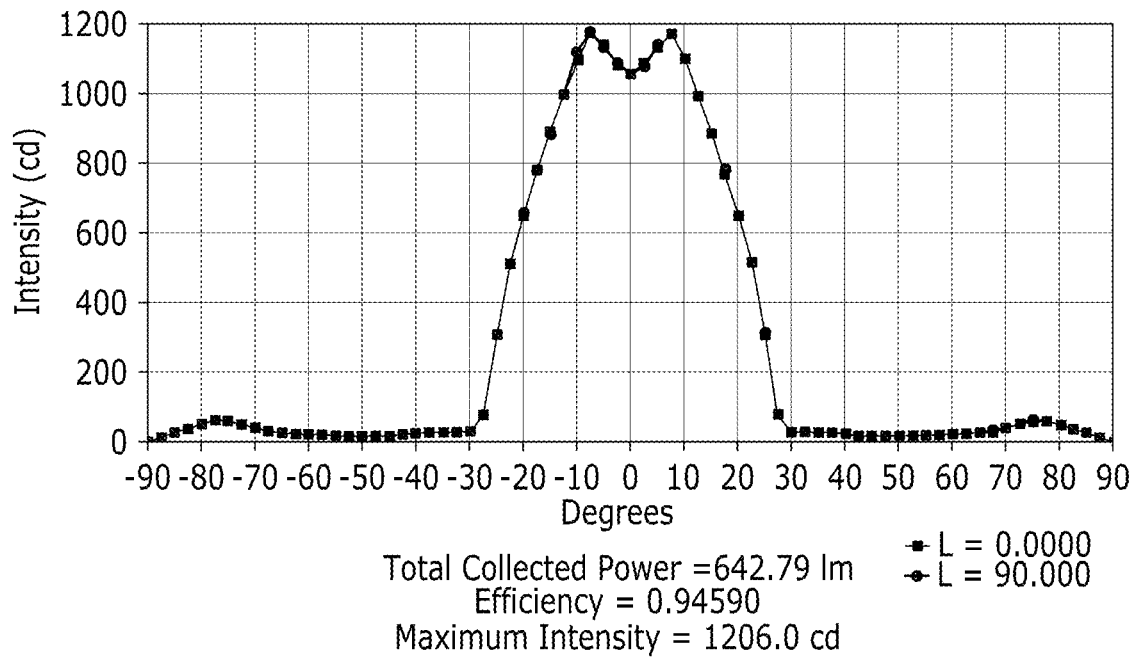
FIGS. 24a, 24b, 24c, 24d and 24e illustrate the resulting collimation for Example 10 of the BLU according to the present teaching with of scaling factors of 0.5, 0.65, 0.75, 1.0 and 1.5, respectively for the vertical heights of the individual lenslets. That is, the heights of the prism microstructures of the annular segments.
Figure 24B:
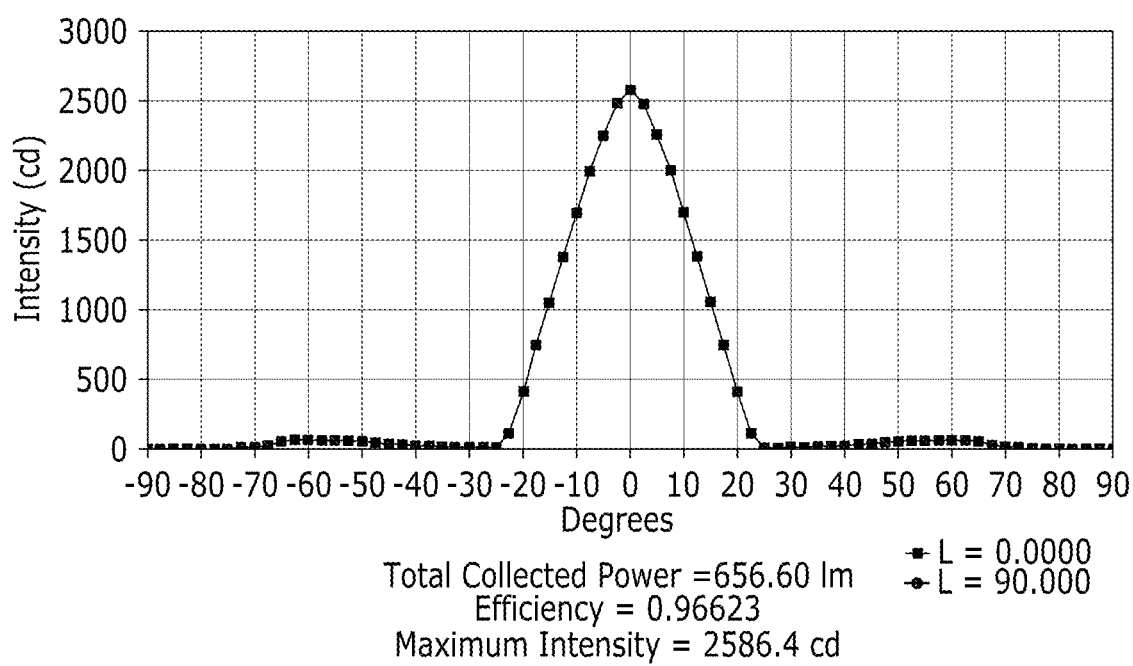
Figure 24C:
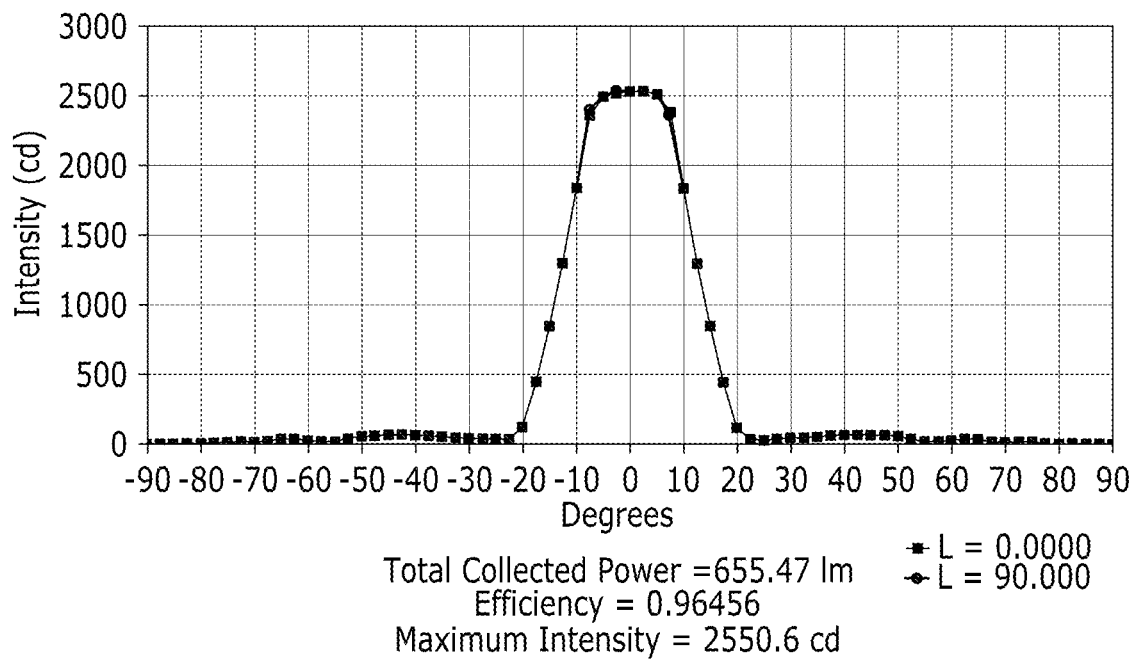
Figure 24D:
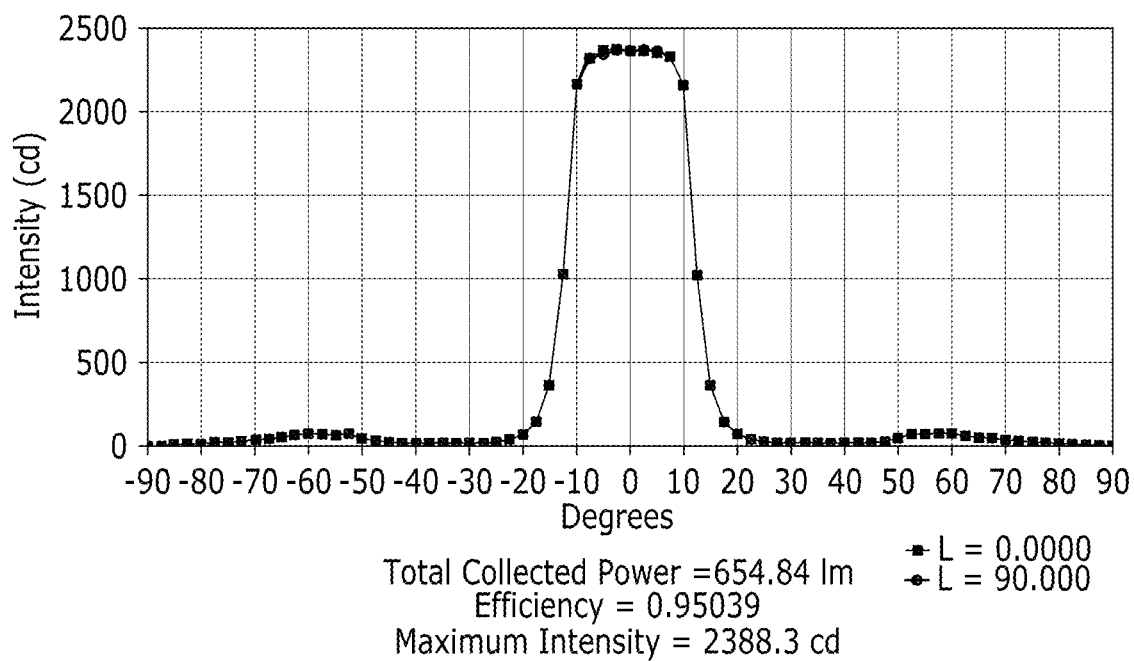
Figure 24E:
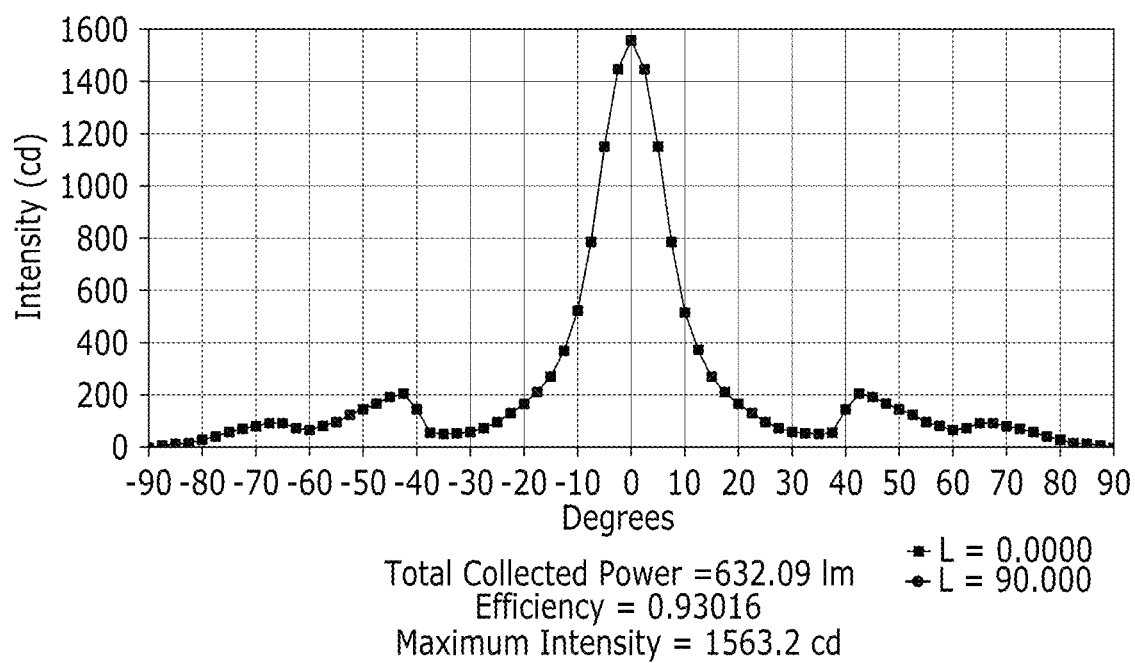

In Example 9, 1 mm-by-1 mm LEDs with a Lambertian emission, space 7 using a focusing lens where the exiting facets of FIG. 9 were calculated using the Fresnel equation. The reflectivity of the bottom surface of the PCB is assumed to be 80%. The thickness of the base layer was 3.5 mm with a refractive index of 1.5 and the lens diameter was 3.5 mm. No additional diffusers were included. FIGS. 23a and 23b shows the resulting collimation.

Example 10 is the same as Example 9 except that the height of the individual lenslets were scaled by a factor. FIGS. 24a, 24b, 24c, 24d and 24e are the resulting collimation for Example 10 with of scaling factors of 0.5, 0.65, 0.75, 1.0 and 1.5, respectively for the vertical heights of the individual lenslets.

Figure 25A:
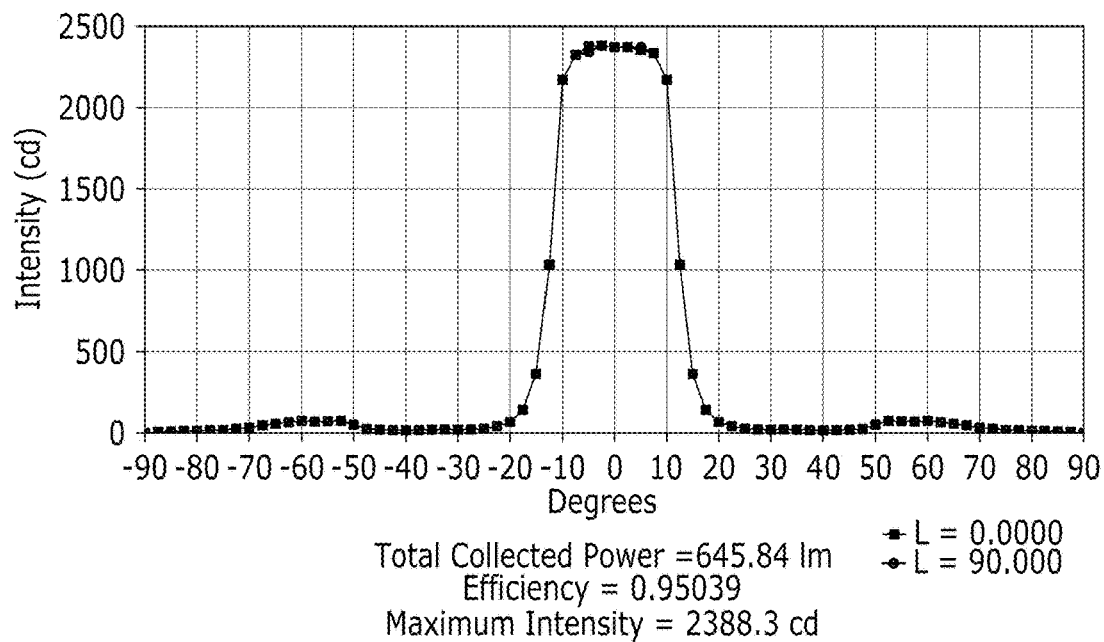
FIGS. 25a and 25b illustrate the resulting collimation for the embodiment of a scaling factor of 1 for the lenslets in Example 11 of the BLU according to the present teaching.
Figure 25B:
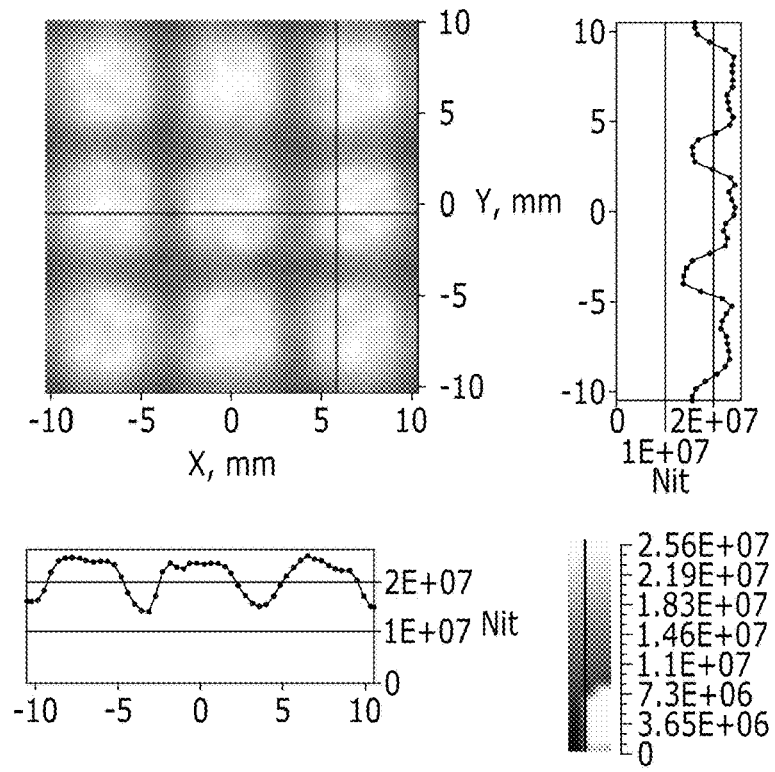
Figure 25C:
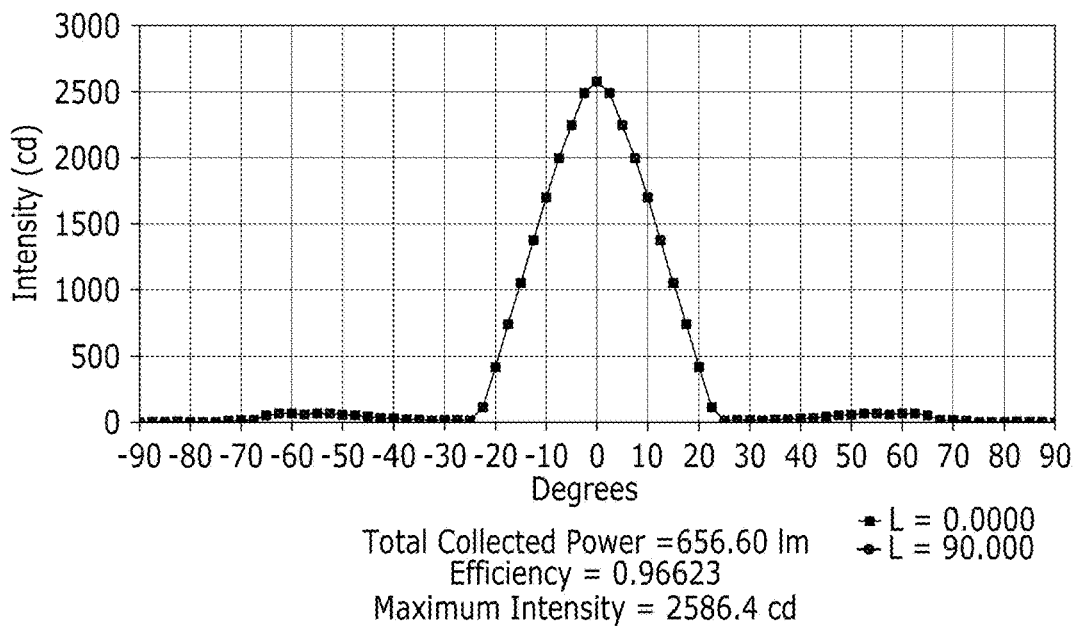
FIGS. 25c and 25d illustrate the resulting collimation for the embodiment of a scaling factor of 0.65 for the lenslets in Example 11 of the BLU according to the present teaching.
Figure 25D:
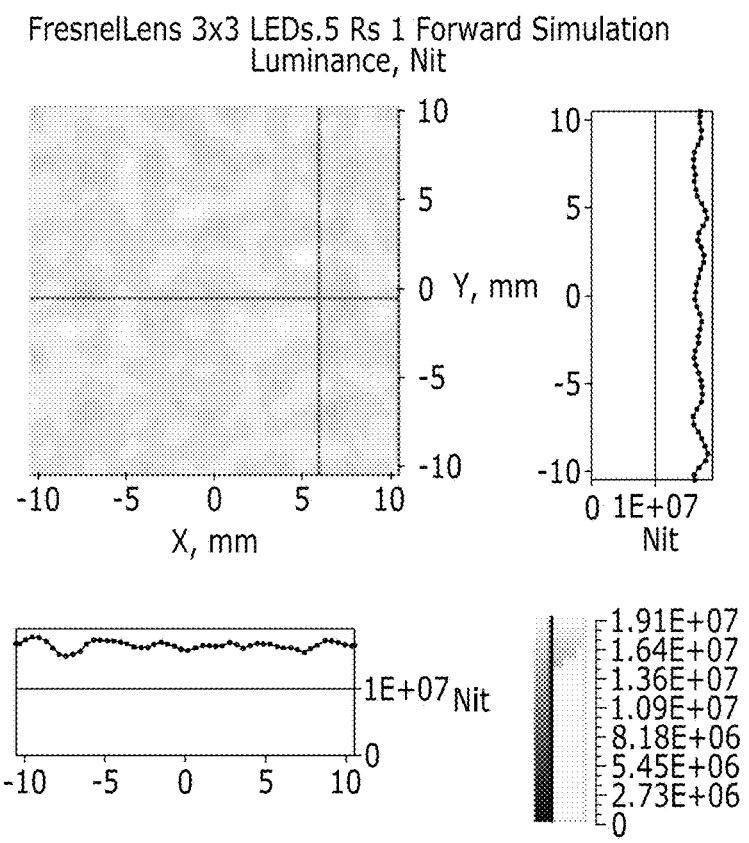

Example 11 is an example using the lenslets of Example 10 with an array of 3-by-3 LEDs spaced 7.0 mm apart, where each LED has a one-by-one millimeter Lambertian emitting area. The PCB has a reflectivity of 80% and a 30-degree diffuser is placed at a height of 15 mm with detectors immediately above it. FIGS. 25a and 25b present data for the case of a scaling factor of one. It can be seen that there is excellent collimation. FIG. 25a illustrates intensity as a function of angle measured above the collimation lenses. The data presented illustrate good uniform narrow band (+−10 degrees) luminance. FIG. 25b illustrates intensity as a function of angle measured above the diffuser at the height of 15 mm. FIGS. 25c and 25d present data for the embodiment of a scaling factor of 0.65 for the lenslets in Example 11 of the BLU according to the present teaching. These data indicate that for the case of a scaling factor of 0.65 with a much more gradual drop-off in intensity as a function of angle (FIG. 25c) results in a much more uniform narrow band (+−10 degrees) luminance (FIG. 25d) above the diffuser at the height of 15 mm.

Figure 26A:
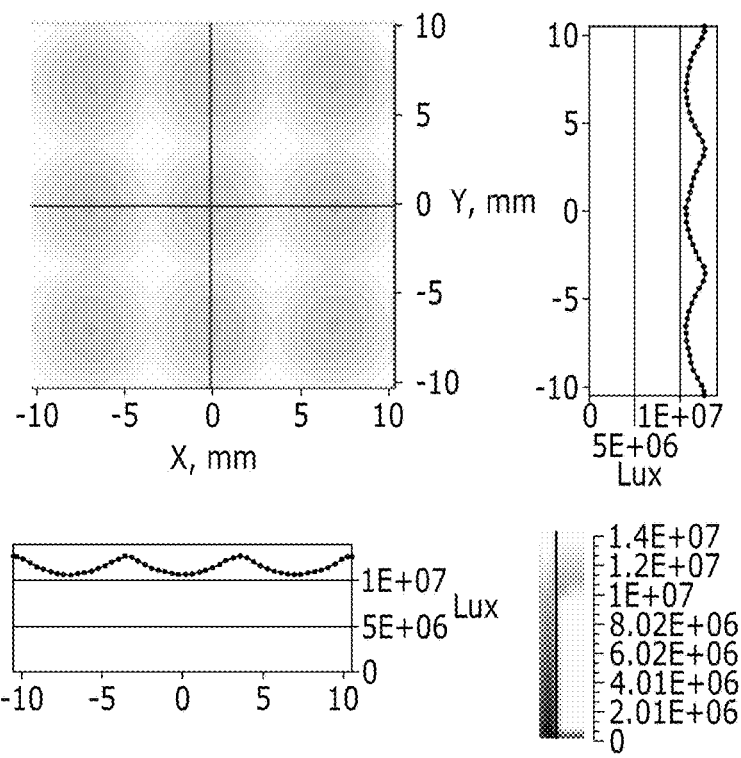
FIGS. 26a and 26b illustrate the illuminance (energy) and the narrow band luminance for the case of the well-collimated scaling factor of 1.0 for Example 12 of the BLU according to the present teaching.
Figure 26B:
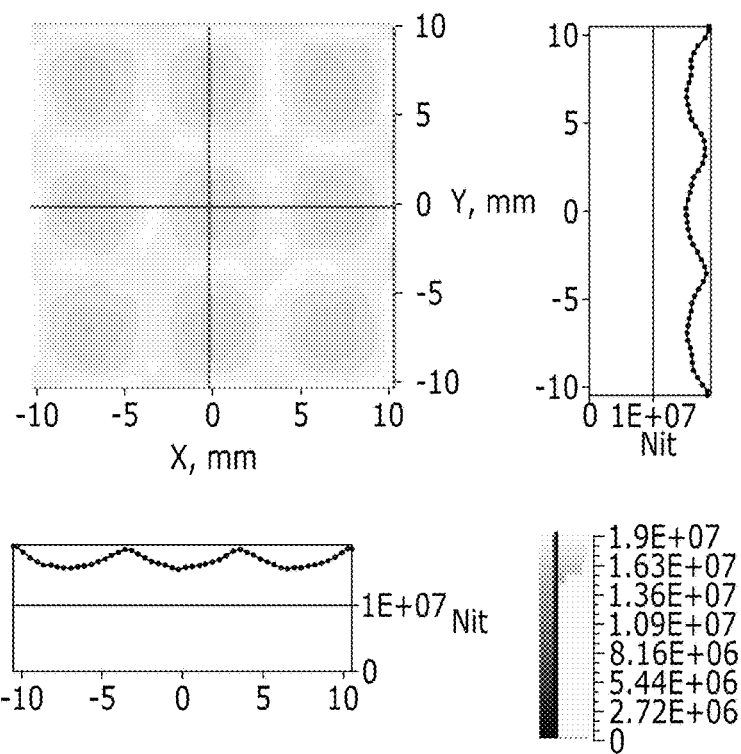
Figure 26C:
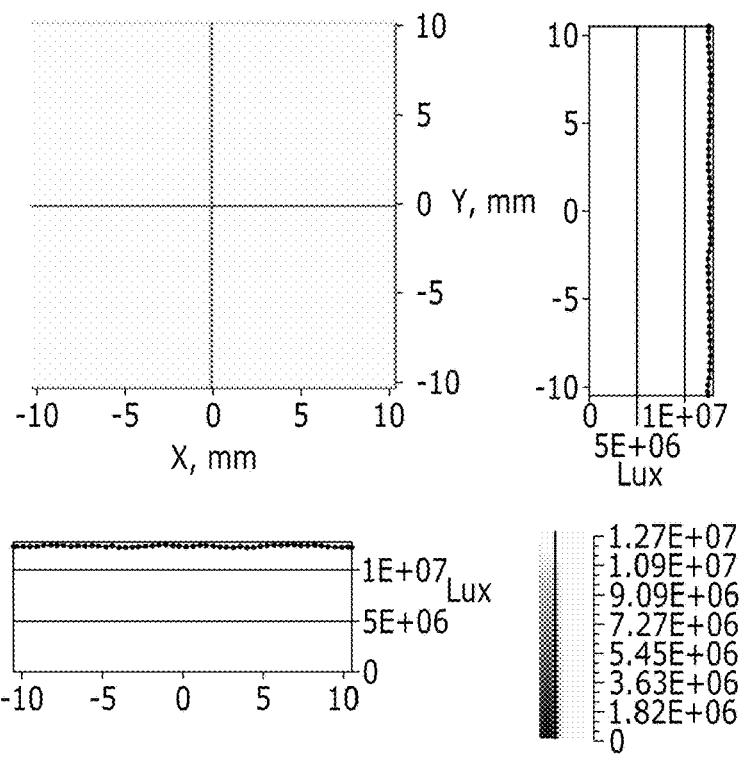
FIGS. 26c and 26d illustrate the illuminance (energy) and the narrow band luminance for the embodiment of the well-collimated scaling factor of 0.65 for Example 12 of the BLU according to the present teaching.
Figure 26D:
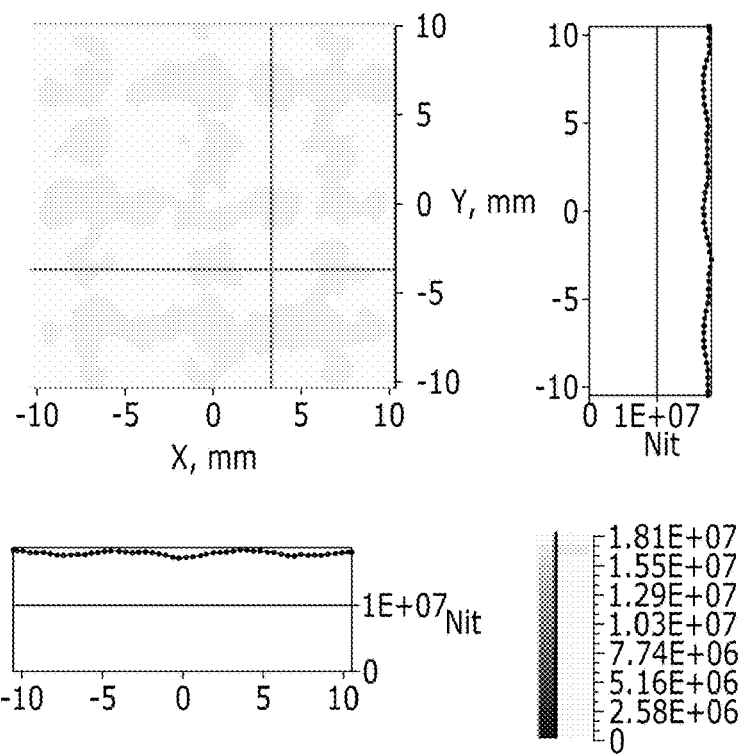

In Example 12, the 30-degree diffuser and the detectors just above the 30-degree diffuser are moved to a vertical height of 20 mm. FIGS. 26a and 26b present data for the illuminance (energy) and the narrow band luminance for the case of the well collimated scaling factor of 1.0. FIGS. 26c and 26d are the illuminance(energy) and the narrow band luminance for the case of a scaling factor of 0.65. Here again the uniformity is much better when the collimating lenses have a more gradual drop-off in intensity with angle.

Figure 27A:
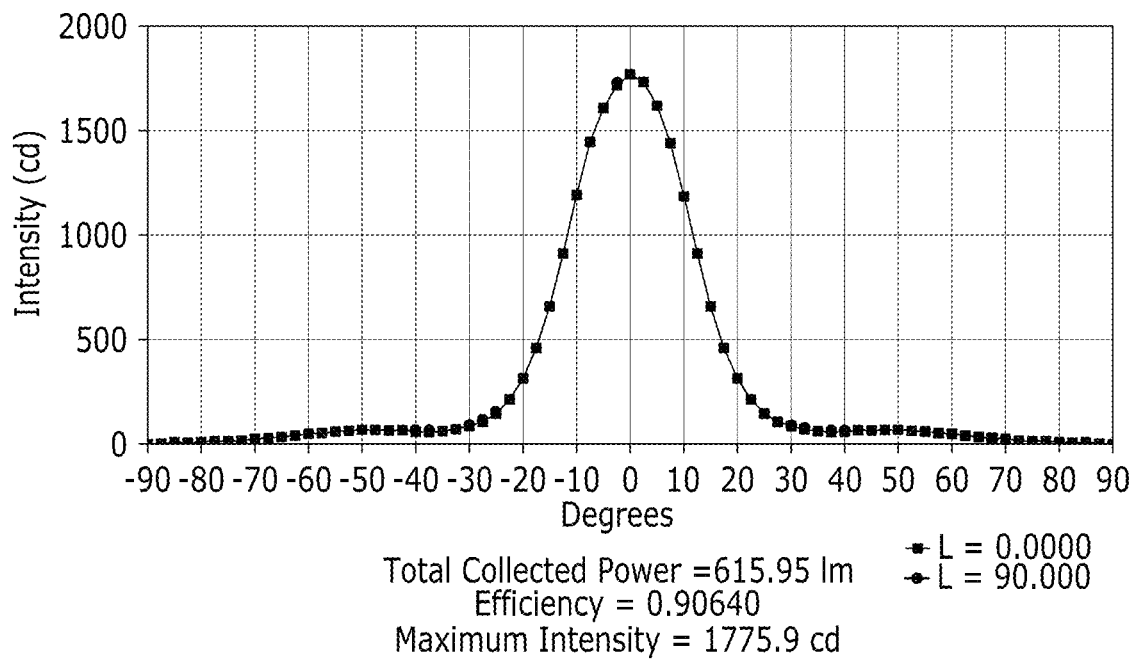
FIG. 27a illustrates the angular dependence achieved by adding diffusion with the scaling factor of 1.0 and adding 30 degrees (FWHM) diffusion.
Figure 27B:
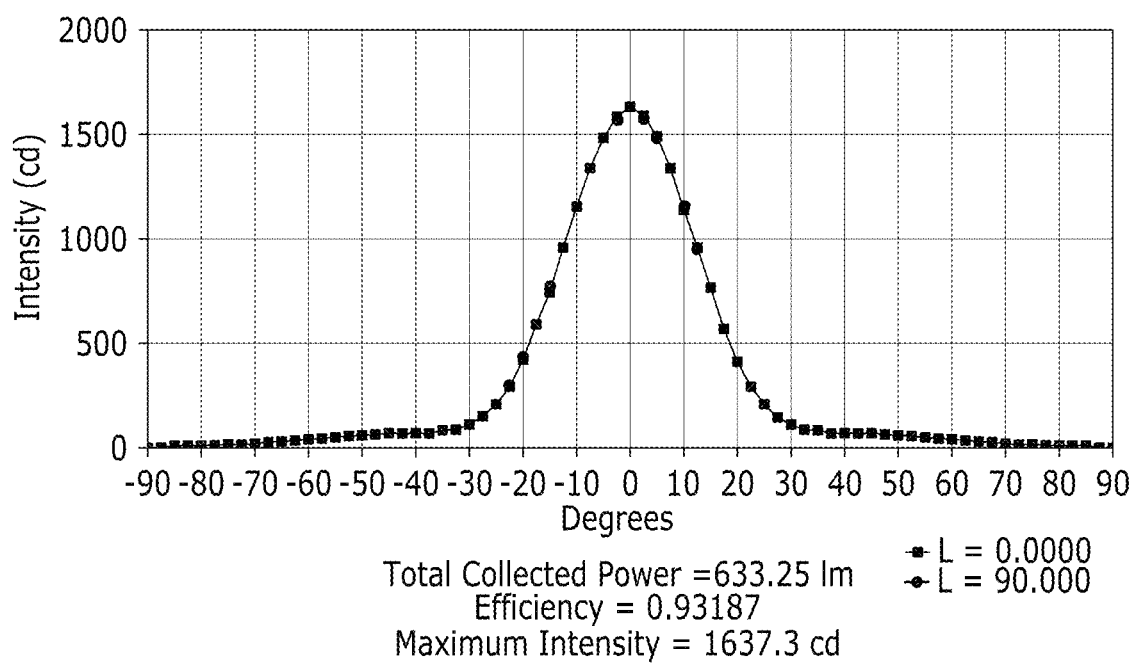
FIG. 27b illustrates the angular dependence achieved by adding diffusion with the scaling factor of 0.65 and 15 degrees of diffusion.

The angular dependence of the light from the collimating lenses can be altered by either adding a diffuser above the collimating lenses or superimposing diffusing microstructures on the exit facets of the collimating lenses. FIG. 27a and FIG. 27b illustrate the angular dependence achieved by adding diffusion. FIG. 27a is with the scaling factor of 1.0 and adding 30 degrees (FWHM) diffusion and FIG. 27b illustrates data for a scaling factor of 0.65 and 15 degrees of diffusion. The more gradual variation in intensity with angle significantly facilitates achieving good uniformity in luminance and illuminance. One way to characterize this is to look at the slope of the angular intensity of the light exiting the collimating lenses as a function of angle. One metric is the difference in the angle where the intensity at 10% of the maximum value and the angle where the intensity is at 80% of the maximum divided by the angle where the intensity is at 50% of the maximum. This ratio is referred to as S(80,10). It is desirable for S(80,10) to be >0.7 and preferably greater than 1.0 in many embodiments of the present teaching.

Figure 28A:
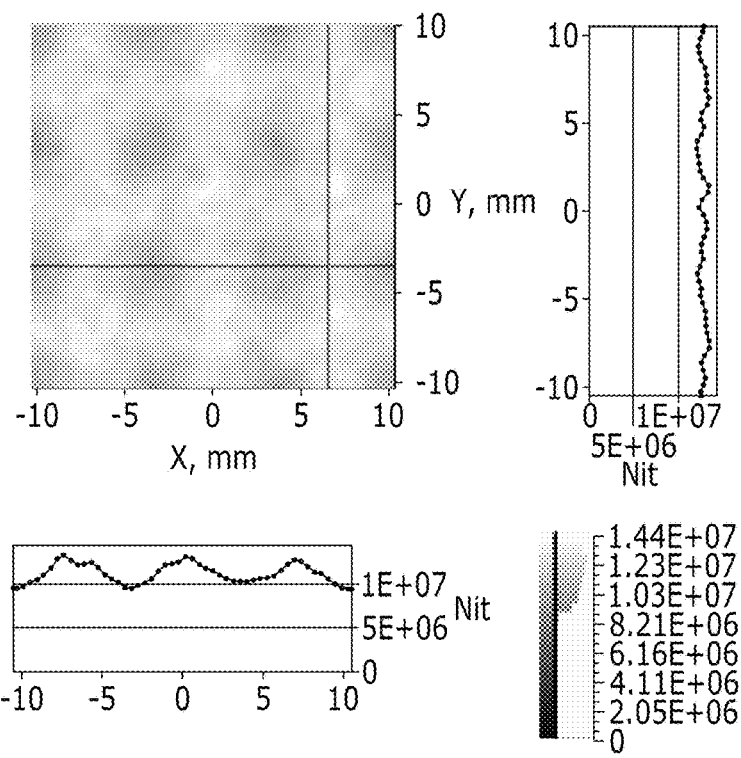
FIG. 28a illustrates the narrow band luminance for Example 13 of the BLU according to the present teaching with LEDs arranged in a square array.
Figure 28B:
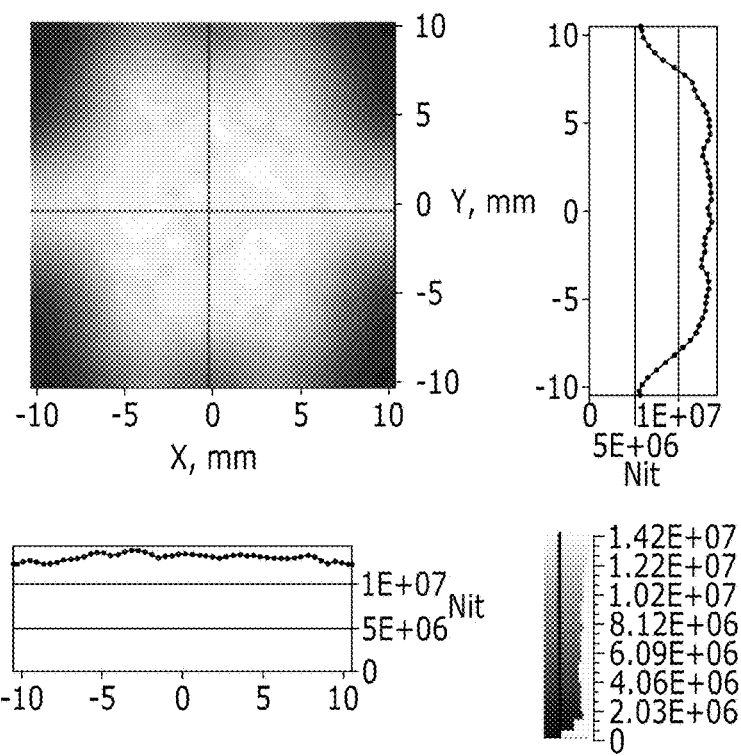
FIG. 28b is the narrow band luminance for Example 13 of the BLU according to the present teaching with LEDs arranged in a hex array.

The configuration of the arrayed LEDs can impact the achievement of good uniformity. Example 13 includes the one millimeter-by-one millimeter Lambertian, emitting LEDs space 7 mm apart with about a 36 degree FWHM diffuser at a height of 12.5 mm, where the PCB has 80% Lambertian reflectivity. The collimating lenses on the upper surface of 3.5 mm thickness have a scaling factor of 0.65 and added diffusion of 15 degrees FWHM. The narrowband luminance is shown for the case of square array of LEDs in FIG. 28a and a hex array in FIG. 28b. It can be seen that the hex array results in better uniformity.

Figure 29:
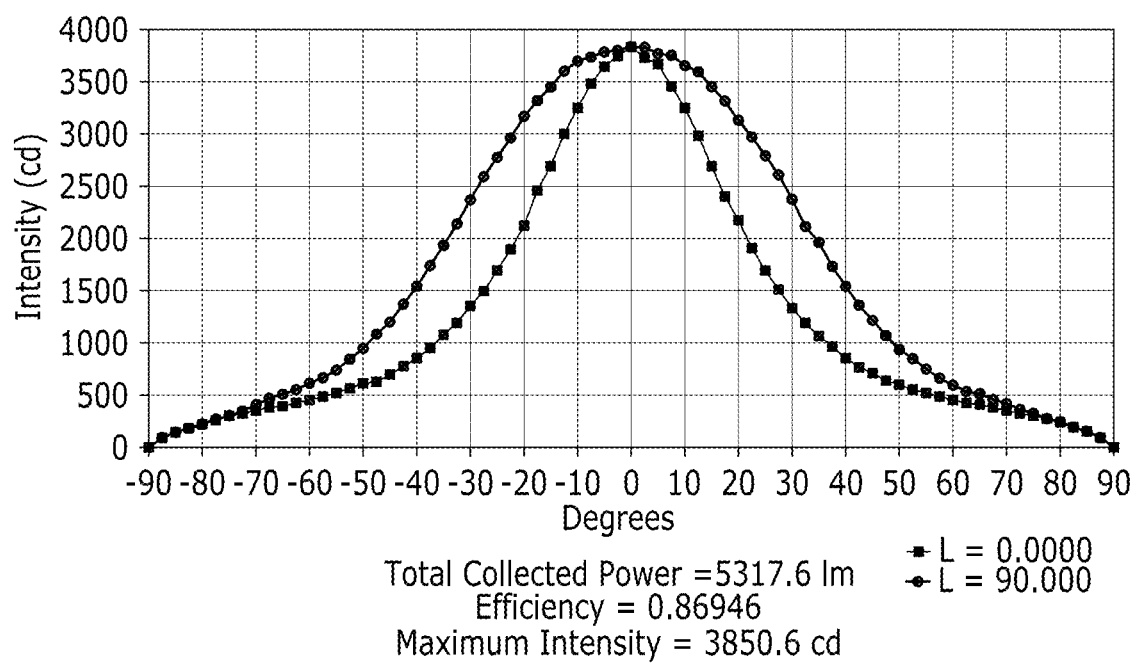
FIG. 29 shows the output distribution for the square array of LEDs in Example 13 of the BLU according to the present teaching if a one-by-60 diffuser is added to the lower surface of the diffuser which has the 36-degree FWHM on the top side (away from the LEDs).

It is also possible to tailor the angular distribution exiting the top diffuser. It is often desirable to have an elliptical output distribution. FIG. 29 shows the output distribution for the square array of LEDs in Example 13 if a one by 60 diffuser is added to the lower surface of the diffuser which has the 36 degree FWHM on the top side (away from the LEDs).

Figure 30A:
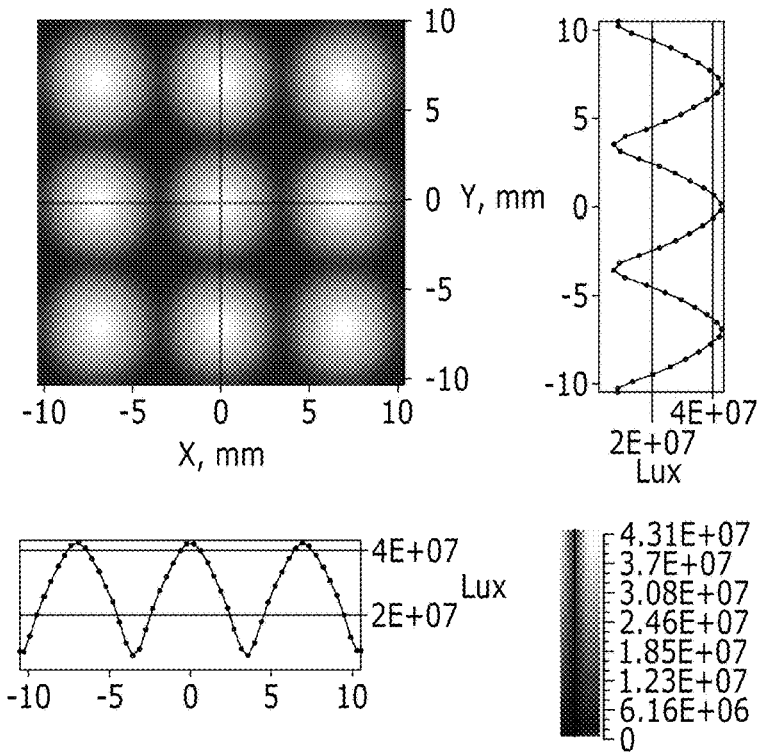
Figure 30B:
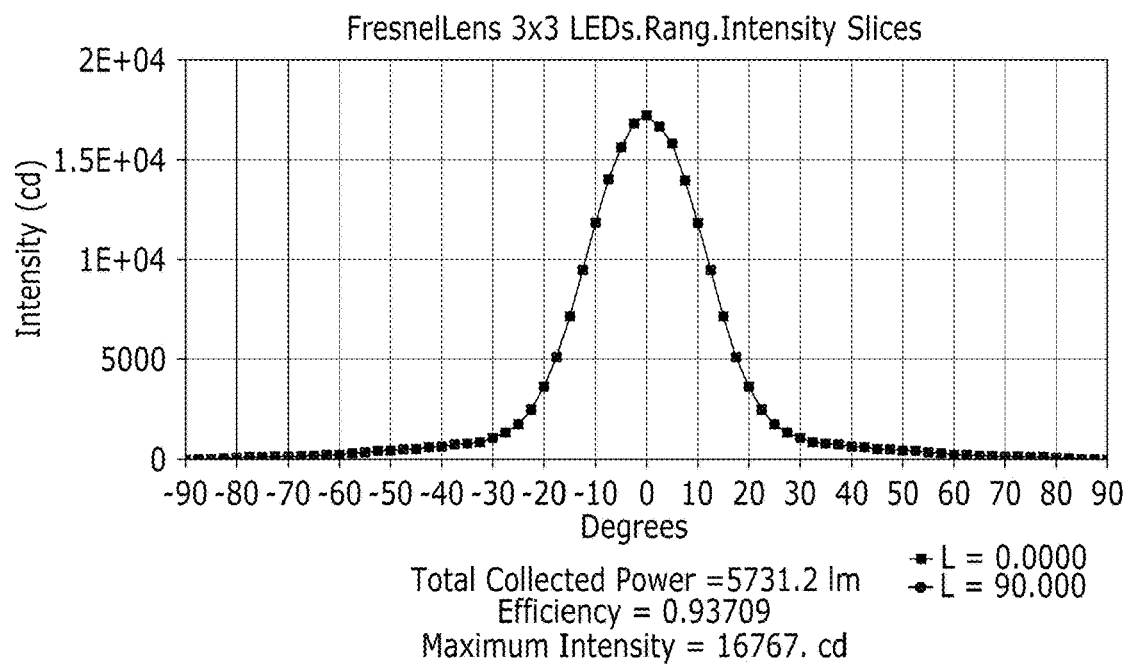
Figure 31A:
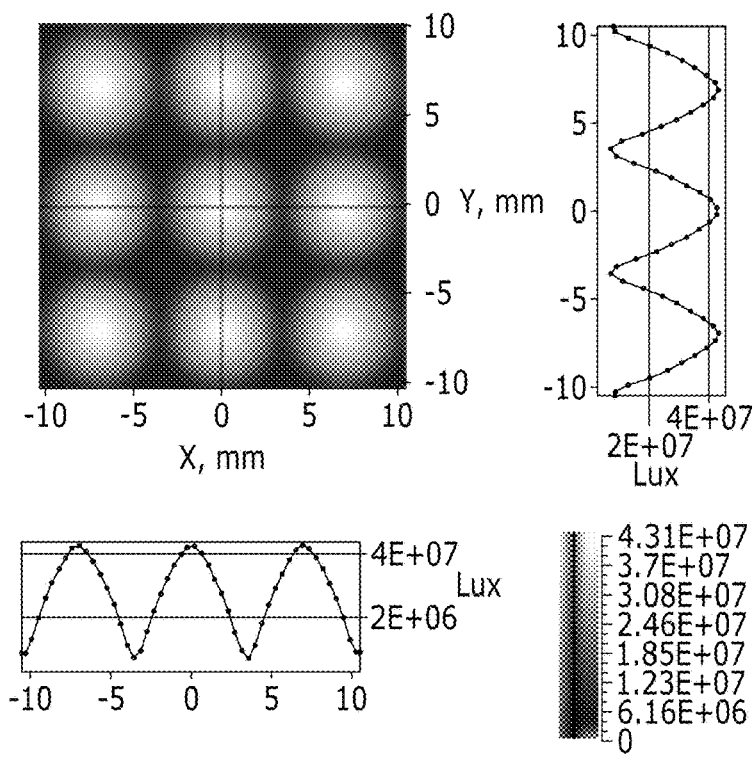
FIG. 31a, FIG. 31b, FIG. 31c, and FIG. 31d show total illuminance just above collimating lenses for Example 14 of the BLU according to the present teaching with the lens thicknesses of 3.5, 4.0, 5.0, and 6.0 mm respectively. Each individual collimating lens is truncated at the halfway point when it intersects a neighboring lens.
Figure 31B:
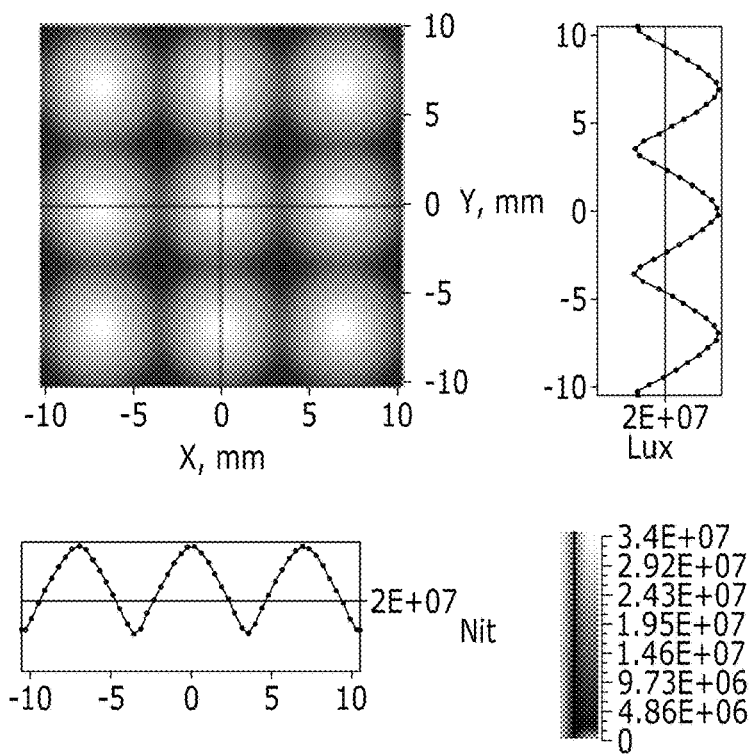
Figure 31C:
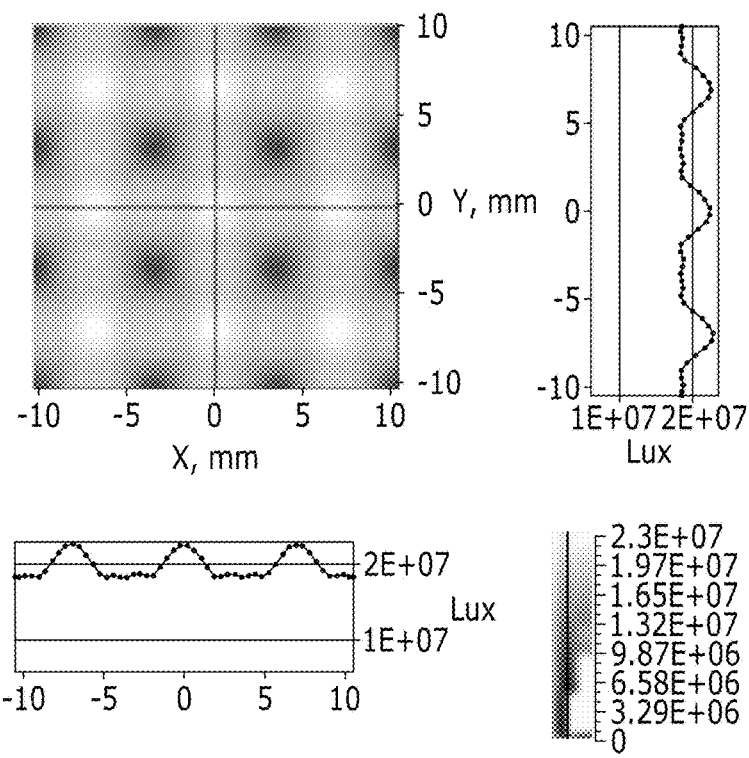
Figure 31D:
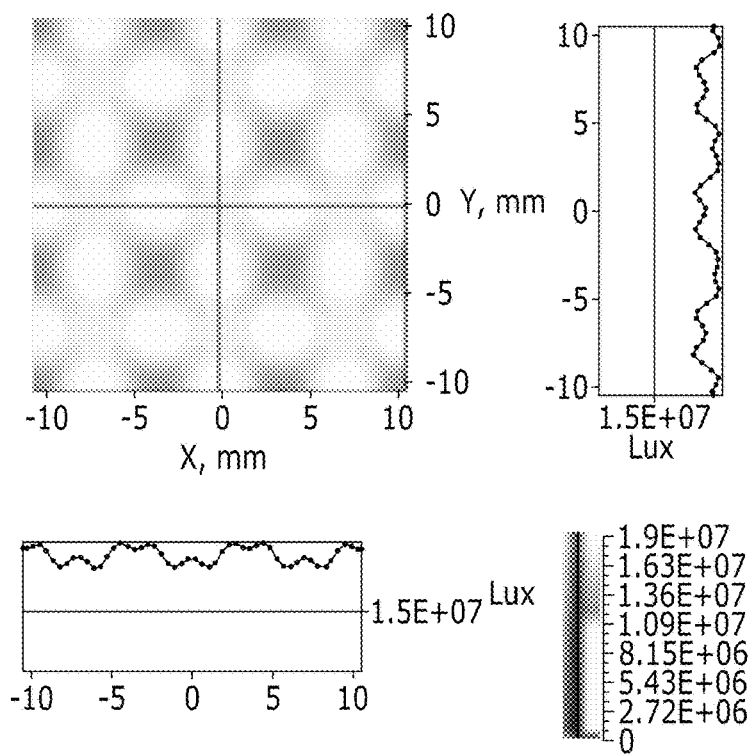

Example 14 has a square array of nine LEDs, which are 1 mm by 1 mm Lambertian emission spaced 7 PCB has 80% Lambertian reflectivity. The collimating lenses on the upper surface of 3.5 mm thickness have a scaling factor of 0.70 and added diffusion of 15 degrees FWHM. FIG. 30a shows the total illuminance just above collimating lenses, the angular distribution and the encircled energy respectively for Example 14. It can be seen that there is very little energy in the spaces between LEDs. A thicker lens layer would allow the light to spread more and have smaller very low energy regions, which will facilitate achieving uniform luminance at the upper diffuser.

Figure 33A:
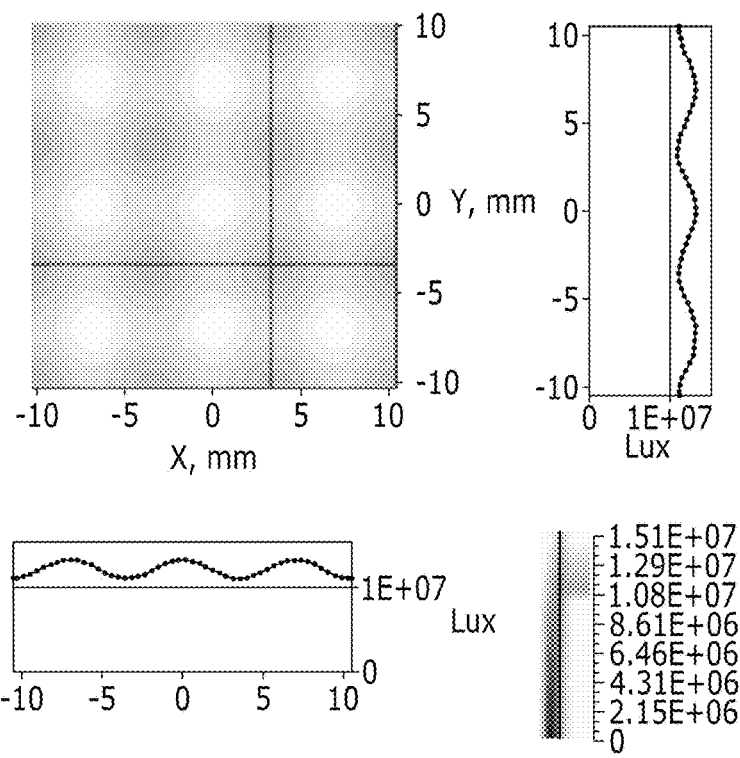
FIG. 33a, FIG. 33b, FIG. 33c, and FIG. 33d show the total energy at a height of 12.5 mm for Example 14 of the BLU according to the present teaching with the lens thicknesses of 3.5, 4.0, 5.0, and 6.0 mm, respectively.
Figure 33B:
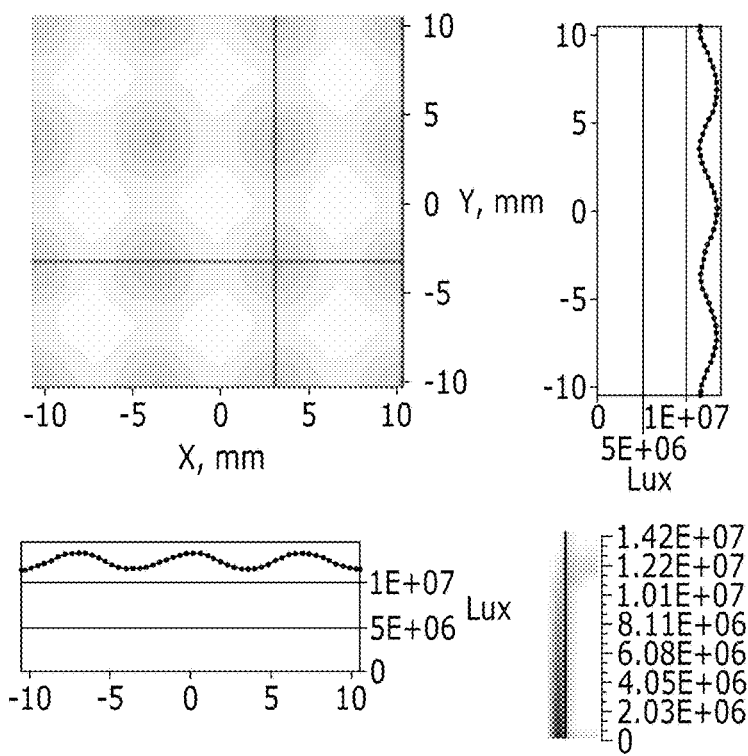
Figure 33C:
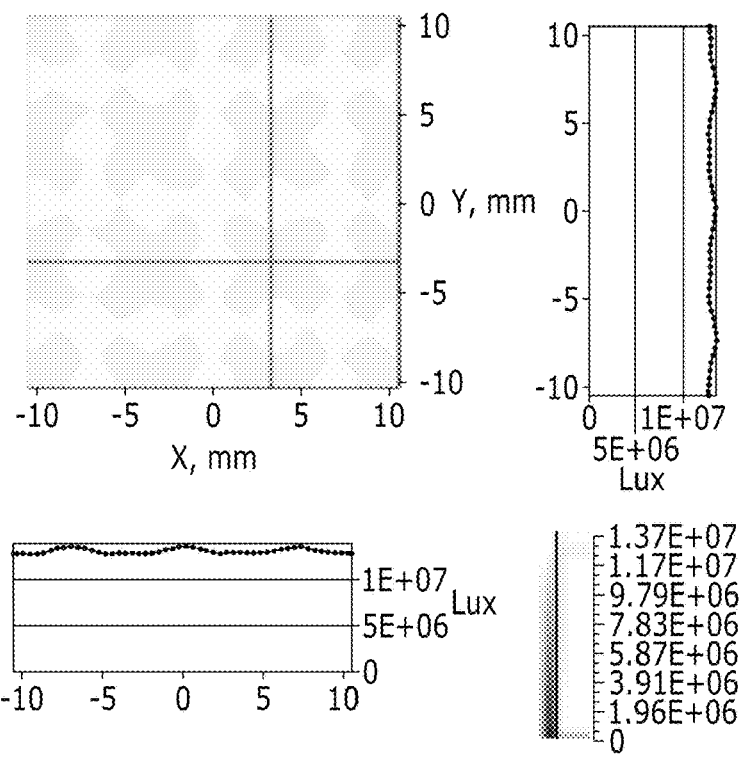
Figure 33D:
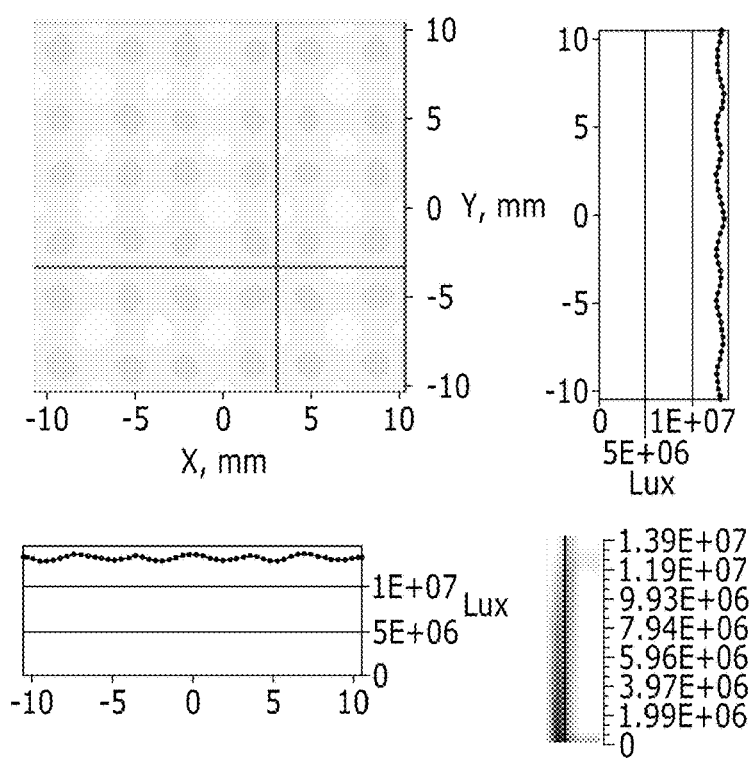

FIG. 31a, FIG. 31b, FIG. 31c, and FIG. 31d show total illuminance just above collimating lenses for Example 14 with the lens thicknesses of 3.5, 4.0, 5.0, and 6.0 mm respectively. Each individual collimating lens is truncated at the halfway point when it intersects a neighboring lens. It can be seen that as the lens thicknesses and radii get larger, there is more significant overlap of energy. FIG. 32a, FIG. 32b, FIG. 32c, FIG. 32d show encircled energy for Example 14 with the lens thicknesses of 3.5, 4.0, 5.0, and 6.0 mm, respectively. The best collimation is shown in FIG. 32b (4.0 mm) with a percent of collimated energy within 20 degrees being 62% decreasing to 59.6% for FIG. 32c (5.0 mm) and to 51.8% for FIG. 33c (6.0 mm).

FIG. 33a, FIG. 33b, FIG. 33c, and FIG. 33d show total illuminance just at a height of 12.5 mm for Example 14 with the lens thicknesses of 3.5, 4.0, 5.0, and 6.0 mm respectively. These data show that the configuration of lens size and thickness of 5.0 mm has the best uniformity. To further improve the uniformity, the collimating lenses could be designed to spread the light slightly more on the diagonals.

Figure 35A:
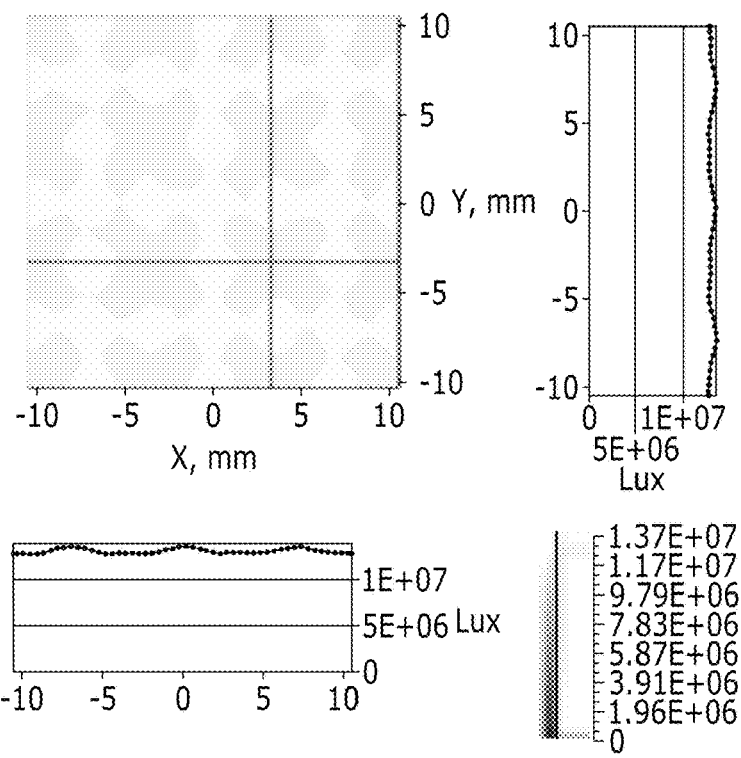
FIG. 35a, FIG. 35b, and FIG. 35c illustrate the total energy uniformity at 12.5 mm height for example 14 with a lens radius of 50 mm and a thickness of 5.3, and 1 mm respectively and an air gap under the solid layer of 0, 1 and 2 mm, respectively.
Figure 35B:
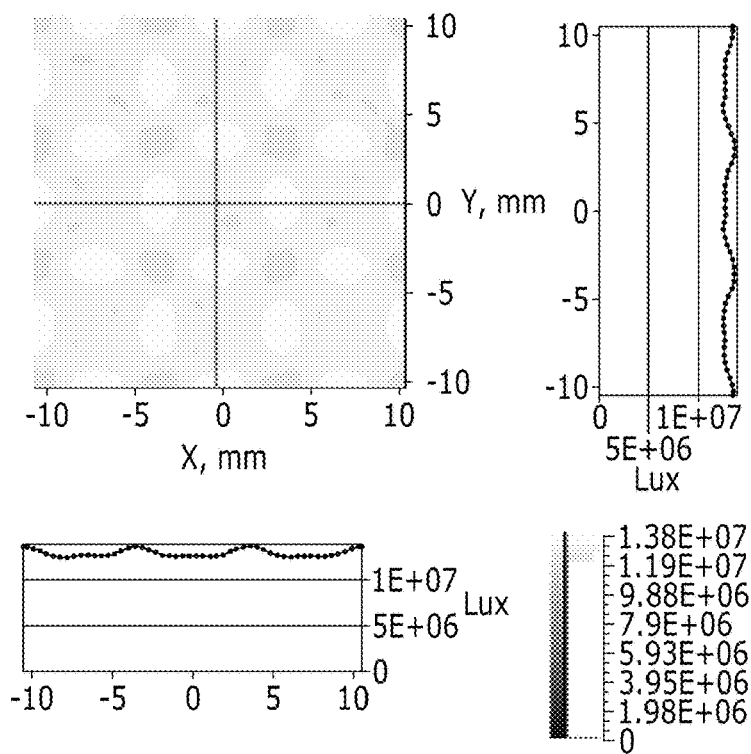
Figure 35C:
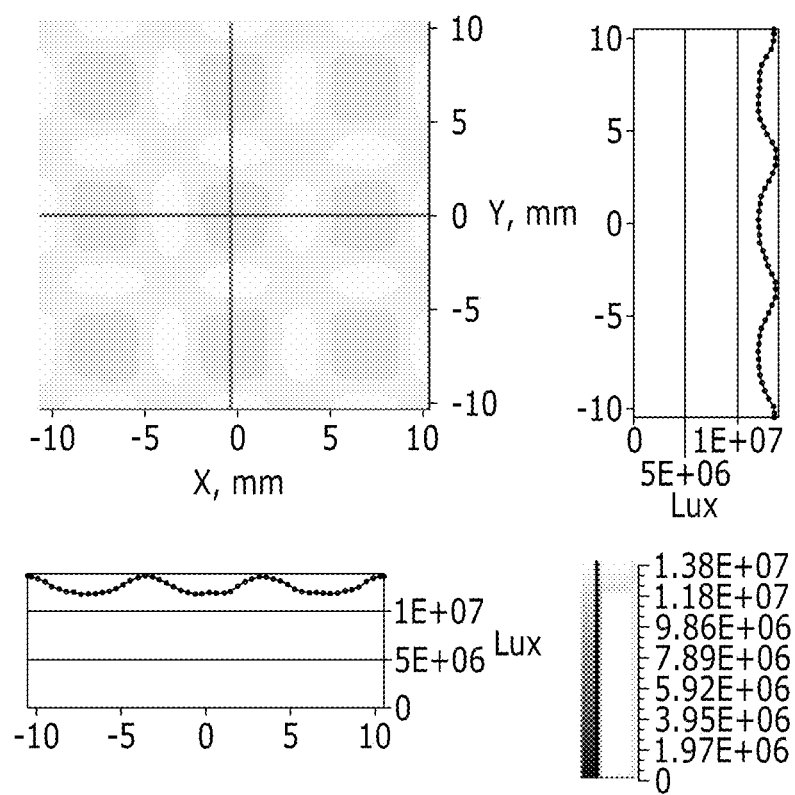

It should be understood that the collimating lens layer could be solid or air. FIG. 34a, FIG. 34b and FIG. 34c illustrate encircled energy for Example 14 with a lens radius of 50 mm and a thickness of 5.3, and one mm, respectively and an air gap under the solid layer of 0, 1 and 2 mm, respectively. It can be seen that the collimation is decreased significantly as you add air beneath the collimating lens. The encircled energy is reduced from 59.6% for no air gap to 49.5% for a 2 mm air gap. FIG. 35a, FIG. 35b and FIG. 35c look at the total energy uniformity at 12.5 mm height for Example 14 with a lens radius of 50 mm and a thickness of 5.3, and 1.0 mm, respectively and an air gap under the solid layer of 0, 1 and 2 mm, respectively. It can be seen that the total energy uniformity also deteriorates somewhat as the air gap is increased.

Figure 36A:
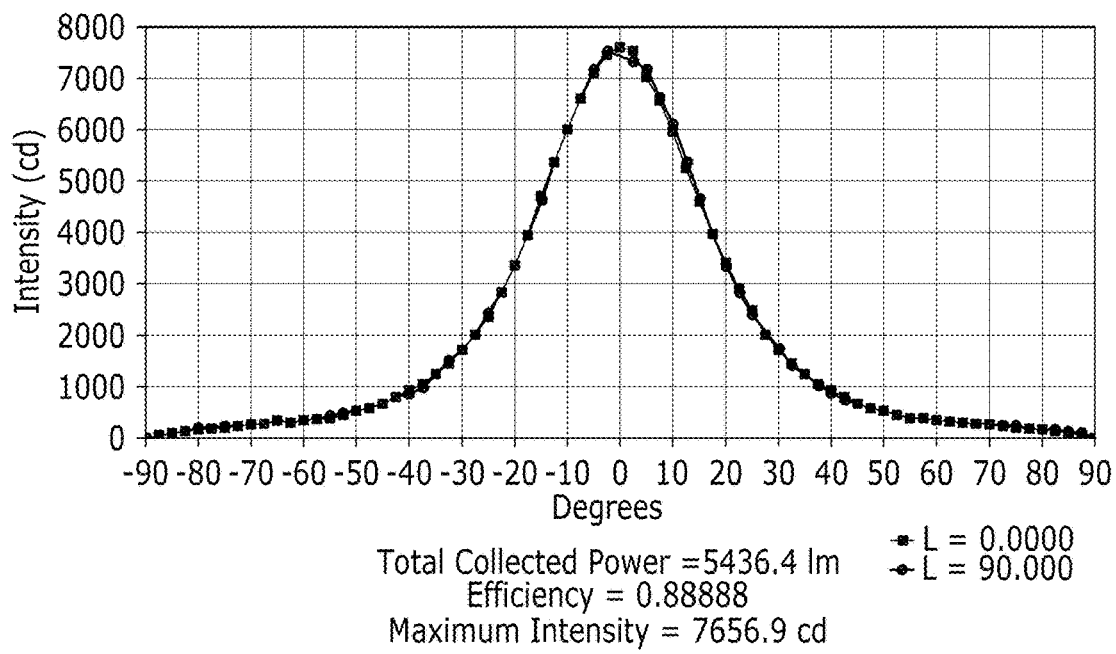
FIGS. 36a and 36b show the exiting beam profile at the top surface and the narrow aperture (10 degrees) luminance at the top surface, respectively, for Example 15 of the BLU according to the present teaching.
Figure 36B:
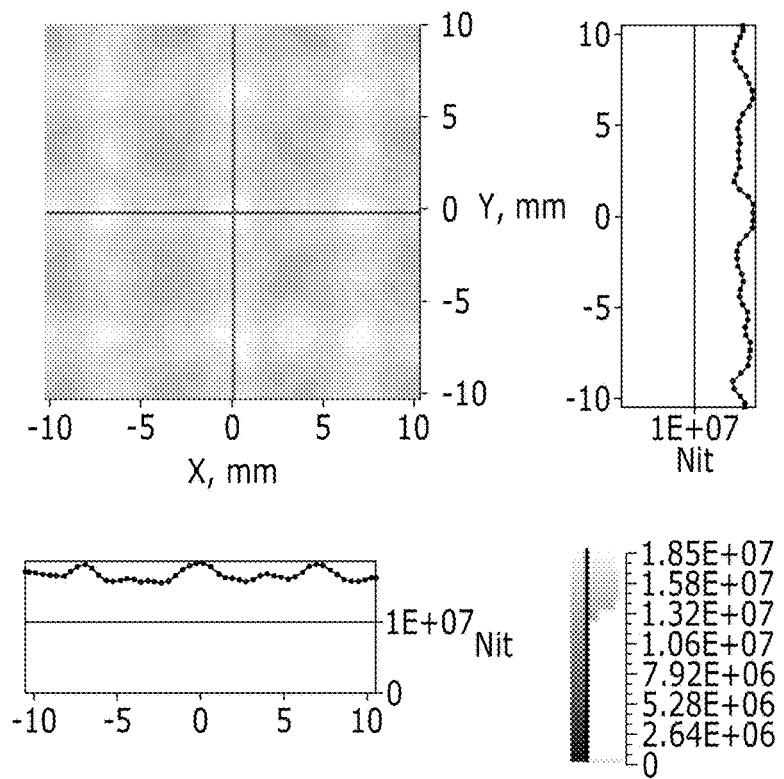

Example 15 has a square array of nine LEDs one mm-by-1 mm Lambertian emission spaced 7 mm, PCB has 80% Lambertian reflectivity. The collimating lenses on the upper surface of 5.0 mm thickness have a scaling factor of 0.75 and added diffusion of 15 degrees FWHM. A second layer is included with a thickness of 1.5 mm with a top texture giving a circular diffusion of a FWHM of 30 degrees. The top of this layer is at 12.5 mm. FIGS. 36a and 36b show the exiting beam profile at the top surface and the narrow aperture (10 degrees) luminance at the top surface respectively for Example 15.

Figure 37A:
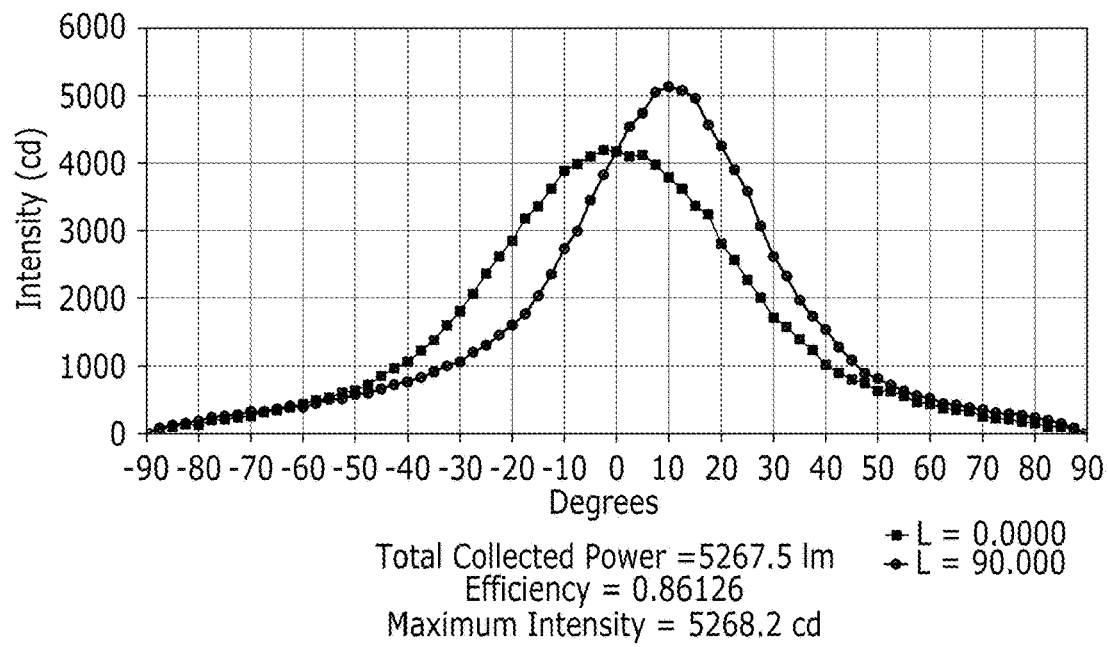
FIGS. 37a and 37b show the exiting beam profile at the top surface and the narrow aperture (10 degrees) luminance at the top surface, respectively, for Example 15 of the BLU according to the present teaching with the addition of a prismatic 12-degree angle bend and a tophat 1 by 40-degree diffuser structures added to the bottom surface of the 1.5 mm diffuser at 12.5 mm.
Figure 37B:
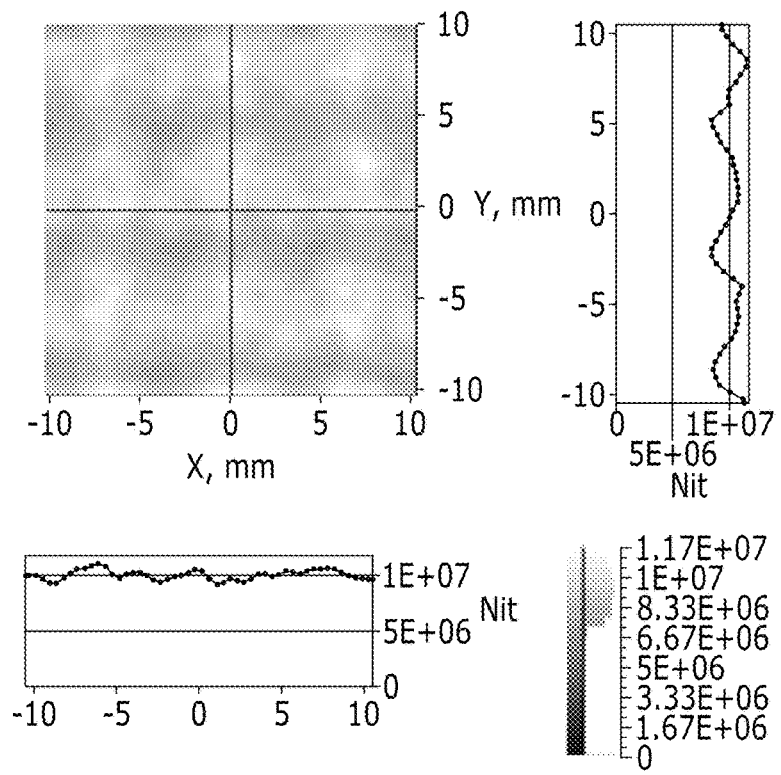

FIGS. 37a and 37b show the exiting beam profile at the top surface and the narrow aperture (10 degrees) luminance at the top surface respectively for Example 15 with the addition of a prismatic 12-degree angle bend and a tophat-shaped structure 1-by-40-degree diffuser structures added to the bottom surface of the 1.5 mm diffuser at 12.5 mm. This illustrates the ability to tilt the beam in one direction while spreading it in the opposite direction.

In Example 15 there are 4 layers: at top there was a 30 degree FHM diffuser on upper surface of first layer with a 1-by-40-degree diffuser on the bottom surface. The next layer underneath this was a prismatic 12.5-degree angle bend with texture facing LEDs next just above the collimation lenses was a layer with a 15 degree FWHM diffuser with structures on the side facing away from the LEDs. The lowest layer was the collimation lens with the lenses also on surface away from LEDs. In some configurations, there is a benefit to decreasing the number of layers.

Figure 38:
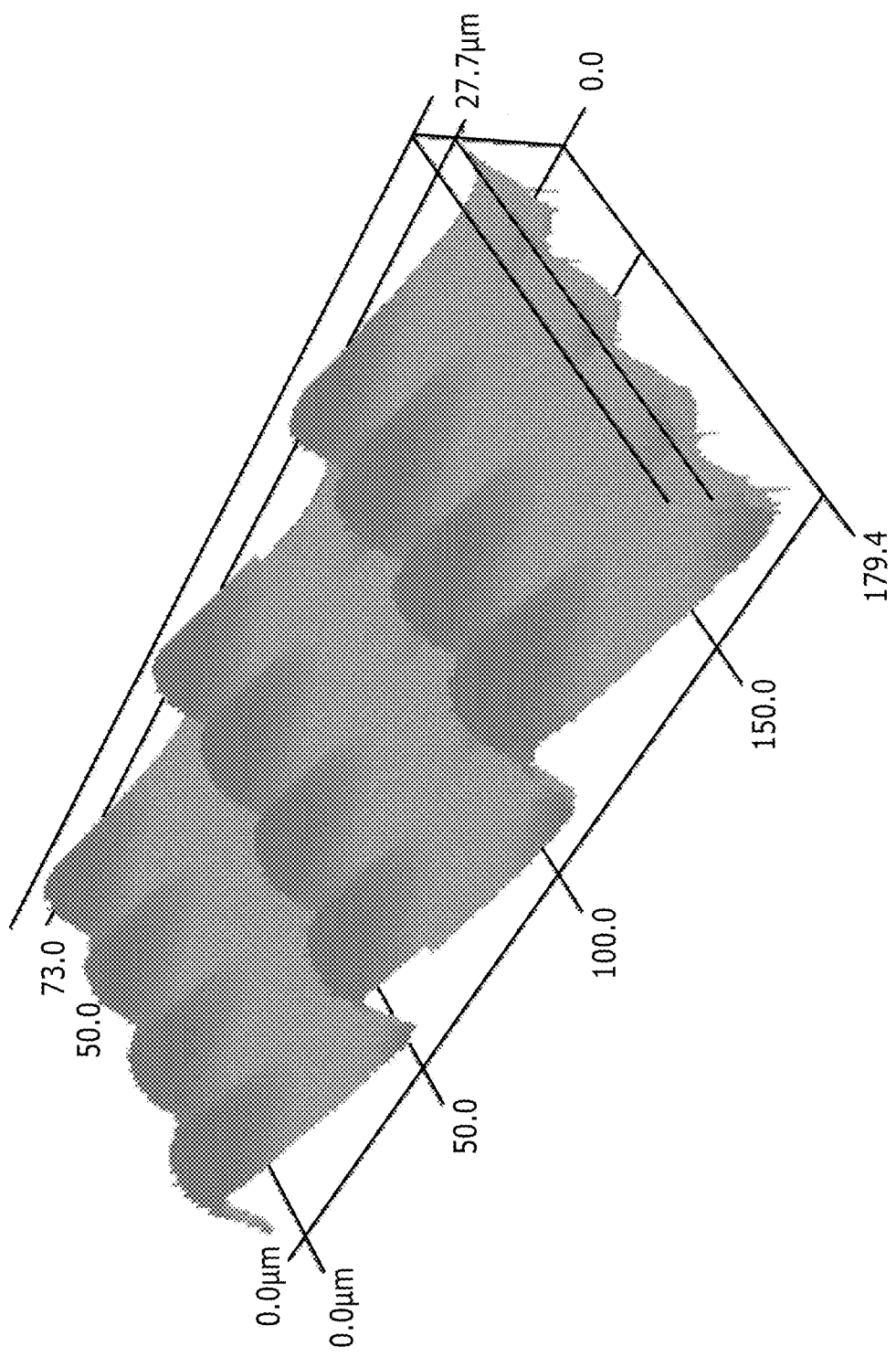
FIG. 38 shows the structures which are on the bottom surface of the top layer for Example 16 of the BLU according to the present teaching.
Figure 39A:
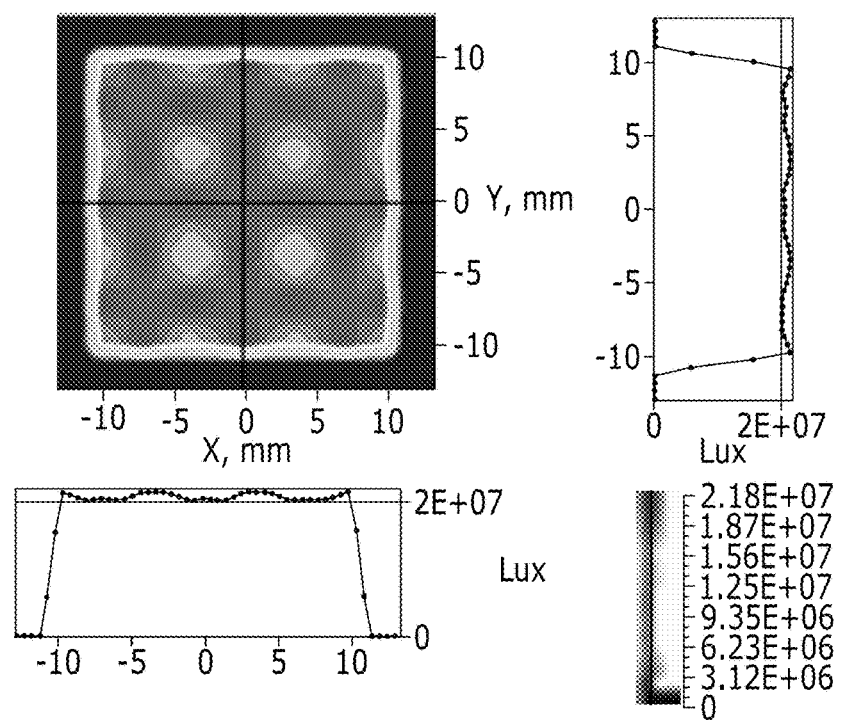
FIGS. 39a, 39b, 39c and 39d illustrate the total illuminance that is the energy uniformity directly above the collimator for air gaps of 0, 1.7 mm, 3.2 mm, and 4.7 mm, respectively, for Example 17 of the BLU according to the present teaching.
Figure 39B:
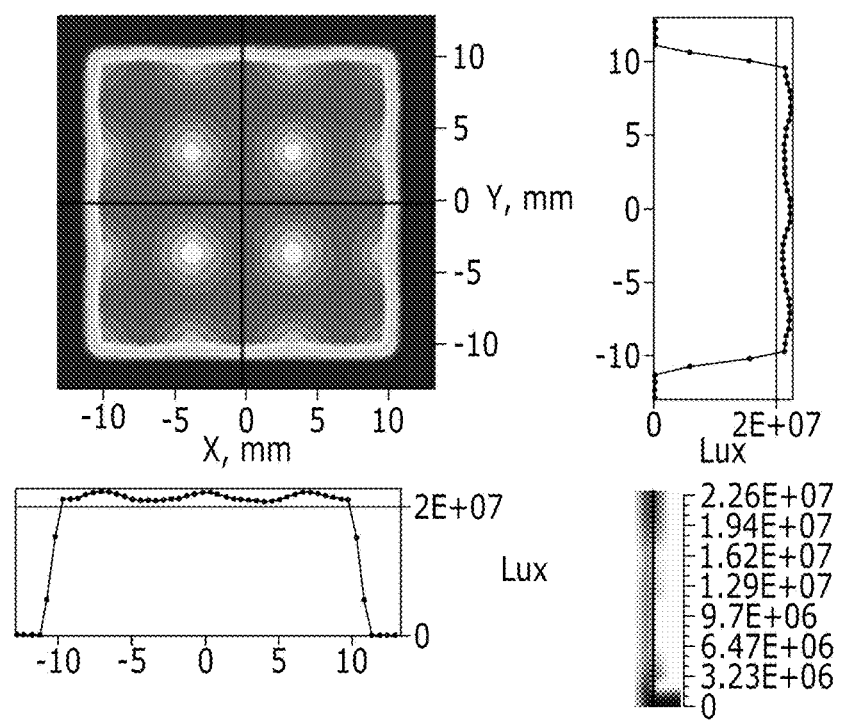
Figure 39C:
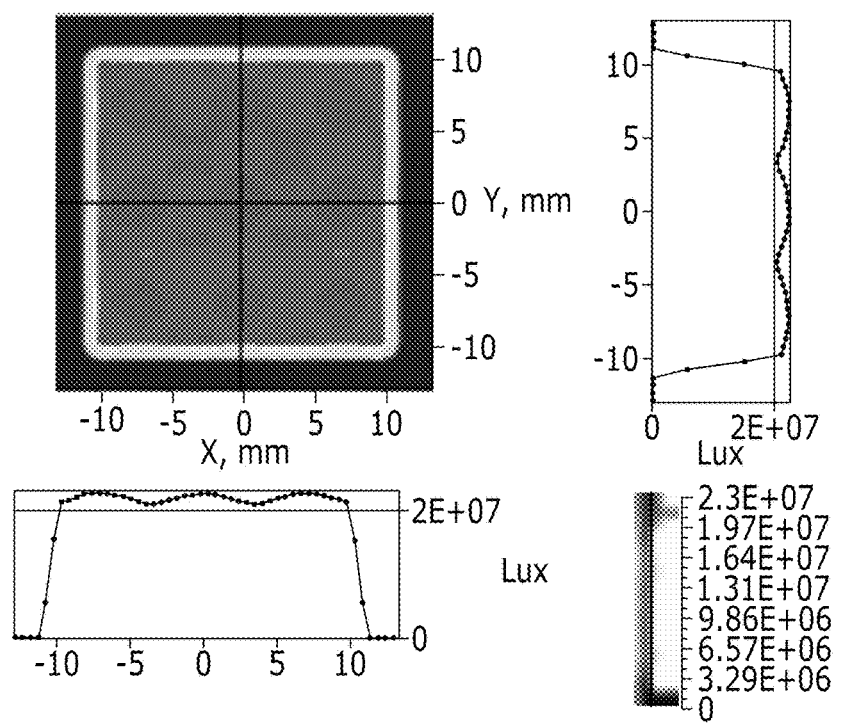
Figure 39D:
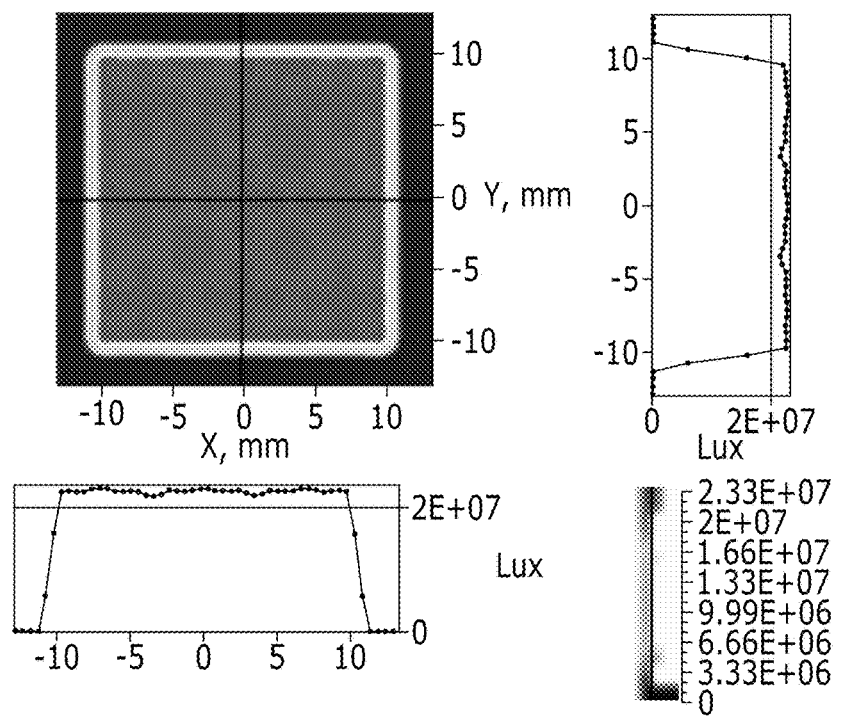
Figure 40A:
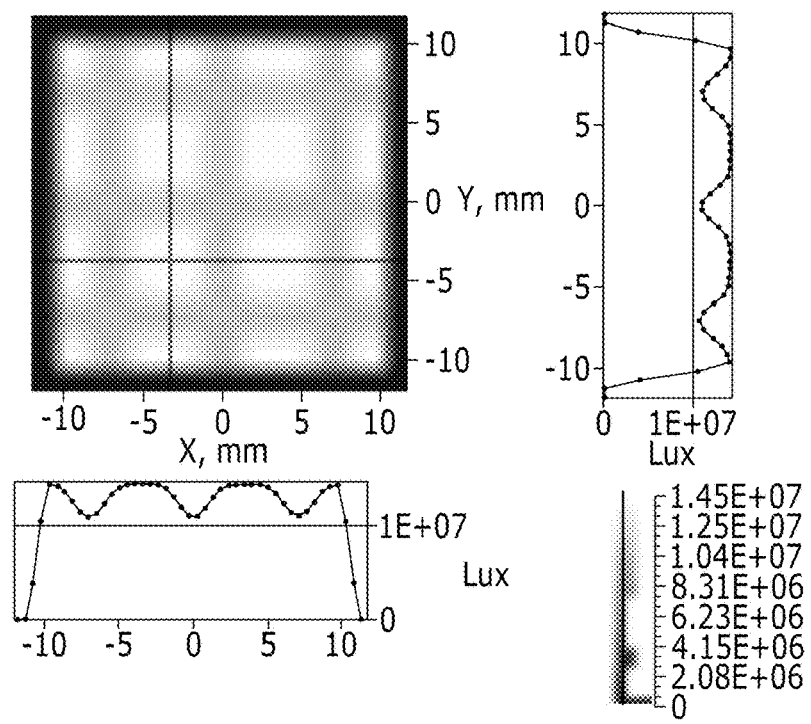
FIGS. 40a, 40b, 40c and 40d illustrate the total illuminance that is the energy uniformity directly above the top layer for air gaps of 0, 1.7 mm, 3.2 mm, and 4.7 mm, respectively, for Example 17 of the BLU according to the present teaching.
Figure 40B:
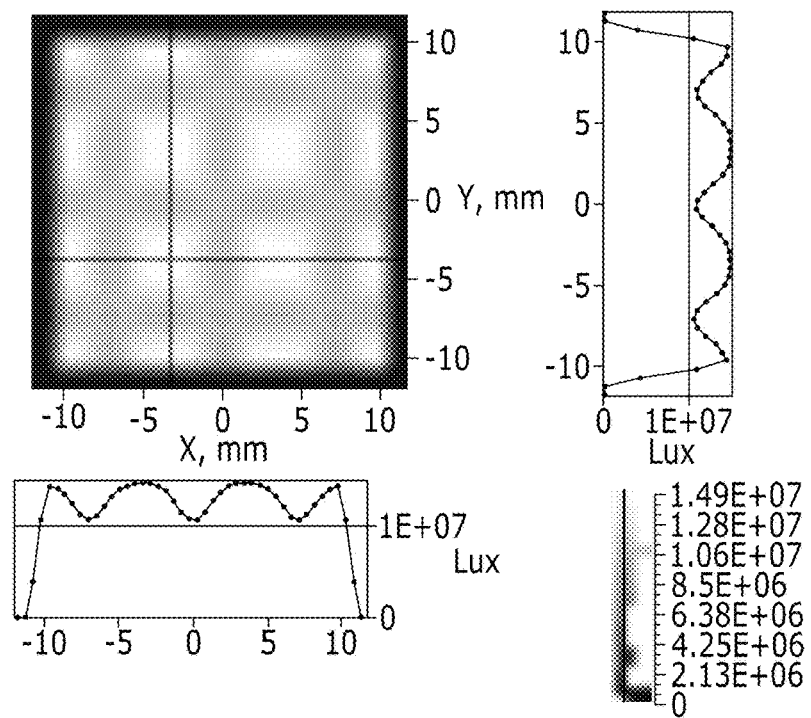
Figure 40C:
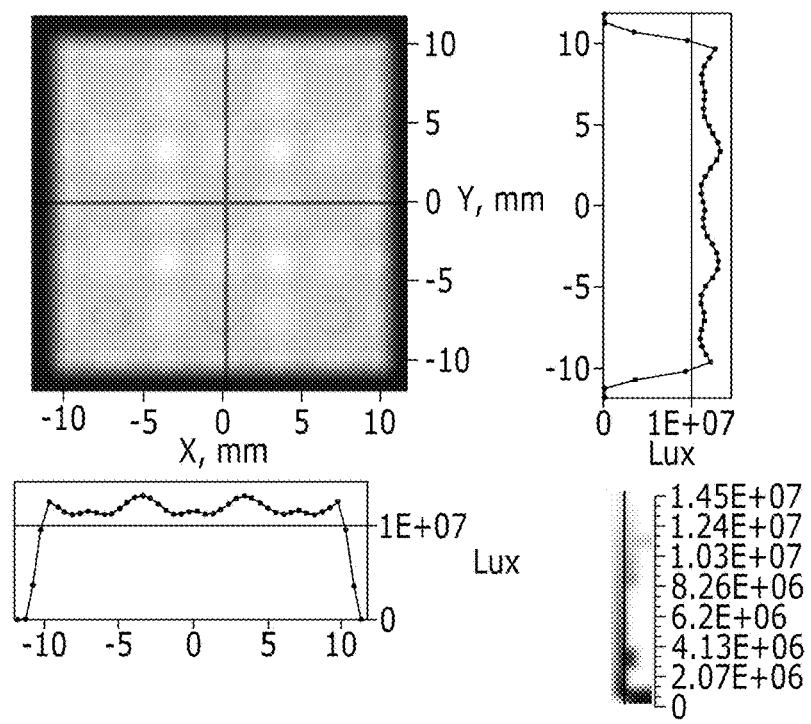
Figure 40D:
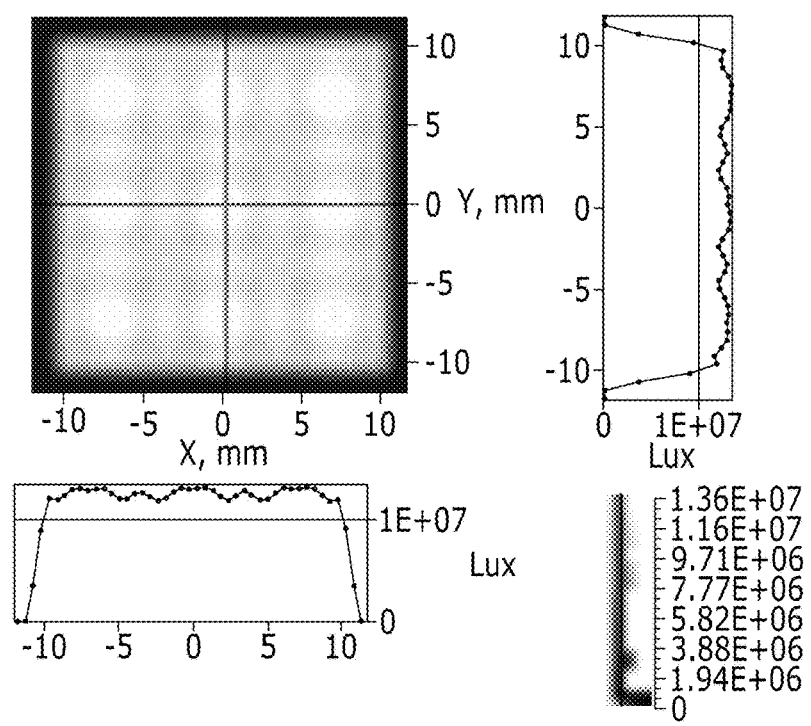
Figure 41A:
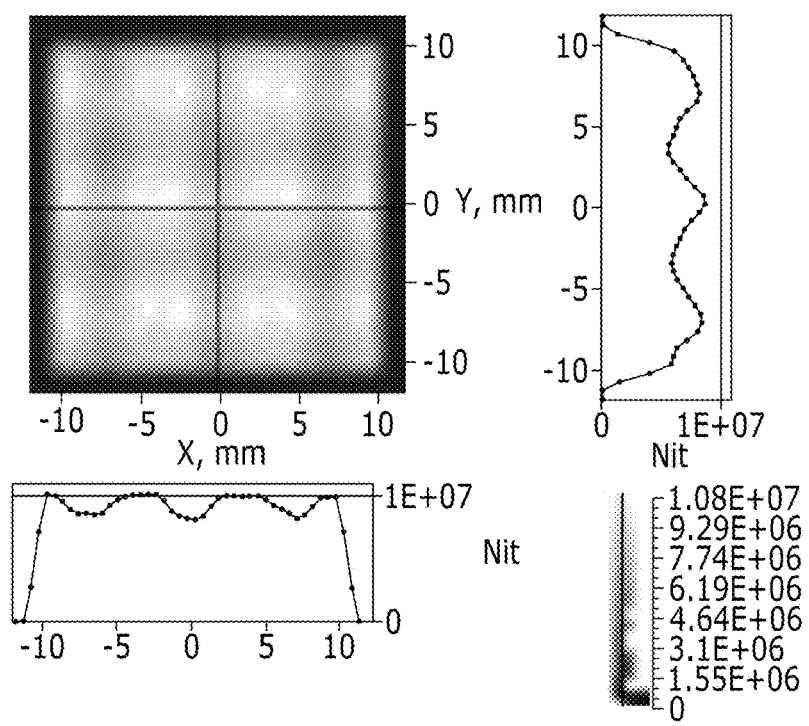
FIGS. 41a, 41b, 41c and 41d illustrate the luminance that is the angular uniformity directly above the top layer for air gaps of 0, 1.7 mm, 3.2 mm, and 4.7 mm, respectively, for Example 17 of the BLU according to the present teaching.
Figure 41B:
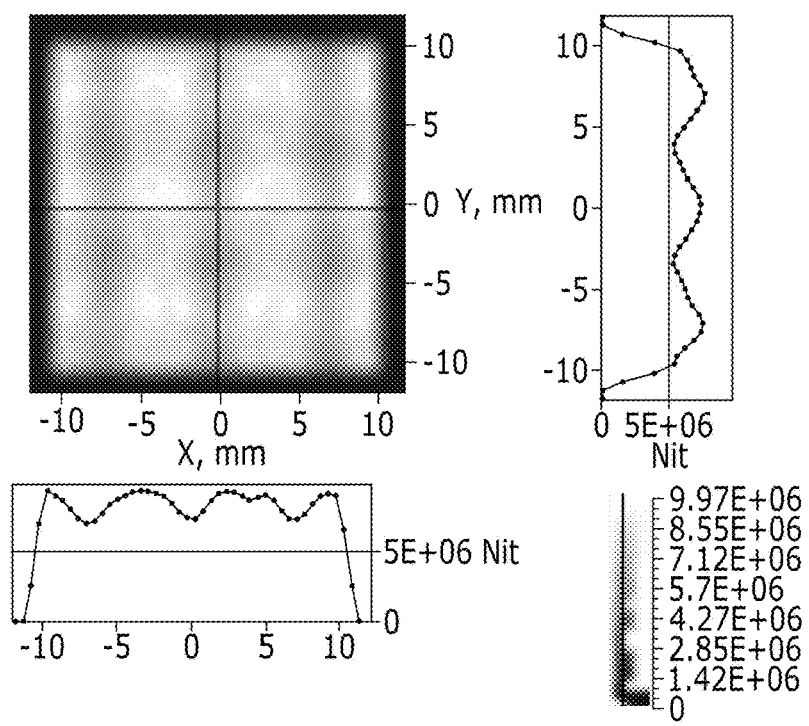
Figure 41C:
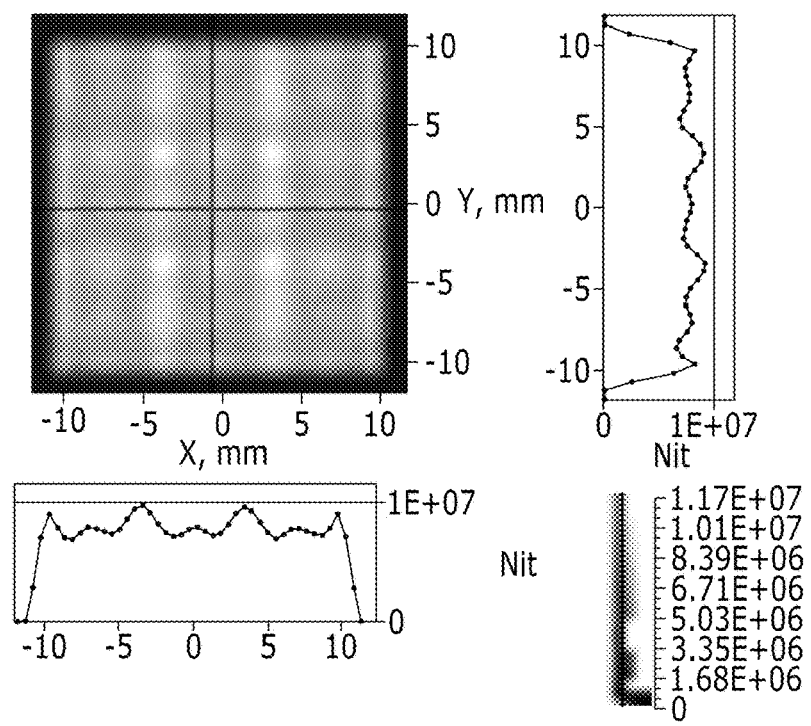
Figure 41D:
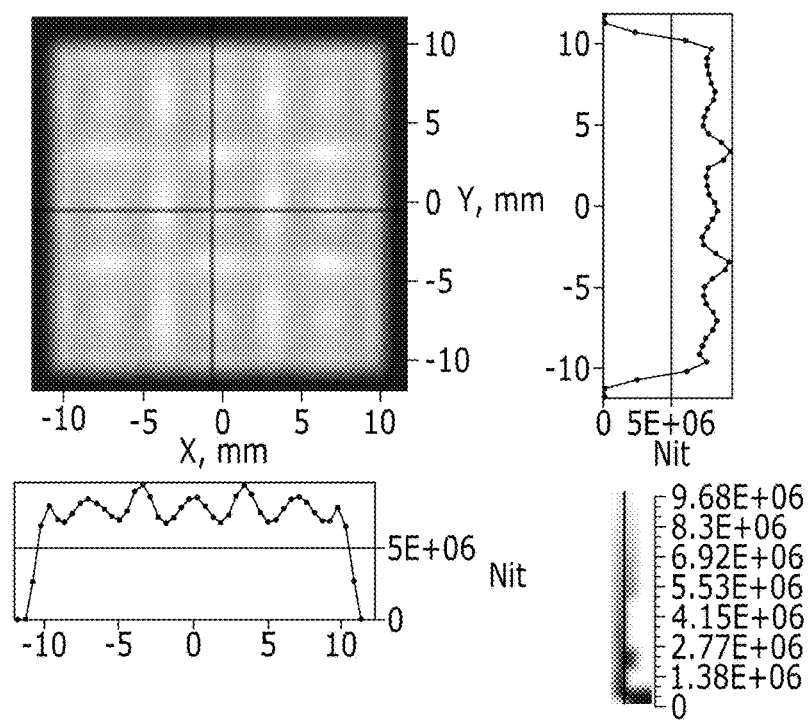
Figure 42A:
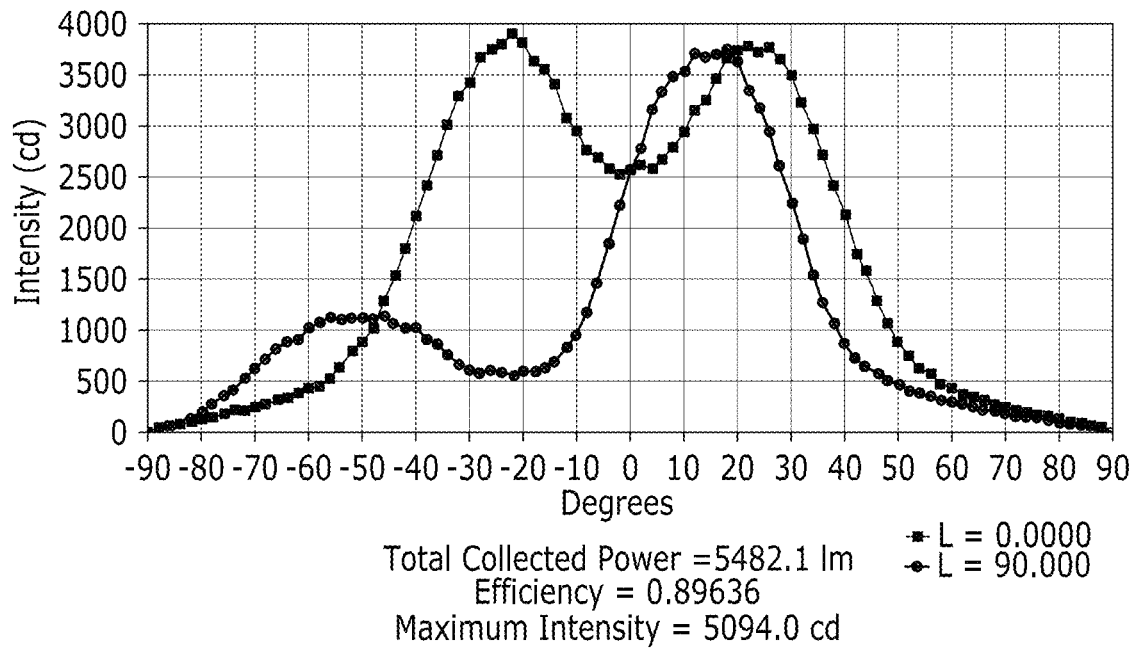
FIGS. 42a, 42b, 42c and 42d illustrate the angular distribution of the light directly above the top layer for air gaps of 0, 1.7 mm, 3.2 mm, and 4.7 mm, respectively, for Example 17 of the BLU according to the present teaching.
Figure 42B:
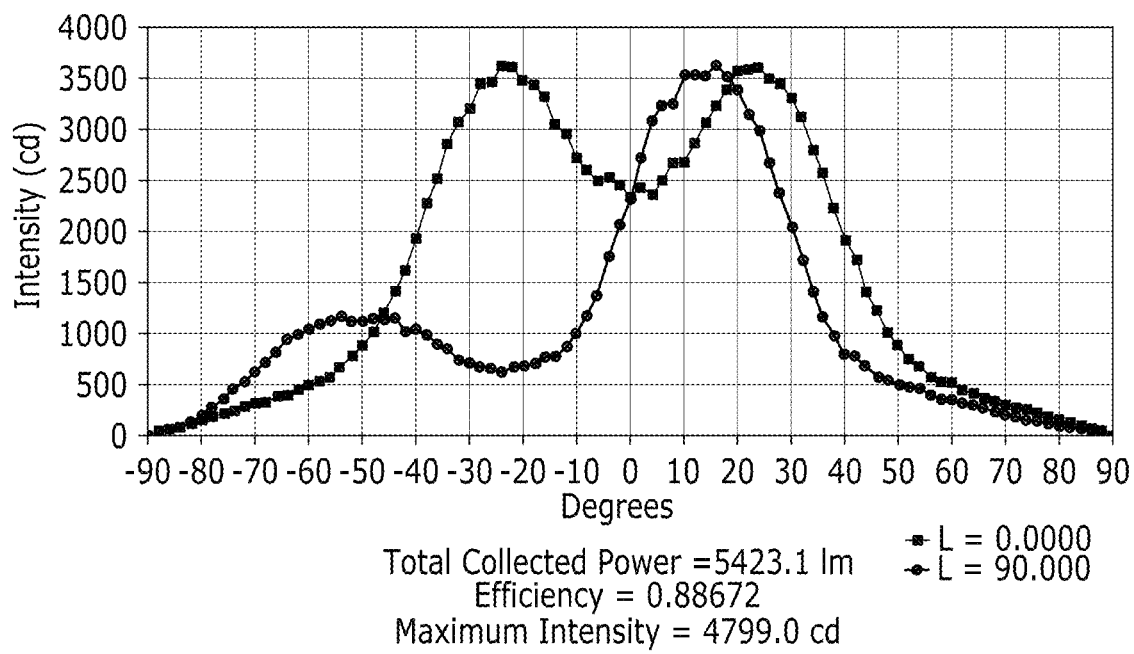
Figure 42C:
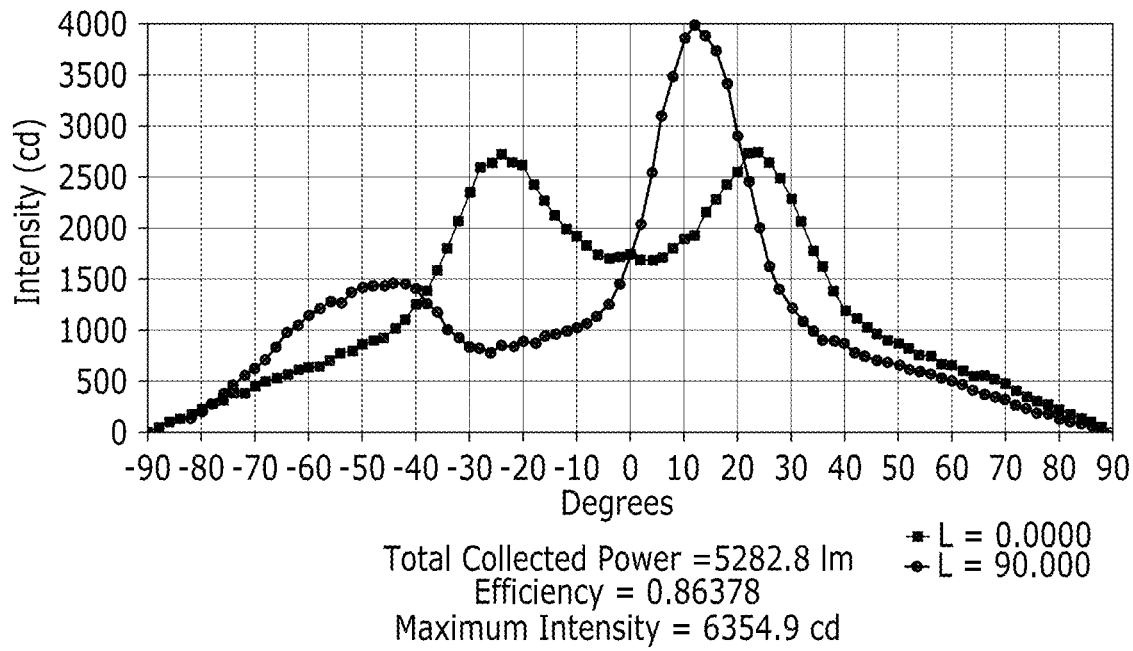
Figure 42D:
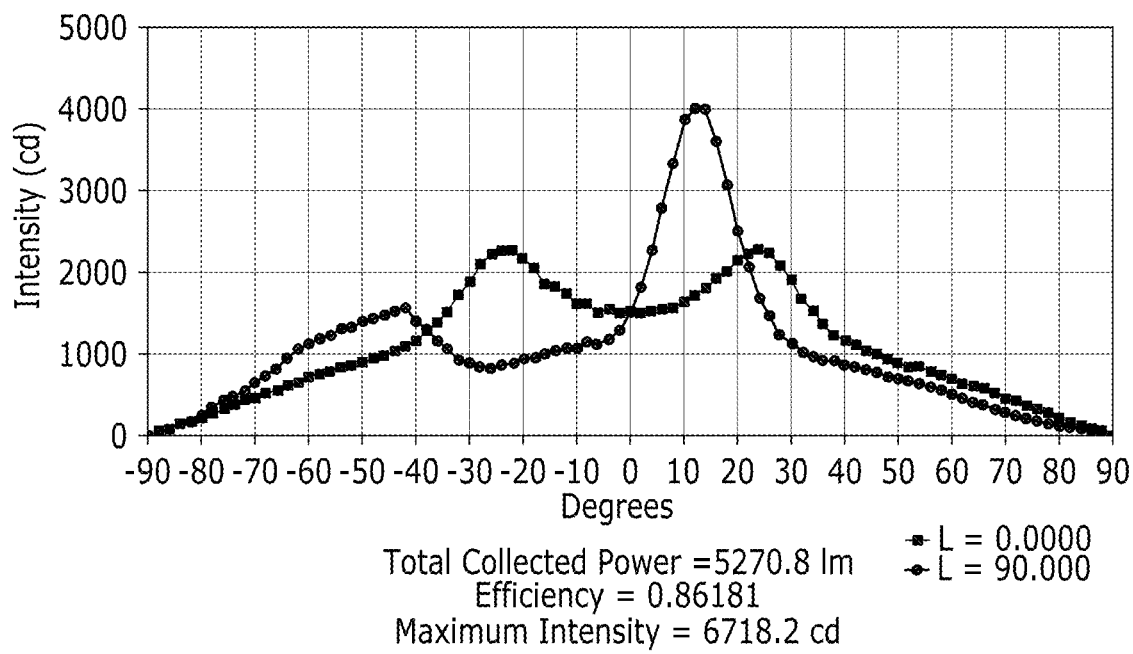

In Example 16 there are two layers, the top layer has a 30 degree FWHM diffuser on the top surface and structures similar to the structure described in connection with FIG. 38 which combines an elliptical spreading in the horizontal direction and a 12.5-degree angle bend in the vertical direction. The bottom layer has the collimation lenses on the top surface and a diffuser on its lower surface facing the LEDs. Reducing the number of layers from four to two increases the efficiency by about 5% because of reduced back reflections. It also improves crosstalk and collimation due to less back reflected light.

Example 17 has two layers with a square array of nine LEDs 1 mm-by-1 mm Lambertian emission spaced 7 mm, PCB has 80% Lambertian reflectivity. The upper layer's top surface is located 14 mm above the LEDs and has a diffuser with a FWHM of about 12 degrees. The bottom surface of this layer facing the collimator lenses and the LEDs has structures as shown in FIG. 38 which both spread the light in the horizontal direction by with a FWHM of 60 degrees and tilts the light in the vertical direction by 12.5 degrees. The layer has a thickness of 0.5 mm. The lower layer has a diffuser on the bottom surface with a FWHM of about 10 degrees. The collimator lenses on the top surface were designed with a radius of 90 mm (which are truncated when they intersect a neighboring lens and a scaling factor of 0.8. The total thickness of the layer and the air gap underneath it is 6.2 mm. The air gap was varied from 0 to 1.7 mm to 3.2 mm to 4.7 mm while the corresponding thickness varied from 6.2 mm to 4.5 mm to 3 mm to 1.5 mm.

FIGS. 39*a*, 39*b*, 39*c* and 39*d* show that the total illuminance that is the energy uniformity directly above the collimator is more uniform for the larger air gaps, especially when the air gap approximately half the LED spacing or larger. FIGS. 40*a-d* and 41*a-d* show that the energy uniformity and the angular uniformity also improve above the top surface as the air gap gets larger. It can also be seen in FIGS. 42*a-d* that the angular distribution in the vertical direction also narrows significantly for the larger air gaps.

Figure 43:
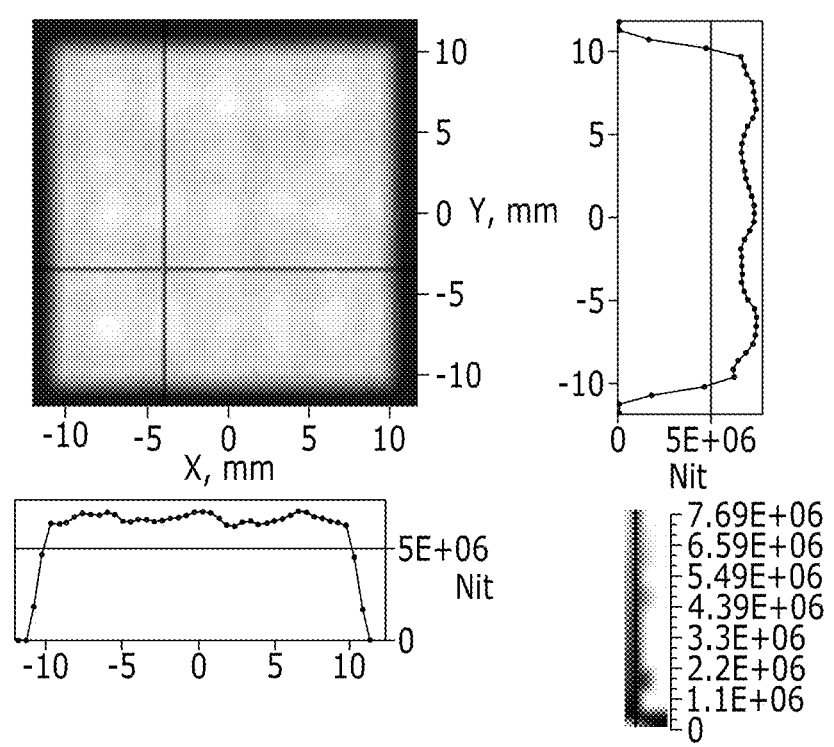
FIG. 43 illustrates the angular distribution of the light directly above the top layer for Example 18 of the BLU according to the present teaching.

Example 18 is the same as Example 17 except the top mixing diffuser is increased from about 12 degrees FWHM to 18 degrees and the air gap is set for 4.7 mm. It can be seen in FIG. 43 that the luminance at the top surface improves significantly.

The parameters depend strongly on the LED spacing. If the spacing is increased by 50% then the thickness of the layer of optically clear material (117) needs to scale roughly proportional. Also the vertical height of the diffuser should also be scaled approximately proportionally.

EQUIVALENTS

While the Applicant's teaching is described in conjunction with various embodiments, it is not intended that the applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A back light unit comprising:
   a) a plurality of light emitting diodes positioned on a substrate; and
   b) a plurality of flat lenses, a respective one of the plurality of flat lens being positioned a distance above a respective one of the plurality of light emitting diodes, each of the plurality of flat lenses comprising a plurality of annular segments having a common center, each of the plurality of annular segments comprising a prism shape microstructure having an exit facet having an angle with respect to a plane that is parallel to a plane of an emitting surface of respective ones of the plurality of light emitting diodes that is defined by the Fresnel equation and being configured to refract the light in a desired direction, and a facet oriented in the plane that is parallel to the plane of the emitting surface of respective ones of the plurality of light emitting diodes, and wherein a scaling factor of a height of each of the plurality of annular segments is in a range from 0.5 to 1.0, thereby providing a collimation of light exiting the plurality of flat lenses that exhibits a ratio of a difference in an angle where an intensity of exiting light at 10% of a maximum value and an angle where the intensity of exiting light is at 80% of the maximum value divided by an angle where the intensity of exiting light is at 50% of the maximum value that is greater than 0.7.

2. The back light unit of claim 1 wherein at least one of the plurality of flat lenses comprises a Fresnel lens.

3. The back light unit of claim 1 wherein a thickness of at least one of the plurality of flat lenses is between 45-55% of a spacing distance of the plurality of light emitting diodes.

4. The back light unit of claim 1 wherein a refractive index of at least one of the plurality of flat lenses is between 1.5 or 1.57.

5. The back light unit of claim 1 wherein at least one of the plurality of flat lenses is configured so that it collimates in one dimension with a FWHM of less than 40 degrees.

6. The back light unit of claim 1 wherein at least one of the plurality of flat lenses is configured so that it collimates in two dimensions with a FWHM of less than 40 degrees.

7. The back light unit of claim 1 wherein at least one of the plurality of flat lenses is configured to collimate asymmetrically.

8. The back light unit of claim 1 wherein at least one of the plurality of flat lenses is configured to provide the same collimation in all directions.

9. The back light unit of claim 1 wherein at least one of the plurality of flat lenses comprises disturbances superimposed on a surface that are configured to provide additional spreading in one dimension.

10. The back light unit of claim 1 wherein at least one of the plurality of flat lenses comprises disturbances superimposed on a surface that are configured to provide additional spreading in two dimensions.

11. The back light unit of claim 1 wherein at least one of the plurality of annular segments comprises a circular segment.

12. The back light unit of claim 1 wherein the exit facet of an inner-most one of the plurality of annular segments is positioned parallel to the plane of the emitting surface of the respective one of the plurality of light emitting diodes.

13. The back light unit of claim 1 wherein the exit facet of an outer-most one of the plurality of annular segments is positioned perpendicular to the plane of the emitting surface of the respective one of the plurality of light emitting diodes.

14. The back light unit of claim 1 wherein the common center of each of the plurality of annular segments of the plurality of flat lenses are vertically aligned to respective ones of centers of emission of the plurality of light emitting diodes.

15. The back light unit of claim 1 wherein at least some of the common centers of the plurality of annular segments of the plurality of flat lenses are spatially offset from centers of emission of the at least some of the respective ones of the plurality of light emitting diodes.

16. The back light unit of claim 1 wherein at least one of the plurality of light emitting diodes comprises an emitting area that is greater in one dimension.

17. The back light unit of claim 1 further comprising an optical film positioned between the plurality of flat lenses and the plurality of light emitting diodes, wherein the optical film is configured to diffuse light transmitting through the optical film, thereby improving visual uniformity.

18. The back light unit of claim 1 further comprising an optical film positioned between the plurality of flat lenses and the plurality of light emitting diodes, wherein the optical film is configured to spread light transmitting through the optical film in two dimensions to achieve a predetermined angular distribution.

19. The back light unit of claim 18 wherein the two dimensions are orthogonal dimensions.

20. The back light unit of claim 1 further comprising an optical film positioned between the plurality of flat lenses and the plurality of light emitting diodes, wherein the optical film is configured to equalize the angular distribution of the light transmitting through the optical film by incorporating a spatially varying angle bend.

21. The back light unit of claim 1 further comprising an optical film positioned between the plurality of flat lenses and the plurality of light emitting diodes, wherein the optical film comprises a plurality of microlenses formed on one surface.

22. The back light unit of claim 1 further comprising an optical film positioned between the plurality of flat lenses and the plurality of light emitting diodes, wherein the optical film comprises a plurality of microlenses formed on both a first surface and a second surface.

23. The back light unit of claim 22 wherein at least some of the microlenses on the first surface are different from some of the microlenses on the second surface.

24. The back light unit of claim 1 further comprising an optical film positioned between the plurality of flat lenses and the plurality of light emitting diodes, wherein the optical film comprises a light absorbing material that minimizes crosstalk between dimming zones.

25. The back light unit of claim 1 further comprising an optical film positioned between the plurality of flat lenses and the plurality of light emitting diodes, wherein the optical film comprises a light absorbing material that enhances collimation by recirculating reflected light.

26. The back light unit of claim 1 further comprising a reflecting polarizer film positioned adjacent to the plurality of flat lens.

27. The back light unit of claim 1 wherein at least some of the plurality of flat lens are configured to collimate light generated by adjacent ones of the plurality of light emitting diodes in a Gaussian angular distribution.

28. A back light unit comprising:
a) a plurality of light emitting diodes positioned on a substrate; and
b) a plurality of flat lenses, a respective one of the plurality of flat lens being positioned a distance above a respective one of the plurality of light emitting diodes, each of the plurality of flat lenses comprising a plurality of annular segments having a common center, each of the plurality of annular segments comprising a prism shape microstructure having an exit facet configured to refract the light in a desired direction and a facet oriented in a plane that is parallel to a plane of an emitting surface of respective ones of the plurality of light emitting diode, wherein at least one of the plurality of flat lenses comprises disturbances superimposed on a surface that are configured to provide additional spreading in one dimension.

29. The backlight unit of claim 28 wherein the at least one of the plurality of flat lenses comprises disturbances superimposed on the surface that are configured to provide additional spreading in two dimensions.

30. The back light unit of claim 28 wherein at least one of the plurality of flat lenses comprises a Fresnel lens.

31. The back light unit of claim 28 wherein a thickness of at least one of the plurality of flat lenses is between 45-55% of a spacing distance of the plurality of light emitting diodes.

32. The back light unit of claim 28 wherein a refractive index of at least one of the plurality of flat lenses is between 1.5 or 1.57.

33. The back light unit of claim 28 wherein at least one of the plurality of flat lenses is configured so that it collimates in one dimension with a FWHM of less than 40 degrees.

34. The back light unit of claim 28 wherein at least one of the plurality of flat lenses is configured so that it collimates in two dimensions with a FWHM of less than 40 degrees.

35. The back light unit of claim 28 wherein at least one of the plurality of flat lenses is configured to collimate asymmetrically.

36. The back light unit of claim 28 wherein at least one of the plurality of flat lens is configured to provide the same collimation in all directions.

37. The back light unit of claim 28 wherein at least one of the plurality of annular segments comprises a circular segment.

38. The back light unit of claim 28 wherein the exit facet of an inner-most one of the plurality of annular segments is positioned parallel to the plane of the emitting surface of the respective one of the plurality of light emitting diodes.

39. The back light unit of claim 28 wherein the exit facet of an outer-most one of the plurality of annular segments is positioned perpendicular to the plane of the emitting surface of the respective one of the plurality of light emitting diodes.

40. The back light unit of claim 28 wherein an angle of the exit facet of at least one of the plurality of annular segments is determined to match a spherical lens.

41. The back light unit of claim 28 wherein an angle of the exit facet of at least one of the plurality of annular segments is determined using the Fresnel equation.

42. The back light unit of claim 28 wherein an angle of the exit facet of at least one of the plurality of annular segments is determined using the Fresnel equation and subsequent scaling by a factor between 0.5 to 1.0.

43. The back light unit of claim 28 wherein the common center of each of the plurality of annular segments of the plurality of flat lenses are vertically aligned to respective ones of centers of emission of the plurality of light emitting diodes.

44. The back light unit of claim 28 wherein at least some of the common centers of the plurality of annular segments of the plurality of flat lenses are spatially offset from centers of emission of the at least some of the respective ones of the plurality of light emitting diodes.

45. The back light unit of claim 28 wherein at least one of the plurality of light emitting diodes comprises an emitting area that is greater in one dimension.

46. The back light unit of claim 28 further comprising an optical film positioned between the plurality of flat lenses and the plurality of light emitting diodes, wherein the optical film is configured to diffuse light transmitting through the optical film, thereby improving visual uniformity.

47. The back light unit of claim 28 further comprising an optical film positioned between the plurality of flat lenses and the plurality of light emitting diodes, wherein the optical film is configured to spread light transmitting through the optical film in two dimensions to achieve a predetermined angular distribution.

48. The back light unit of claim 47 wherein the two dimensions are orthogonal dimensions.

49. The back light unit of claim 28 further comprising an optical film positioned between the plurality of flat lenses and the plurality of light emitting diodes, wherein the optical film is configured to equalize the angular distribution of the light transmitting through the optical film by incorporating a spatially varying angle bend.

50. The back light unit of claim 28 further comprising an optical film positioned between the plurality of flat lenses and the plurality of light emitting diodes, wherein the optical film comprises a plurality of microlenses formed on one surface.

51. The back light unit of claim 28 further comprising an optical film positioned between the plurality of flat lenses and the plurality of light emitting diodes, wherein the optical film comprises a plurality of microlenses formed on both a first surface and a second surface.

52. The back light unit of claim 51 wherein at least some of the microlenses on the first surface are different from some of the microlenses on the second surface.

53. The back light unit of claim 28 further comprising an optical film positioned between the plurality of flat lenses and the plurality of light emitting diodes, wherein the optical film comprises a light absorbing material that minimizes crosstalk between dimming zones.

54. The back light unit of claim 28 further comprising an optical film positioned between the plurality of flat lenses and the plurality of light emitting diodes, wherein the optical film comprises a light absorbing material that enhances collimation by recirculating reflected light.

55. The back light unit of claim 28 further comprising a reflecting polarizer film positioned adjacent to the plurality of flat lens.

56. The back light unit of claim 28 wherein at least some of the plurality of flat lens are configured to collimate light generated by adjacent ones of the plurality of light emitting diodes in a Gaussian angular distribution.

57. A back light unit comprising:
a) a plurality of light emitting diodes positioned on a substrate; and
b) a plurality of flat lenses, a respective one of the plurality of flat lens being positioned a distance above a respective one of the plurality of light emitting diodes, each of the plurality of flat lenses comprising a plurality of annular segments having a common center, each of the plurality of annular segments comprising a prism shape microstructure having an exit facet configured to refract the light in a desired direction and a facet oriented in a plane that is parallel to a plane of an emitting surface of respective ones of the plurality of light emitting diode, wherein at least some of the common centers of the plurality of annular segments of the plurality of flat lenses are spatially offset from centers of emission of the at least some of the respective ones of the plurality of light emitting diodes.

58. The back light unit of claim 57 wherein at least one of the plurality of flat lenses comprises a Fresnel lens.

59. The back light unit of claim 57 wherein a thickness of at least one of the plurality of flat lenses is between 45-55% of a spacing distance of the plurality of light emitting diodes.

60. The back light unit of claim 57 wherein a refractive index of at least one of the plurality of flat lenses is between 1.5 or 1.57.

61. The back light unit of claim 57 wherein at least one of the plurality of flat lenses is configured so that it collimates in one dimension with a FWHM of less than 40 degrees.

62. The back light unit of claim 57 wherein at least one of the plurality of flat lenses is configured so that it collimates in two dimensions with a FWHM of less than 40 degrees.

63. The back light unit of claim 57 wherein at least one of the plurality of flat lenses is configured to collimate asymmetrically.

64. The back light unit of claim 57 wherein at least one of the plurality of flat lens is configured to provide the same collimation in all directions.

65. The back light unit of claim 57 wherein at least one of the plurality of annular segments comprises a circular segment.

66. The back light unit of claim 57 wherein the exit facet of an inner-most one of the plurality of annular segments is positioned parallel to the plane of the emitting surface of the respective one of the plurality of light emitting diodes.

67. The back light unit of claim 57 wherein the exit facet of an outer-most one of the plurality of annular segments is positioned perpendicular to the plane of the emitting surface of the respective one of the plurality of light emitting diodes.

68. The back light unit of claim 57 wherein an angle of the exit facet of at least one of the plurality of annular segments is determined to match a spherical lens.

69. The back light unit of claim 57 wherein an angle of the exit facet of at least one of the plurality of annular segments is determined using the Fresnel equation.

70. The back light unit of claim 57 wherein an angle of the exit facet of at least one of the plurality of annular segments is determined using the Fresnel equation and subsequent scaling by a factor between 0.5 to 1.0.

71. The back light unit of claim 57 wherein the common center of each of the plurality of annular segments of the plurality of flat lenses are vertically aligned to respective ones of centers of emission of the plurality of light emitting diodes.

72. The back light unit of claim 57 wherein at least one of the plurality of flat lenses comprises disturbances superimposed on a surface that are configured to provide additional spreading in one dimension.

73. The back light unit of claim 57 wherein at least one of the plurality of flat lenses comprises disturbances superimposed on a surface that are configured to provide additional spreading in two dimensions.

74. The back light unit of claim 57 wherein at least one of the plurality of light emitting diodes comprises an emitting area that is greater in one dimension.

75. The back light unit of claim 57 further comprising an optical film positioned between the plurality of flat lenses and the plurality of light emitting diodes, wherein the optical film is configured to diffuse light transmitting through the optical film, thereby improving visual uniformity.

76. The back light unit of claim 57 further comprising an optical film positioned between the plurality of flat lenses and the plurality of light emitting diodes, wherein the optical film is configured to spread light transmitting through the optical film in two dimensions to achieve a predetermined angular distribution.

77. The back light unit of claim 76 wherein the two dimensions are orthogonal dimensions.

78. The back light unit of claim 57 further comprising an optical film positioned between the plurality of flat lenses and the plurality of light emitting diodes, wherein the optical film is configured to equalize the angular distribution of the light transmitting through the optical film by incorporating a spatially varying angle bend.

79. The back light unit of claim 57 further comprising an optical film positioned between the plurality of flat lenses and the plurality of light emitting diodes, wherein the optical film comprises a plurality of microlenses formed on one surface.

80. The back light unit of claim 57 further comprising an optical film positioned between the plurality of flat lenses and the plurality of light emitting diodes, wherein the optical film comprises a plurality of microlenses formed on both a first surface and a second surface.

81. The back light unit of claim 80 wherein at least some of the microlenses on the first surface are different from some of the microlenses on the second surface.

82. The back light unit of claim 57 further comprising an optical film positioned between the plurality of flat lenses and the plurality of light emitting diodes, wherein the optical film comprises a light absorbing material that minimizes crosstalk between dimming zones.

83. The back light unit of claim 57 further comprising an optical film positioned between the plurality of flat lenses and the plurality of light emitting diodes, wherein the optical film comprises a light absorbing material that enhances collimation by recirculating reflected light.

84. The back light unit of claim 57 further comprising a reflecting polarizer film positioned adjacent to the plurality of flat lens.

85. The back light unit of claim 57 wherein at least some of the plurality of flat lens are configured to collimate light generated by adjacent ones of the plurality of light emitting diodes in a Gaussian angular distribution.

* * * * *